United States Patent
Jain et al.

(10) Patent No.: US 9,247,470 B2
(45) Date of Patent: Jan. 26, 2016

(54) SYSTEMS AND METHODS FOR LOCATION-AWARE CALL PROCESSING

(71) Applicant: YP LLC, Tucker, GA (US)

(72) Inventors: Mehul Jain, Foster City, CA (US); Kent William Laux, Fremont, CA (US); Johnson Michael, Fremont, CA (US)

(73) Assignee: YP LLC, Tucker, GA (US)

(*) Notice: Subject to any disclaimer, the term of this patent is extended or adjusted under 35 U.S.C. 154(b) by 0 days.

(21) Appl. No.: 14/754,607

(22) Filed: Jun. 29, 2015

(65) Prior Publication Data

US 2015/0382263 A1 Dec. 31, 2015

Related U.S. Application Data

(60) Provisional application No. 62/018,482, filed on Jun. 27, 2014.

(51) Int. Cl.

| H04W 4/00 | (2009.01) |
|---|---|
| H04W 36/14 | (2009.01) |
| H04W 4/02 | (2009.01) |
| H04W 84/04 | (2009.01) |
| H04W 36/32 | (2009.01) |

(52) U.S. Cl.
CPC ............ *H04W 36/14* (2013.01); *H04W 4/027* (2013.01); *H04W 36/32* (2013.01); *H04W 84/042* (2013.01)

(58) Field of Classification Search
CPC ... H04W 36/14; H04W 4/027; H04W 84/042; H04W 36/32; H04W 8/183; H04W 48/18; H04W 8/12; H04B 7/18506
USPC ............ 455/558, 435, 432.3, 432.1; 370/389, 370/401; 715/716, 730
See application file for complete search history.

(56) References Cited

U.S. PATENT DOCUMENTS

| 5,625,680 | A | 4/1997 | Foladare |
|---|---|---|---|
| 6,856,806 | B1 | 2/2005 | Bosik |
| 7,593,741 | B1 | 9/2009 | Amin |
| 7,720,091 | B2 | 5/2010 | Faber |
| 7,890,581 | B2 * | 2/2011 | Rao et al. ...................... 709/204 |
| 7,966,026 | B2 | 6/2011 | Zellner |
| 8,010,132 | B2 | 8/2011 | Wilson |
| 8,031,851 | B2 * | 10/2011 | Holt et al. ................ 379/201.02 |
| 8,121,898 | B2 | 2/2012 | Altberg |
| 8,326,276 | B2 * | 12/2012 | Chin et al. .................... 455/416 |
| 2008/0059446 | A1 * | 3/2008 | Blass et al. ........................ 707/5 |
| 2009/0160859 | A1 * | 6/2009 | Horowitz et al. ............. 345/440 |
| 2009/0247189 | A1 * | 10/2009 | Sennett et al. ............. 455/456.2 |

(Continued)

*Primary Examiner* — Mahendra Patel
(74) *Attorney, Agent, or Firm* — Alston & Bird LLP

(57) ABSTRACT

Systems, methods, and computer-readable storage media for location-aware call processing for routing a call to a provider are provided. A telephone call from an end-user communication device may be received. An indication of a first provider category may be identified. A first set of provider information may be processed based on the first provider category. A heat map may be generated to identify correlations between user information, location information, and/or provider information. An area proximate to a first location of an end-user communication device may be calculated. A second set of provider information may be identified based on the first location and/or the area proximate to the first location. A provider is selected based on rankings of the providers. A provider is selected based on the ranking, a telephone reference is determined for the selected provider, and a connection of a telephone call is facilitated to the selected provider.

20 Claims, 20 Drawing Sheets

(56) References Cited

U.S. PATENT DOCUMENTS

| | | | |
|---|---|---|---|
| 2009/0327135 A1* | 12/2009 | Nguyen et al. | 705/44 |
| 2011/0093340 A1* | 4/2011 | Kramer et al. | 705/14.58 |
| 2012/0046048 A1* | 2/2012 | Copeland et al. | 455/456.1 |
| 2013/0229930 A1* | 9/2013 | Akay et al. | 370/252 |
| 2013/0281110 A1* | 10/2013 | Zelinka | 455/456.1 |
| 2014/0229258 A1* | 8/2014 | Seriani | 705/14.23 |
| 2014/0351886 A1* | 11/2014 | Edge et al. | 726/3 |

\* cited by examiner

SYSTEMS AND METHODS FOR LOCATION-AWARE CALL PROCESSING

CROSS-REFERENCES TO RELATED APPLICATIONS

This application claims the benefit of priority to and is a Non-Provisional application of U.S. Provisional Application No. 62/018,482, filed on Jun. 27, 2014, which is hereby incorporated by reference in its entirety for all purposes.

BACKGROUND

Certain embodiments of the present disclosure relate generally to telephonic connections with providers and content provisioning systems, and in particular to systems and methods for location-aware call processing.

As access and demand for information increases, end-users demand more products and services than ever before. Providers of such services are expected to compete to provide greater levels of accuracy and more tailored services to each end-user. Providers operate ever increasing numbers of complex computer systems to achieve this. Accessing and using sources of information that have previously been unavailable is now expected. Accordingly, there is a need for location-based services to provide access to time-sensitive information to end-users and providers in the fastest manner possible. Additionally, there is a need to provide location-specific and filtered provider information to end-users using minimal system resources. Further, there is a need to transmit end-user information to providers in an efficient manner.

Therefore, there is a need for systems and methods for location-aware call processing. This and other needs are addressed by the present disclosure.

BRIEF SUMMARY

Certain embodiments of the present disclosure relate generally to telephonic connections with providers and content provisioning systems, and in particular to systems and methods for location-aware call processing.

In one aspect, a method is provided for location-aware call processing for a call for a provider. The method comprises receiving a telephone call from an end-user communication device, identifying an indication of a first provider category at least partially based on the telephone call, and processing a first set of provider information stored in a provider database at least partially based on the first provider category. The first set of provider information may include one or more distance thresholds corresponding to a first set of providers that previously specified the one or more distance thresholds. The method further comprises processing information about a first location and identifying a second set of provider information out of the first set of provider information at least partially based on the first location and the one or more distance thresholds corresponding to the one or more providers of the first set of providers. The method further comprises generating a heat map to identify correlations of one or more of the user information for the user associated with the end-user communication device, at least a portion of the first set of provider information, and/or information corresponding to the first location and calculating an area proximate to the first location at least partially by using the identified correlations from the heat map to identify the areas surrounding the first location that include high interest matching for the user. The method further comprises identifying a second set of provider information out of the first set of provider information at least partially based on the first location and/or the area proximate to the first location and the one or more distance thresholds corresponding to the one or more providers of the first set of one or more providers, and ranking each of the providers from the second set of one or more providers by calculating the ranking at least in part through a comparison of a correlation of criteria shared between user information and the provider information associated with each of the providers. The method further comprises selecting a provider from the second set of providers at least partially based on the ranking, determining a telephone reference for the provider selected from the second set of providers, and facilitating a connection of the telephone call to the provider selected from the second set of providers at least partially based on the telephone reference.

In another aspect, a system is provided for location-aware call processing for a call for a provider. The system comprises one or more processors and one or more storage media coupled to the one or more processors and including instructions stored thereon to be executed by one or more processors to receive a telephone call from an end-user communication device, identify an indication of a first provider category at least partially based on the telephone call, and process a first set of provider information stored in a repository at least partially based on the first provider category. The first set of provider information corresponds to a first set of providers and the first set of provider information comprises one or more distance thresholds corresponding to one or more providers of the first set of providers. The distance thresholds being previously specified by the one or more providers of the first set of providers. The instructions being further configured to process information about a first location, identify a second set of provider information out of the first set of provider information at least partially based on the first location and the one or more distance thresholds corresponding to the one or more providers of the first set of providers. The second set of provider information corresponds to a second set of providers out of the first set of providers. The instructions being further configured to generate a heat map to identify correlations of one or more of the user information for the user associated with the end-user communication device, at least a portion of the first set of provider information, and/or information corresponding to the first location and calculating an area proximate to the first location at least partially by using the identified correlations from the heat map to identify the areas surrounding the first location that include high interest matching for the user. The instructions being further configured to identify a second set of provider information out of the first set of provider information at least partially based on the first location and/or the area proximate to the first location and the one or more distance thresholds corresponding to the one or more providers of the first set of one or more providers. The instructions being further configured to rank each of the providers from the second set of one or more providers by calculating the ranking at least in part through a comparison of a correlation of criteria shared between user information and the provider information associated with each of the providers. The instructions being further configured to select a provider from the second set of providers at least partially based on the ranking, determine a telephone reference for the provider selected from the second set of providers, and facilitate a connection of the telephone call to the provider selected from the second set of providers at least partially based on the telephone reference.

In yet another aspect, one or more non-transitory, computer-readable media having machine-readable instructions thereon are provided for location-aware call processing for a call for a provider. The instructions are configured to cause one or more processors to perform a method. The method comprises receiving a telephone call from an end-user communication device, identifying an indication of a first provider category at least partially based on the telephone call, and processing a first set of provider information stored in a provider database at least partially based on the first provider category. The first set of provider information including one or more distance thresholds corresponding to a first set of providers that previously specified the one or more distance thresholds. The method further comprises processing information about a first location and identifying a second set of provider information out of the first set of provider information at least partially based on the first location and the one or more distance thresholds corresponding to the one or more providers of the first set of providers. The method further comprises generating a heat map to identify correlations of one or more of the user information for the user associated with the end-user communication device, at least a portion of the first set of provider information, and/or information corresponding to the first location and calculating an area proximate to the first location at least partially by using the identified correlations from the heat map to identify the areas surrounding the first location that include high interest matching for the user. The method further comprises identifying a second set of provider information out of the first set of provider information at least partially based on the first location and/or the area proximate to the first location and the one or more distance thresholds corresponding to the one or more providers of the first set of one or more providers, and ranking each of the providers from the second set of one or more providers by calculating the ranking at least in part through a comparison of a correlation of criteria shared between user information and the provider information associated with each of the providers. The method further comprises selecting a provider from the second set of providers at least partially based on the ranking, determining a telephone reference for the provider selected from the second set of providers, and facilitating a connection of the telephone call to the provider selected from the second set of providers at least partially based on the telephone reference.

In various embodiments, identifying the area proximal to the first location includes determining that the end-user communication device is moving, determining a speed of movement for the end-user communication device, and selecting a shape of the area proximal to the first location based on the speed of movement.

In various embodiments, the system is further configured to identify a type of connection to facilitate based at least in part upon the provider information of the selected provider received from the provider database, location information, and the user information received from the user information database, where the type of connection may include one of a live call, a call messaging service, and a notification transmission.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the following appended figures.

Figure 1:
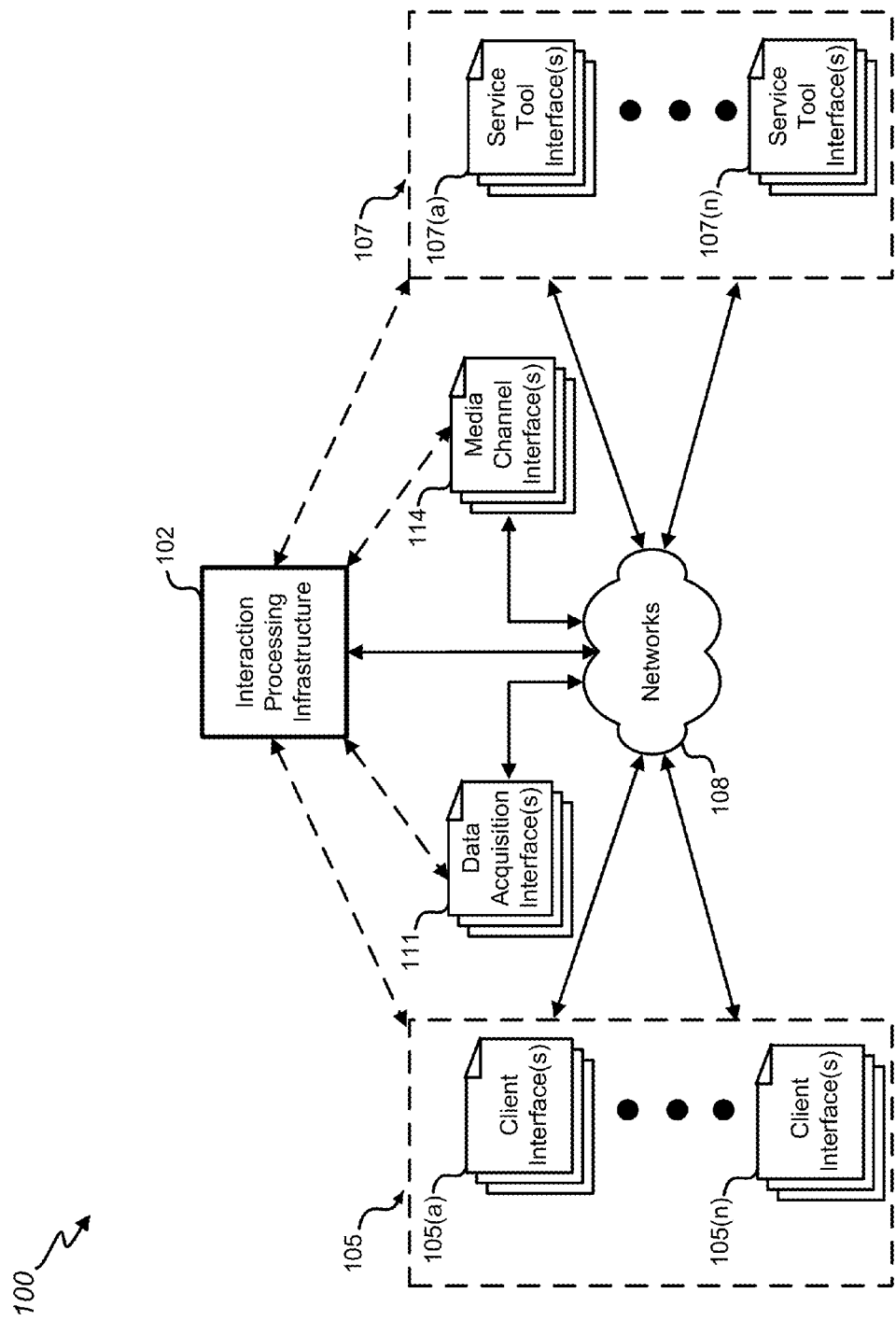
FIG. 1 is a high-level block diagram of a system, in accordance with certain embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Certain embodiments according the present disclosure enable providers to select options for location-based filtering of incoming calls in response to content objects. In certain embodiments, the location of a caller can be identified, and the call can be matched with a provider based on the mutual proximity of the caller and the provider. In various embodiments, the identification of the caller's location may be based on the telephone connection itself, as well as other information known about the call (e.g., area code, IP address for the app, GPS, direction of travel, etc., as available). To allow for customization of services to a specific provider, certain embodiments may provide a provider portal through which the provider may specify preferences such as geography and proximity limits to define where they are interested in traveling.

Certain embodiments may allow filtering of calls by playing a message indicating that the caller is being connected to a provider in a particular location; if the caller does not want the provider in that location, the caller may drop the call or indicate that the provider in that location is not wanted. With certain embodiments, the location may be guessed with proximity techniques, but if the guess is wrong, the provider is not bothered. For example, an automated service option could be directed to the caller, saying, "We see you are calling from near Petaluma, is that right? If that is not right, state the location or press 2."

Certain embodiments may provide notifications to providers based on locations of the callers. To address missed calls, providers may specify a filter based on the location of the caller. For instance, if a caller is located within 20 miles of the provider, an SMS text may be sent to the provider as notification of the missed call in some embodiments. In some embodiments, other missed calls not meeting the distance criterion may be posted on a website or to a mobile application for later review by the provider. The provider may specify that calls be recorded and/or that the provider should receive notifications about calls in a predetermined proximity.

With certain embodiments, a mobile application may be made available for execution on a mobile computing device. Various embodiments may include a specific purpose-based mobile application or a mobile application integrated with various other mobile application features. The mobile application executed on a mobile computing device provides for displaying, on a map and/or a list, indicators of providers within a particular proximity. The proximity may be with respect to the current location of a mobile computing device or a location entered by a user into the mobile computing device. In various embodiments, a search area proximal to the location may have any of various suitable forms. A search area may be a circular area with a particular radius with the location as the origin. The form of a search area may be more tailored to the specific needs of the user in some embodiments, e.g., by taking into consideration a user's direction of travel and/or a user's previous call interactions.

Various embodiments will now be discussed in greater detail with reference to the accompanying figures, beginning with FIG. 1.

FIG. 1 depicts a high-level block diagram of a system 100, in accordance with certain embodiments of the present disclosure. The system 100 may allow for interaction between two or more of an interaction processing infrastructure 102 (sometimes referenced herein as interaction infrastructure 102), client interfaces 105, service tool interfaces 107, data acquisition interfaces 111, and/or media channel interfaces 114. As depicted, components of the system 100 may be communicatively coupled or couplable to one or more networks 108.

The one or more networks 108 may be a suitable means to facilitate data transfer in the system 100 and could include multiple networks and/or network components. In various embodiments, the one or more networks 108 may be implemented with, without limitation, one or more of the Internet, a wide area network (WAN), a local area network (LAN) such as one based on Ethernet, Token-Ring and/or the like, a wireless network (e.g., a network operating under Bluetooth®, any of the Institute of Electrical and Electronics (IEEE) 802.11 suite of protocols, and/or any other wireless protocol), a wireless local area network (WLAN), a cellular network, such as through 4G, 3G, GSM (Global System for Mobile Communications), etc., another wireless network, a gateway, a public switched telephone network (PSTN), and/or any other appropriate architecture or system that facilitates the communication of signals, data, and/or message. In various embodiments, the one or more networks 108 may transmit data using any suitable communication protocol(s), such as, without limitation, TCP/IP (transmission control protocol/Internet protocol), SNA (systems network architecture), IPX (Internet packet exchange), AppleTalk, and/or the like. In various embodiments, the one or more networks 108 and its various components may be implemented using hardware, software, and communications media such wires, optical fibers, microwaves, radio waves, and other electromagnetic and/or optical carriers; and/or any combination of the foregoing and/or the like. In some embodiments, the network 108 may include a telephone network that may be circuit switched, package switched, or partially circuit switched and partially package switched. For example, the telephone network may partially use the Internet to carry phone calls (e.g., through voice of internet protocol (VoIP) technology).

The interaction processing infrastructure 102 may facilitate searching of one or more information repositories in response to data received over the one or more networks 108 from any one or combination of the interfaces. In various embodiments, the interaction processing infrastructure 102 may include a set of devices configured to process, transform, encode, translate, send, receive, retrieve, detect, generate, compute, organize, categorize, qualify, store, display, present, handle, or use information and/or data suitable for the embodiments described herein. For example, servers of the infrastructure 102 may be used to store software programs and data. Software implementing the systems and methods described herein may be stored on storage media in the servers. Thus, the software may be run from the storage media in the servers. In some embodiment, software implementing the systems and methods described herein may be stored on storage media of other devices described herein.

The interaction processing infrastructure 102 may be implemented in or with a distributed computing and/or cloud computing environment with a plurality of servers and cloud-implemented resources. The interaction processing infrastructure 102 may include processing resources communicatively coupled to storage media, random access memory (RAM), read-only memory (ROM), and/or other types of memory. The interaction processing infrastructure 102 may include various input and output (I/O) devices, network ports, and display devices.

In certain embodiments, the interaction processing infrastructure 102 may be communicatively coupled or couplable to one or more data sources via one or more data acquisition interfaces 111. The one or more data sources may include any suitable source of data to facilitate embodiments disclosed further herein. In various embodiments, the one or more data sources may include one or more of a database, a website, any repository of data in any suitable form, and/or a third party system. In various embodiments, the one or more data sources may correspond to one or more social media websites and/or photo-sharing websites. With some embodiments, the data sources may include one or more mobile computing device locator services that provide information regarding the location of one or more client devices 205 and/or 207 (depicted in FIG. 2). With some embodiments, the data sources may provide various details relating to call data. With some embodiments, the data sources may provide caller name information from calling name delivery (CNAM), also known as caller identification or caller ID, may be used to determine particular details about the caller. With some embodiments, the data sources may provide information about the area of a caller. With some embodiments, the data sources may provide demographic data about an area.

In various embodiments, the data from the one or more data sources may be retrieved and/or received by the interaction processing infrastructure 102 via the one or more data acquisition interfaces 111 through network(s) 108 and/or through any other suitable means of transferring data. In some embodiments, the interaction processing infrastructure 102 and the data sources could use any suitable means for direct communication. According to certain embodiments, data may be actively gathered and/or pulled from one or more data sources, for example, by accessing a third party repository and/or by "crawling" various repositories. Certain data pulled and/or pushed from the one or more data sources may be transformed and the transformed data and/or other data generated based thereon may be made available by the interaction processing infrastructure 102 for users of client devices 205 and/or 207. In alternative embodiments, data from the one or more data sources may be made available directly to client devices 205 and/or 207.

In some embodiments, the one or more data acquisition interfaces 111 may be implemented in similar manner to interfaces 105 and/or 107 or any other suitable interface. In some embodiments, the one or more data acquisition interfaces 111 may include one or more application programming interfaces (APIs) that define protocols and routines for interfacing with the data sources. The APIs may specify application programming interface (API) calls to/from data source systems. In some embodiments, the APIs may include a plug-in to integrate with an application of a data source system. The one or more data acquisition interfaces 111, in some embodiments, could use a number of API translation profiles configured to allow interface with the one or more additional applications of the data sources to access data (e.g., a database or other data store) of the data sources. The API translation profiles may translate the protocols and routines of the data source system to integrate at least temporarily with the system and allow communication with the system by way of API calls. Data, as referenced herein, may correspond to any one or combination of raw data, unstructured data, structured data, information, and/or content which may include media content, text, documents, files, instructions, code, executable files, images, video, audio, and/or any other suitable content suitable for embodiments of the present disclosure.

According to certain embodiments, the interaction processing infrastructure 102 may include or provide a service management platform. A provider may access the interaction processing infrastructure 102 via a service tool interface 107. An end-user may access the interaction processing infrastructure 102 via a client interface 105. The interaction processing infrastructure 102 may facilitate searching of one or more information repositories in response to information received over the network 108 from the client interfaces 105 and/or service tool interfaces 107.

The client interfaces 105 and/or service tool interfaces 107 may allow for transfer of and access to information in accordance with certain embodiments disclosed herein. In various embodiments, the client interface(s) 105 and/or service tool interface(s) 107 may include one or more suitable input/output modules and/or other system/devices operable to serve as an interface between a service provider(s) and the provider management platform. The client interfaces 105 and/or service tool interfaces 107 may facilitate communication over the network 108 using any suitable transmission protocol and/or standard. In various embodiments, the interaction infrastructure 102 may include, provide, and/or be configured for operation with the client interfaces 105 and/or service tool interfaces 107, for example, by making available and/or communicating with one or more of a website, a web page, a web portal, a web application, a mobile application, enterprise software, and/or any suitable application software. In some embodiments, a client interface 105 and/or service tool interface 107 may include an API to interact with the interaction infrastructure 102.

In some embodiments, a client interface 105 and/or a service tool interface 107 may include a web interface. In some embodiments, the client interface 105 and/or service tool interface 107 may include or work with an application made available to one or more interfaces, such as a mobile application as discussed herein. In some embodiments, the client interface 105 and/or service tool interface 107 may cause a web page to be displayed on a browser of a service provider. The web page(s) may display output and receive input from a user (e.g., by using Web-based forms, via hyperlinks, electronic buttons, etc.). A variety of techniques can be used to create the web pages and/or display/receive information, such as JavaScript, Java applications or applets, dynamic HTML and/or AJAX technologies. Accordingly, the interaction processing infrastructure 102 may have web site(s)/portal(s) giving access to such information, such as a provider portal.

In various embodiments, a client interface 105 and/or a service tool interface 107 may include providing one or more display screen images that may each include one or more user interface elements. A user interface may include any text, image, and/or device that can be displayed on a display screen for providing information to a user and/or for receiving user input. A user interface may include one or more widgets, windows, dashboards, text, text boxes, text fields, tables, grids, charts, hyperlinks, buttons, lists, combo boxes, checkboxes, radio buttons, and/or the like.

In certain embodiments, a client interface 105 and/or a service tool interface 107 may include a computing device of an end-user and/or a service provider. In certain embodiments, a client interface 105 and/or a service tool interface 107 may include a mobile computing device that may be any portable device suitable for sending and receiving information over a network in accordance with embodiments described herein.

Certain embodiments may provide a multi-channel communication regime to coordinate multiple communication channels used by end-users and providers. Multiple communication pipes within a communication pipe could be implemented according to certain embodiments. Some embodiments may implement a greater number of communication channels. For example, one set of channels could be used for an end-user to request help, and one set of channels could be used for a provider to respond to the end-user. The system can use web communication, text communication, voice communication, e-mail communication, push notification, and/or the like.

According to certain embodiments, the interaction processing infrastructure 102 may be or include a content provisioning platform. In some embodiments, the interaction processing infrastructure 102 may provide for the selection, generation, and provision of content objects to one or more client interfaces 105. In certain embodiments, providers may have content objects that may be placed in a web page made available to one or more client interfaces 105. In certain embodiments, providers may have content objects that may be displayed with an application made available to one or more client interfaces 105, such as a mobile application according to various embodiments. In some embodiments, placement of the content objects could be in accordance with one or more paid placement arrangements and one or more content presentation models.

Content objects may be included in a results page responsive to a keyword search initiated by an end-user via, for example, a webpage and/or a mobile application. The search may be performed by an online search engine facilitated by the interaction processing infrastructure 102. A content object of provider may be included within a results page with results identified and/or compiled by the search engine and sent via the network 108 to the client interface 105 of the end-user that initiated the search.

An end-user, in various embodiments, may correspond to an end-user of products, services, and/or information. A provider, in various embodiments, may correspond to (and may be variously referenced herein by) any one or combination of a service provider, a product provider, a merchant, a commercial entity, an advisor, a representative, and/or the like. End-users may use one or more client interfaces 105; providers may use one or more service tool interfaces 107.

Figure 2:
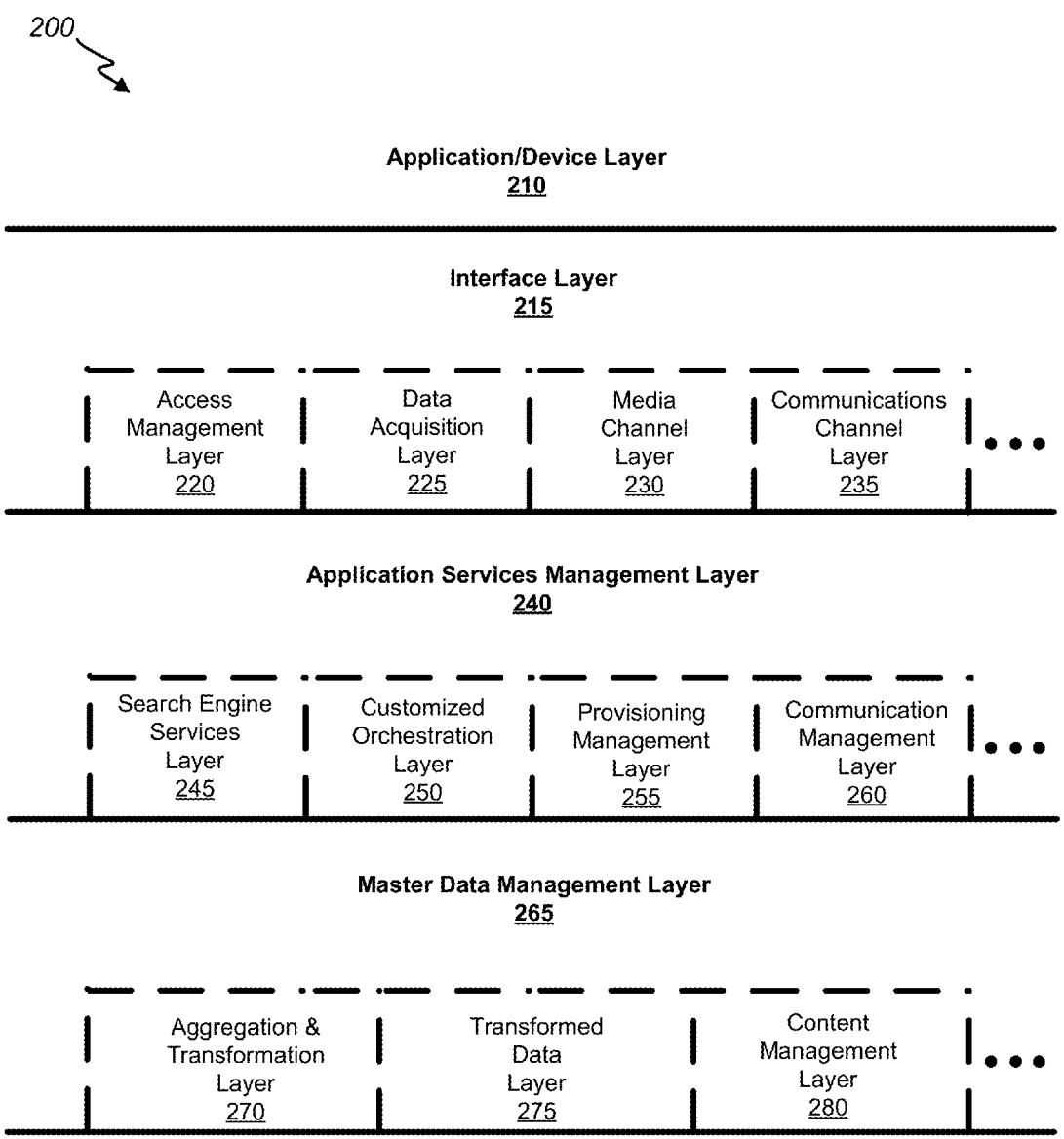
FIG. 2 shows a diagram of an architecture stack of the interaction infrastructure, in accordance with certain embodiments of the present disclosure, in accordance with certain embodiments of the present disclosure.

FIG. 2 shows a diagram of an architecture stack 200 of the interaction infrastructure 102, in accordance with certain embodiments of the present disclosure. While architecture stack 200 is illustrated as having a particular structure, it should be understood that certain embodiments may include other structures, including those with more or less layers than illustrated, in varying orientations and divisions. The architecture stack 200 may be implemented across a plurality of systems and/or subsystems corresponding to the interaction infrastructure 102. In some embodiments, a multi-layer part of the architecture stack 200 may be implemented at a single system or device within the interaction infrastructure 102.

The different layers of the architecture stack 200 are described generally herein with reference to FIG. 2 and in detail with reference to subsequent figures. From a high level perspective, the architecture stack 200 may include an application and/or device layer 210, an application services management layer 240, and/or a master data management layer 265. The application and/or device layer 210, the application services management layer 240, and/or the master data management layer 265 may include or otherwise interface with any of various sublayers. In some embodiments, the application and/or device layer 210, the application services management layer 240, and/or the master data management layer 265 may share resources and services with any one or combination of sublayers; and, in some embodiments, certain sublayers may share resources and services with certain other sublayers.

The application/device layer 210 may include user devices and applications for interacting with the other elements of the architecture stack 200 via the elements of an interface layer 215. For example, the applications may include web-based applications, entity portals, mobile applications, widgets, and the like for requesting services from and/or otherwise accessing the interaction infrastructure 102. These applications may run on one or more user devices. The user devices may be any suitable user device as detailed herein.

The interface layer 215 of the architecture stack 200 may provide interfaces for a user device to interact with the other elements of the architecture stack 200. For example, clients, entities, administrators, and others serviced by and/or otherwise associated with the interaction infrastructure 102 may utilize one or more user devices interacting within the application/device layer 210 to request services and/or access from an application services management layer 240. In some examples, a web-based search interface, a mobile application search interface, an orchestration platform interface, a provider dashboard interface, and/or the like may be provided.

In various embodiments, the interface layer 215 may include or otherwise interface with any one or combination of an access management layer 220, a data acquisition layer 225, a media channel layer 220, a communications channel layer 235, and/or the like layer in accordance with embodiments disclosed herein.

The architecture stack 200 may include an access management layer 220. The access management layer 220 may include elements to manage access to services and/or data. For example, the access management layer 220 may include elements to verify user login credentials, IP addresses associated with a user device, device IDs, telephone numbers, locations, and/or the like in order to provide certain services and/or access.

The architecture stack 200 may include a data acquisition layer 225. In some embodiments, the data acquisition layer 225 may be included in the application services management layer 240. The data acquisition layer 225 may receive data from various data sources to facilitate various embodiments disclosed herein. The any one or combination of data sources disclosed herein and/or the like, with aggregation being facilitated in some embodiments with any one or combination of interfaces 105, 107, 111, 114 and/or client devices 205, 207.

The architecture stack 200 may include a media channel layer 220. The media channel layer 220 may provide interfaces for the interaction infrastructure 102 to utilize various media channels. For example, services may be provided to clients, entities, administrators, and others serviced by and/or otherwise associated with the interaction infrastructure 102 by way of media channels of many various types including websites, mobile applications, social/provider network websites, cable and satellite television, telephone systems, video distribution, and print (e.g., newspapers and magazines).

The architecture stack 200 may include a communications channel layer 235. The communications channel layer 235 may provide interfaces for the interaction infrastructure 102 to centrally manage services based on real-time communications. For example, services may be provided to clients, entities, administrators, and others serviced by and/or otherwise associated with the interaction infrastructure 102 by way of tracking and/or handling of communications such as telephone calls, video calls, messages, chats, video conferencing, and/or the like in response to content objects presented through the various media channels.

In various embodiments, the application services management layer 240 may include or otherwise interface with any one or combination of a search engine services layer 245, a customized orchestration layer 250, a content provisioning management layer 255, a communications management layer 260, and/or the like layer in accordance with embodiments disclosed herein. In various embodiments, the search engine services layer 245 may include elements to provide effective search services to end-users, providers, and/or internal elements and/or users of the interaction infrastructure 102. In some embodiments, the search services may include geo-aware search services. The geo-aware search services may provide fast and efficient access to information tailored to particular geographies. In various embodiments, the master data management layer 265 may include or otherwise interface with any one or combination of an aggregation and transformation layer 270, a transformed data layer 275, a content management layer 280, and/or the like layer in accordance with embodiments disclosed herein.

Figure 4:
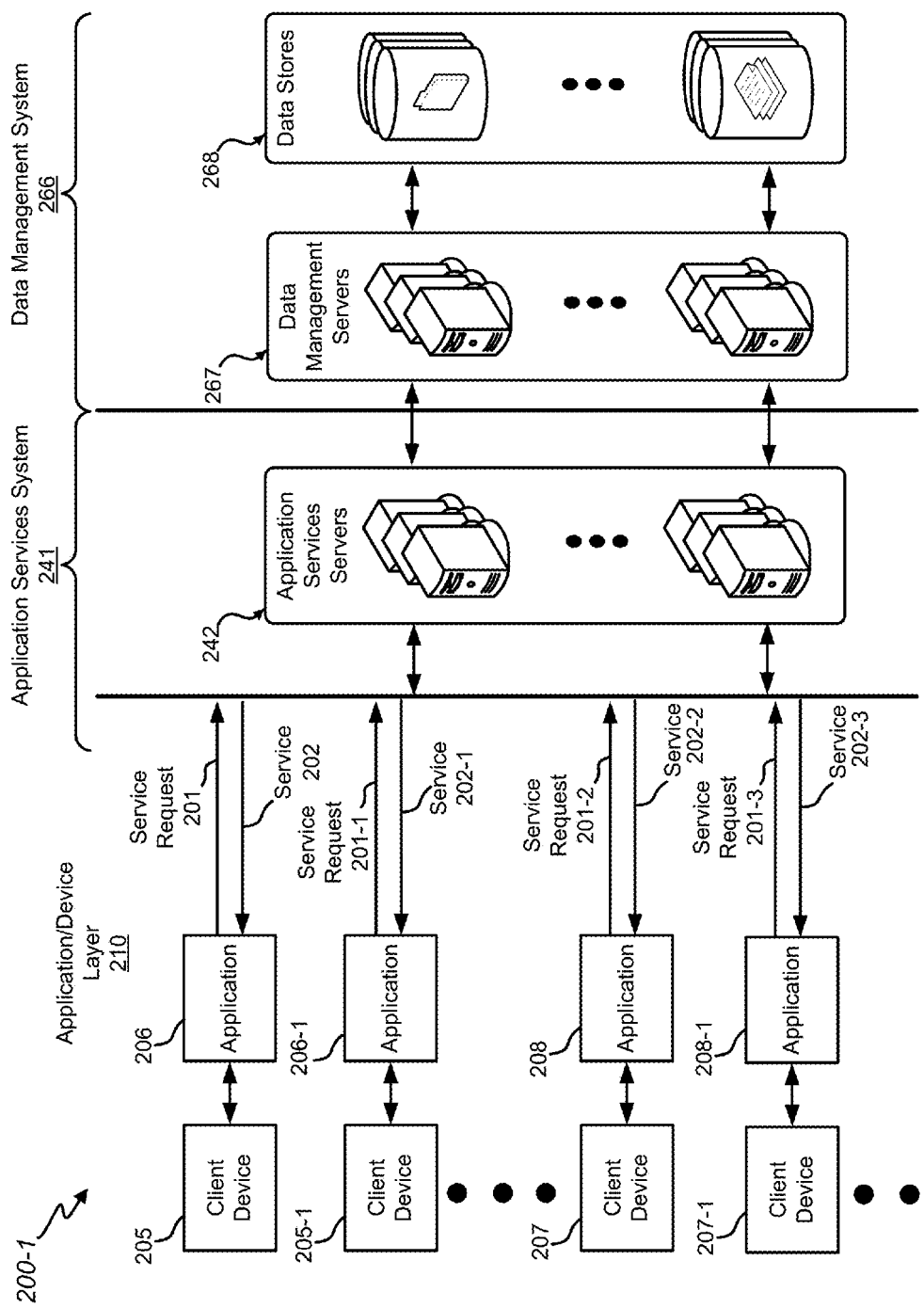
FIG. 4 shows a diagram of a portion of the architecture stack of the interaction infrastructure including certain aspects of an application/device layer, an application services system, and a data management system, in accordance with certain embodiments of the present disclosure.

FIG. 4 shows a diagram of a portion 200-1 of the architecture stack 200 of the interaction infrastructure 102, in accordance with certain embodiments of the present disclosure. The portion 200-1 at least partially includes the application/device layer 210, as wells as an application services system 241 and a data management system 266 of the interaction infrastructure 102. In some embodiments, the application services system 241 may correspond at least partially to the interface layer 215 and the application services management layer 240. In some embodiments, the data management system 266 may correspond at least partially to the master data management layer 265.

The application services system 241 may interface with the application/device layer 210 and the data management system 266. In some embodiments, the application services system 241 may include at least part of the application/device layer 210. The application services system 241 could be a middle tier of the interaction infrastructure 102 in some embodiments, with the data management system 266 corresponding to a back-end in some embodiments.

The application services system 241 and the data management system 266 each may be or include a server system 242 and a server system 267, respectively, that include one or more servers. In various embodiments, the server systems 242, 267 may include one or more computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, the server systems 242, 267 may be adapted to run one or more services, operations, processing, or software applications described herein. The server systems 242, 267 may run an operating system including any of those discussed above, as well as any commercially available server operating system. The server systems 242, 267 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Entity Machines), and the like.

In some embodiments, the server systems 242, 267 may include one or more applications to analyze and consolidate data feeds and/or event updates received from various data sources. As an example, data feeds and/or event updates may include, but are not limited to, application 206, 208 updates, Twitter® feeds, Facebook® updates, updates (real-time and/or otherwise) received from one or more third party information sources and/or continuous data streams, which may include real-time events related to sensor data applications, and/or the like. The server system 242 may also include one or more applications to display the data feeds and/or real-time events via the client devices 205, 207 and/or devices internal to the interaction infrastructure 102.

The application services system 241 and/or the data management system 266 may also include one or more data stores 268. The data stores 268 may include various forms of data storage including solid state storage, disk storage, databases (including relational, column, document, key-value and graph type databases) and cache. The data stores 268 may reside in a variety of locations, such as on a non-transitory storage medium local to (and/or resident in) the server systems 242, 267 and/or remote from the server systems 242, 267 and in communication with the server systems 242, 267 via a network-based or dedicated connection. In certain embodiments, the data stores 268 may reside in a storage-area network (SAN). Similarly, any necessary files for performing the functions attributed to the server systems 242, 267 may be stored locally on the server systems 242, 267 and/or remotely, as appropriate. In one set of embodiments, the data stores 268 may include relational databases that are adapted to store, update, and retrieve data in response to SQL-formatted commands. It should be appreciated that information corresponding to the repositories may be stored elsewhere and/or in other ways, or may not be stored, depending on the implementations chosen. Likewise, while various segregations of data corresponding to the repositories are provided herein, it should be appreciated that such examples are non-limiting, and some or all the data may be handled in any suitable manner.

In certain embodiments, the interaction infrastructure 102 may be implemented in or with a distributed computing and/or cloud computing environment with a plurality of servers and cloud-implemented processing, memory, and data resources. Thus, with accretion of service information, the system may allow for scaling out with additional processing resources, server resources, data storage resources, data management resources, and the like. Some embodiments may use different types of servers to service different types of client device 205, 207.

The interaction infrastructure 102 may provision services facilitated by one or more components of the interaction infrastructure 102, and, in some embodiments, one or more of the services may be offered as cloud services. A specific instantiation of a service 202 provided by the interaction infrastructure 102 may be referred to herein as a service instance 202. In some examples, a service 202 provided by the interaction infrastructure 102 may include provisioning of content objects, facilitating real-time communications, exposing features of a provider platform, exposing features of an orchestration platform, providing protected computer network access to data generated and/or transformed, and stored by the infrastructure system 102, for example, via a hosted database, a hosted web server, a hosted application server, a software application, and/or the like. In certain embodiments, the interaction infrastructure 102 may include a suite of applications, middleware, and database service offerings that are delivered to clients and/or providers.

In the illustrated embodiment, one or more client devices 205, 207 may be used by users to interact with the interaction infrastructure 102. Although only a limited number of the client devices 205, 207 is shown, any number of client devices 205, 207 may be supported. In various embodiments, the client devices 205 and/or 207 may correspond to devices supporting and/or accessing a client interface 105 and/or a service tool interface 107. In some embodiments, the client devices 205 and/or 207 may correspond to devices supporting and/or accessing a data acquisition interface 111 and/or a media channel interface 114.

In various embodiments, the client devices 205 and/or 207 may be configured to operate a client application such as a web browser, a proprietary client application, a web-based application, an entity portal, a mobile application, a widget, or some other application, which may be used by a user of the client device 205, 207 to interact with the interaction infrastructure 102 to use services provided by the interaction infrastructure 102. The client devices 205 and/or 207 may be portable handheld devices (e.g., an iPhone®, cellular telephone, an iPad®, computing tablet, a personal digital assistant (PDA)) or wearable devices (e.g., Google Glass® device), running software such as Microsoft Windows Mobile®, and/or a variety of mobile operating systems such as iOS, Windows Phone, Android, BlackBerry 10, Palm OS, and/or the like, and being Internet, e-mail, short message service (SMS), Blackberry®, and/or other communication protocol enabled. In some embodiments, one or more of the client devices 205 and/or 207 can be general purpose personal computers including, by way of example, personal computers and/or laptop computers running various versions of Microsoft Windows®, Apple Macintosh®, and/or Linux operating systems. In some embodiments, one or more of the client devices 205 and/or 207 can be workstation computers running any of a variety of commercially-available UNIX® or UNIX-like operating systems, including without limitation the variety of GNU/Linux operating systems, such as for example, Google Chrome OS. Alternatively, or in addition, one or more of the client devices 205 and/or 207 may be any other electronic device, such as a thin-client computer, an Internet-enabled gaming system (e.g., a Microsoft Xbox gaming console with or without a Kinect® gesture input device), and/or a personal messaging device, capable of communicating over network(s) 108.

Figure 3A:
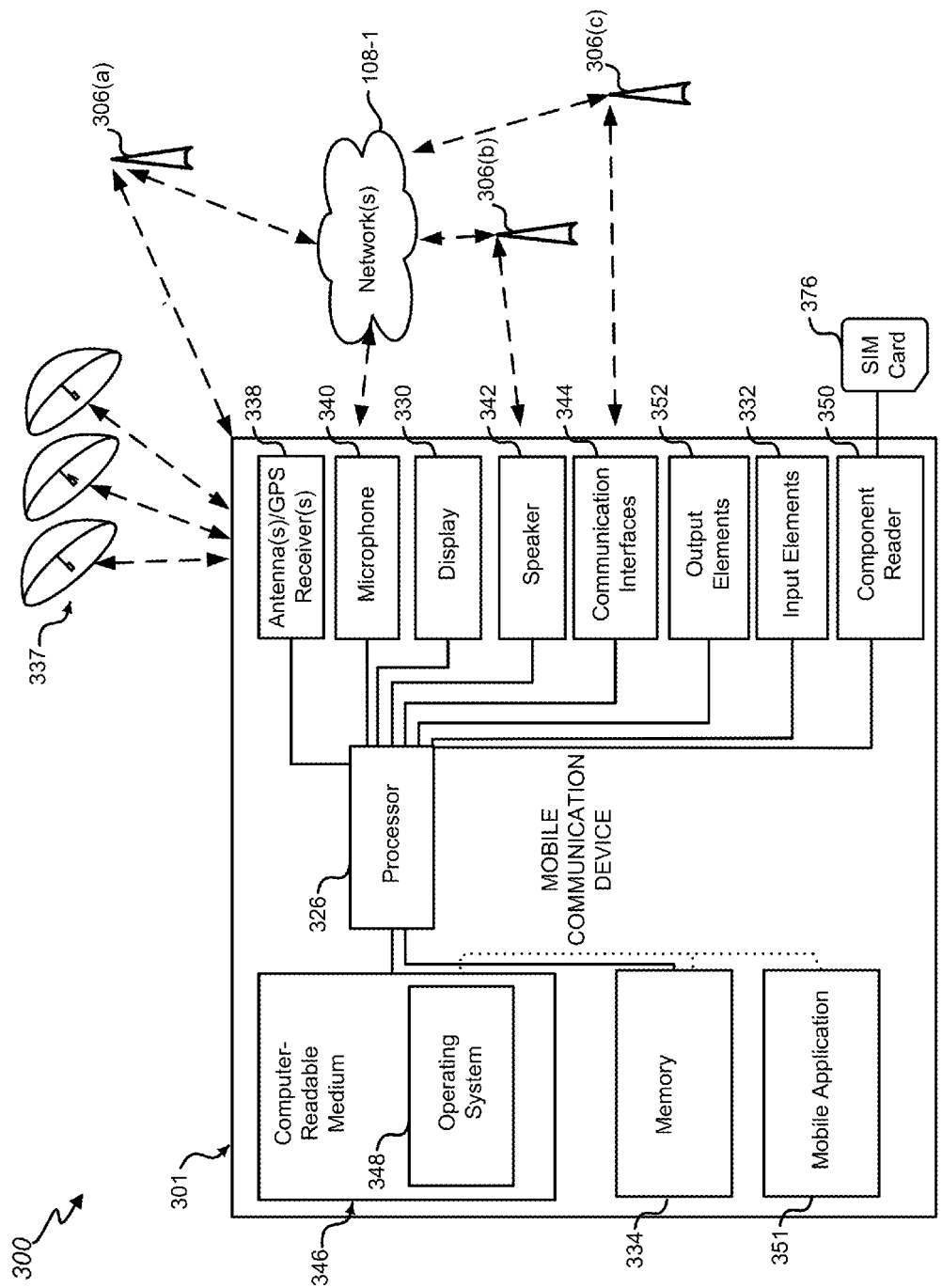
FIG. 3A is a block diagram of a system including one non-limiting example of a client device that corresponds to a mobile communication device, in accordance with certain embodiments of the present disclosure.

FIG. 3A is a block diagram of a system 300 including one non-limiting example of a client device 205 and/or 207 that corresponds to a mobile communication device 301, in accordance with certain embodiments of the present disclosure. The mobile communication device 301 may be a portable device suitable for sending and receiving information over a network in accordance with embodiments described herein. For example without limitation, in various embodiments, the mobile communication device 301 may include one or more variously referenced as a mobile phone, a cellular telephone, a smartphone (for example without limitation, a smart phone such as: the iPhone® phone available from Apple Inc. of Cupertino, Calif.; Android™ operating system-based phones, available from as Google of Mountain View, Calif.; and/or the like), a handheld mobile device, a tablet computer, a web pad, a personal digital assistant (PDA), a notebook computer, a handheld computer, a laptop computer, a vehicle computer, and/or the like.

In some embodiments, the mobile communication device 301 may be provided with a mobile application 351, which may correspond to a client application configured to run on the mobile communication device 301 to facilitate various embodiments of this disclosure. In various embodiments, the mobile application 351 may correspond to application 206 and/or 208. For example without limitation, the mobile application 351 may transform the mobile communication device 301 into a communication tracking facilitator. The mobile application 351 and the mobile communication device 301 may cooperate with the interaction infrastructure 102 to facilitate tracking and/or handling of communications (e.g., calls, messages, chats, video conferencing, and/or the like) in response to content objects presented through the mobile communication device 301. The mobile application 351 can be a computer program that can be installed and run on the mobile communication device 301.

In various embodiments, mobile communication device 301 configured with the mobile application 351 may provide one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like. As shown in FIG. 3, the mobile communication device 301 includes a display 320 and input elements 332 to allow a user to input information into the mobile communication device 301. By way of example without limitation, the input elements 332 may include one or more of a keypad, a trackball, a touchscreen, a touchpad, a pointing device, a microphone, a voice recognition device, or any other appropriate mechanism for the user to provide input. Further, the mobile communication device 301 the input elements 332 may include a communication component reader 350 for accepting a communication component such as a SIM card 376.

In some embodiments, the interaction infrastructure 102 may provide content objects of any suitable type to a user of the mobile communication device 301 through the mobile application 351. The mobile application 351 can include a utility that communicates with the interaction infrastructure 102 to control downloading, displaying, caching, and/or other operations concerning the handling of content objects. The mobile application 351 and the mobile communication device 301 may cooperate with the interaction infrastructure 102 to facilitate communication tracking in response to content objects displayed through the one or more additional applications.

In some embodiments, the client device 205 and/or 207 may include one or more additional applications, for example, that may be provided by one or more intermediaries and/or may provide functionality relating to one or more intermediaries. An intermediary may be any entity, including, for example, a news content provider, a social networking company, any entity, a gaming company, a music vendor, a multimedia content provider, and/or the like. Content objects (e.g., media objects, multimedia objects, electronic content objects, and/or the like) of any of various types may be displayed through the one or more additional applications. The mobile application 351 and the mobile communication device 301 may cooperate with the interaction infrastructure 102 to facilitate communication tracking in response to content objects displayed through the one or more additional applications. In some embodiments, the mobile application 351 could include a toolkit with client-side utility for interfacing with the one or more additional applications to facilitate tracking and/or call handling responsive to presented content. In some embodiments, the one or more additional applications could include the toolkit. In some embodiments, the mobile application 351 could be grafted into the one or more additional applications to provide tracking and/or communication handling functionalities. In some embodiments, the mobile application 351 could use a number of API translation profiles configured to allow interface with the one or more additional applications.

The user selection of a user-selectable option corresponding to a content object may involve any one or combination of various user inputs. The user selection may be in the form of a keyboard/keypad input, a touch pad input, a track ball input, a mouse input, a voice command, etc. For example, the content object may be selected by the user by pointing and clicking on the content object. As another example, the content object may be selected by an appropriate tap or movement applied to a touch screen or pad of the mobile communication device 301. The selection of a content object may initiate a voice call, video call, message, chat, and/or other communication. In some embodiments, a telephone number may be presented in content information in a format such that, when the user selects a communication reference, the client device (e.g., a cellular phone or a computer) dials a telephone number corresponding to the communication reference. For example, the call could have been initiated by end-user selecting a click-to-call option displayed via the user device. In some embodiments, user devices can automatically dial the telephone number. For example, a Dual Tone Multi-Frequency (DTMF) generator can dial a phone number. In some embodiments, the user device may initiate the phone call through a VoIP system.

In some embodiments, the mobile application 351 can run continuously (e.g., in the background) or at other times, such as when the mobile application 351 is launched by an end-user. In certain embodiments, the mobile application 351 can automatically run each time that a user accesses the one or more additional applications or selects a content object. The mobile application 351 may be provided in any suitable way. For non-limiting example, the mobile application 351 may be made available from the interaction infrastructure 102, a website, an application store, etc. for download to the mobile communication device 301; alternatively, it may be pre-installed on the mobile communication device 301. In some embodiments, the mobile application 351 can be pre-installed on the device platform by a mobile communication device manufacturer or carrier. In some embodiments, a mobile application 351 can be downloaded and installed by an end-user on their client device 205 and/or 207.

The mobile communication device 301 includes a memory 334 communicatively coupled to a processor 336 (e.g., a microprocessor) for processing the functions of the mobile communication device 301. The mobile communication device 301 may include at least one antenna 338 for wireless data transfer to communicate through a cellular network, a wireless provider network, and/or a mobile operator network, such as GSM, for example without limitation, to send and receive Short Message Service (SMS) messages or Unstructured Supplementary Service Data (USSD) messages. The mobile communication device 301 may also include a microphone 340 to allow a user to transmit voice communication through the mobile communication device 301, and a speaker 342 to allow the user to hear voice communication. The antenna 338 may include a cellular antenna (e.g., for sending and receiving cellular voice and data communication, such as through a network such as a 3G or 4G network). In addition, the mobile communication device 301 may include one or more interfaces in addition to the antenna 338, e.g., a wireless interface coupled to an antenna. The communications interfaces 344 can provide a near field communication interface (e.g., contactless interface, Bluetooth, optical interface, etc.) and/or wireless communications interfaces capable of communicating through a cellular network, such as GSM, or through Wi-Fi, such as with a wireless local area network (WLAN). Accordingly, the mobile communication device 301 may be capable of transmitting and receiving information wirelessly through both short range, radio frequency (RF) and cellular and Wi-Fi connections.

Additionally, the mobile communication device 301 can be capable of communicating with a Global Positioning System (GPS) 337 in order to determine to location of the mobile communication device 301. The antenna 338 may be a GPS receiver or otherwise include a GPS receiver. In various embodiments contemplated herein, communication with the mobile communication device 301 may be conducted with a single antenna configured for multiple purposes (e.g., cellular, GPS, etc.), or with further interfaces (e.g., three, four, or more separate interfaces).

The mobile communication device 301 can also include at least one computer-readable medium 346 coupled to the processor 336, which stores application programs and other computer code instructions for operating the device, such as an operating system (OS) 348. In some embodiments, the mobile application 351 may be stored in the memory 334 and/or computer-readable media 346. In some embodiments, the mobile application 351 may be stored on the SIM card 376. In some embodiments, mobile communication device 301 may have cryptographic capabilities to send encrypted communications and/or messages protected with message hash codes or authentication codes. Again, the example of mobile communication device 301 is non-limiting. Other devices, such as those addressed herein, may interact with the interaction infrastructure 102.

The mobile communication device 301 may access the network 108 through a wireless link to an access point. For example, a mobile communication device 301 may access the network 108 through one or more of access point 306(*a*), access point 306(*b*), access point 306(*c*), and/or any other suitable access point(s). The access points 306 may be of any suitable type or types. For example, an access point 306 may be a cellular base station, an access point for wireless local area network (e.g., a WiFi access point), an access point for wireless personal area network (e.g., a Bluetooth access point), etc. The access point 306 may connect the mobile communication device 301 to the network 108, which may include the Internet, an intranet, a local area network, a public switched telephone network (PSTN), private communication networks, etc. In some embodiments, access point(s) 306 may be used in obtaining location information for the mobile communication device 301, as described further herein.

Figure 3B:
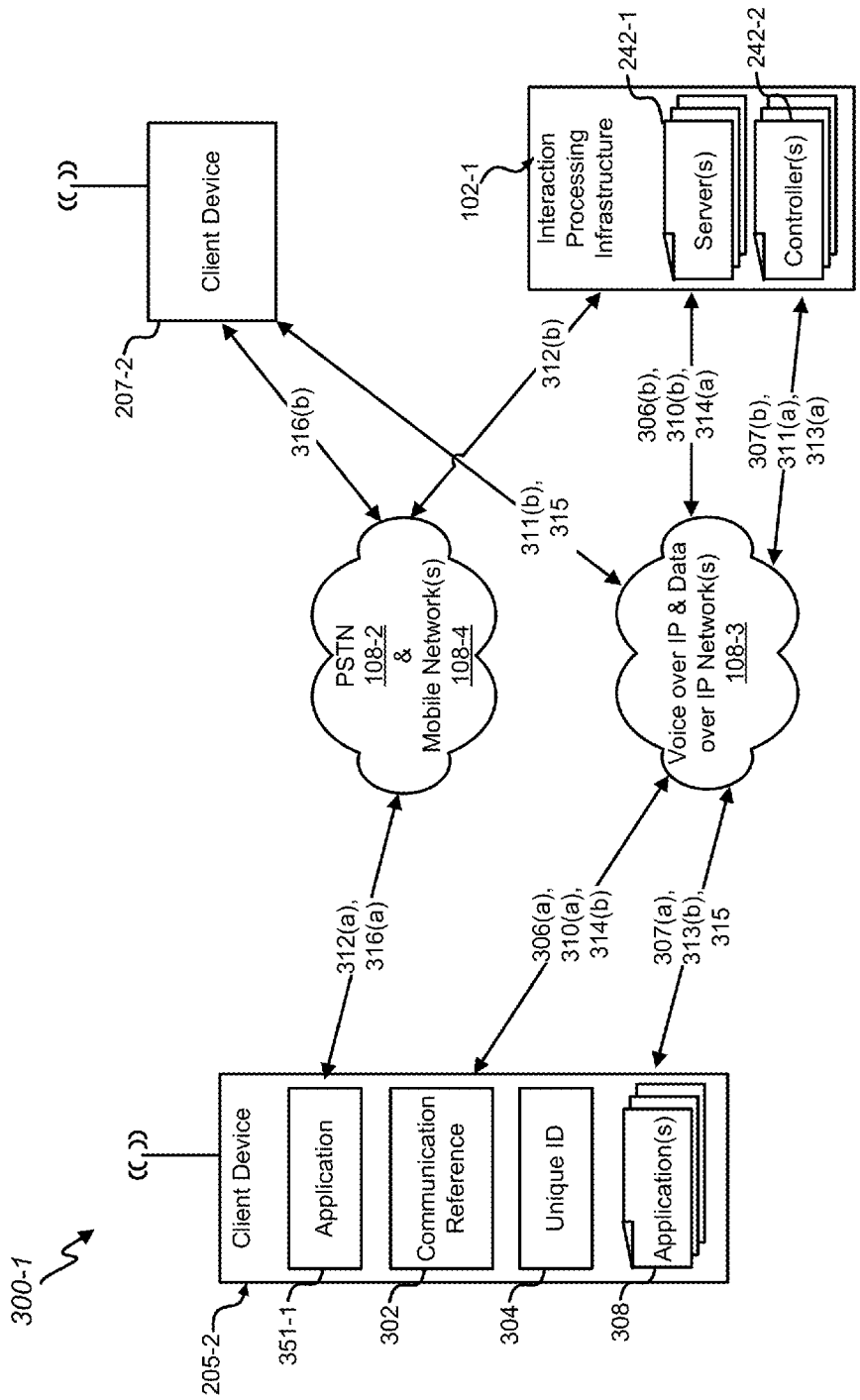
FIG. 3B depicts a high-level block diagram of a system for communication routing and tracking, in accordance with certain embodiments of the present disclosure.

FIG. 3B depicts a high-level block diagram of a system 300-1 for communication routing and tracking, in accordance with certain embodiments of the present disclosure. Certain embodiments may allow for tracking of a great number of providers, where the tracking not limited by a telephone number inventory. Previously, call tracking numbers were essential for call tracking, being the only means to tie an offline activity to a phone call that can be tracked. Static phone numbers were provisioned for call tracking so that, when a call to a particular number came through the PSTN, the provider to which the number was assigned had to be determined. However, certain embodiments may provide for technological improvements that allow for control over sequences of activities after a user initiates a response to a particularized content object.

The client device 205 configured with the application 351-1 may be configured to associate the application 351-1 with a communication reference 302 of the client device 205. In some embodiments, the communication reference 302 is a telephone number associated with the client device 205. In some embodiments, the application 351-1 may gather the telephone number from the device, a carrier associated with device subscriber, or via input of the end-user. In some embodiments, the application 351-1 may register unique identification information 304 associated with the client device 205. For example without limitation, the application 351-1 may gather the information 304 from the client device 205. In some embodiments, unique identification information 304 may be gathered from a SIM card 376 or another card of the client device 205. In some embodiments, unique identification information 304 may be gathered from other components of the client device 205.

The unique identification information 304 may be sent by the client device 205 to the infrastructure 102. The unique identification information 304 could include any suitable subscriber identity information. In some embodiments, the unique identifier may include an IMSI. In some embodiments, the unique identifier may be derived from the IMSI such that the actual IMSI is not sent. In some embodiments, a hash code based on the IMSI may be sent. The unique identifier may indicate associated network location information in some embodiments.

In some embodiments, to provision tracking service, the client device 205 configured with the application 351-1 may send provisioning information to the infrastructure 102. The provisioning information may indicate communication reference information 302. For example without limitation, as indicated by interactions 306(*a*) and 306(*b*), the client device 205 may send phone number information to the infrastructure 102. In some embodiments, the provisioning information could be sent to a MSC/HLR, which could then convey the information to the infrastructure 102. In some embodiments, the provisioning information could be sent via SMS messaging, as indicated by interactions 312(*a*) and 312(*b*). For example without limitation, SMS messaging may be sent to the infrastructure 102 via one or more of a home carrier MSC, a home carrier SMSC, an intercarrier SMS gateway, serving carrier SMSC, a mobile network 108-4, a serving carrier MSC/VLR, and/or the like.

Provisioning could be initiated with launching/installing the application 351-1. The provisioning information may be sent to the infrastructure 102 via an Internet Protocol (IP) message via one or more IP networks, such as network(s) 108-3. In some embodiments, the provisioning information may include the subscriber's Mobile Directory Number (MDN) for CDMA networks or Mobile Subscriber Integrated Services Digital Network Number (MSISDN) for GSM networks. In some embodiments, the client device 205 configured with the application 351-1 may also send provisioning information that includes the device's unique equipment identity 304. When necessary, the infrastructure 102 could request the subscriber's unique subscriber identity from the home location register associated with the MDN or MSISDN. The infrastructure 102 may store the provisioning information in one or more data repositories 140. In some embodiments, after the infrastructure 102 receives the provisioning information, it may send a confirmation message to the application 351-1, as indicated by interfaces 314(*a*) and 314(*b*).

As discussed herein, in some embodiments, the infrastructure 102 may provide particularized content objects through the application 351-1. In some embodiments, particularized content objects may be displayed through the one or more additional applications 308 of the client device 205, such as a browser, an SMS application, a push notification, an email application, a social media application, etc. In some embodiments, the application 351-1 could include a toolkit with client-side utility for interfacing with the one or more additional applications to facilitate tracking and/or call handling responsive to presented particularized content objects. Various embodiments may present particularized content objects in any one or combination of ways. In some embodiments, the one or more additional applications 308 could include a toolkit for interfacing with the application 351-1. In some embodiments, the application 351-1 could be grafted into the one or more additional applications to provide tracking and/or call handling functionalities. In some embodiments, the application 351-1 could use one or more API translation profiles configured to allow interface with the one or more additional applications 308.

The end-user may select a user-selectable call option presented with the client device 205 responsive to a particularized content object presented via the client device 205 either via the application 351-1 or via another application, in accordance with various embodiments. In some embodiments, the user-selectable call option and the particularized content object may be integrated, for example without limitation, with a particularized content object with a click-to-call option. In some embodiments, responsive to the user selection, a call may be placed to a provider communication device 207, as indicated by interactions 316(*a*) and 316(*b*).

Responsive to the user selection, the client device 205 configured with the application 351-1 may send one or more communications corresponding to the particularized content object, via a data network, to the infrastructure 102, as indicated by interactions 310(*a*) and 310(*b*). By way of example without limitation, the one or more communications may include one or more IP messages sent via one or more IP networks, such as network(s) 108-3. The one or more messages may convey tracking information. The tracking information could indicate call information. By way of example without limitation, the call information could correspond to the telephone number, the subscriber identity, the device identification, the IMSI, and/or any suitable information associated with the client device 205.

In some embodiments, particularized content objects are presented to a user via the application 351-1 such that the application 351-1 is configured to gather tracking information about those particularized content objects. In some embodiments, calls are placed or at least initiated via the application 351-1 such that the application 351-1 is configured to gather tracking information about those calls. In some embodiments, the application 351-1 receives, pulls, extracts, and/or listens to information from one or more applications 308 of the client device 205 to gather tracking information, where particularized content objects are presented via the one or more applications 308 and/or calls are placed or at least initiated via the one or more applications 308. In some embodiments, tracking information may include call information gathered from a phone application 308 of the client device 205.

The call information could include information indicating a successfully connected call, a call duration, an indication that a call was not connected, information indicating a call was missed by the callee, an indication that a busy tone was received, an indication that a call was dropped, and/or the like. The call information could include a callee communication reference. For example without limitation, callee communication reference information could include one or more of a telephone number, IP address, etc. of the provider/service provider/representative linked to the particularized content object and/or the like.

In some embodiments, the application 351-1 may be configured to gather call information about call-backs from provider representatives. Having logged the callee communication reference, the application 351-1 could identify an incoming call from the previously called representative. In various embodiments, in the same or similar manner with respect to tracking information for calls initiated by the user, any suitable tracking information about the call-back may be collected.

In some embodiments, tracking information may be inferred, for example, in the absence of explicit tracking information. For example without limitation, the application 351-1 and/or the infrastructure 102 may infer from a short call duration that a call was missed by a representative of a provider. The application 351-1 and/or the infrastructure 102 may infer from subsequent user selections of the application 351-1 and/or other applications 308 within a short time period after the initial user selection that a call was potentially missed by a representative of a provider. Accordingly, the application 351-1 may send one or more communications via a data network that include any suitable tracking information to inform the infrastructure 102, which may include application server(s), network switch(es), etc., about user action relating to particularized content objects.

In various embodiments, tracking information may include any suitable about particular particularized content objects. Tracking information could include, for example without limitation, any reference information for the particularized content object and/or other information identifying a particularized content object, a provider, etc. In some embodiments, tracking information could include information relating to content of particularized content objects, for example without limitation, content details such as a value and/or offer associated with a particularized content object; a date associated with a particularized content object, such as an expiration date, an effective offer date or date range; products and/or services to which a particularized content object is directed; and/or the like.

In some embodiments, tracking information could include information relating to time information associated with a particularized content object. For example without limitation, tracking information could include any information relating a time when a particularized content object was presented to a user. In some embodiments, tracking information could include information relating to particularized content object presentation details. For example without limitation, tracking information could include any information relating to the time, manner, and/or place of presentation of a particularized content object. Tracking information could include any information indicating the intermediary of a particularized content object. In some embodiments, tracking information could include location information relating to location of the client device 205. In some embodiments, certain features discussed with reference to client device 205 could likewise apply to the provider communication device 207, which could have installed thereon an application 351 to facilitate the features.

In some embodiments, the infrastructure 102-1 receives, places, and/or routes telephone calls over packet switched networks. In some embodiments, the infrastructure 102 may provide packet-switched connections between callers and provider representatives, which correspond to the destinations of click-to-call requests. In some embodiments, the infrastructure 102 can place and/or receive direct VoIP calls to/from the callers/provider representatives. In some embodiments, the infrastructure 102 may use the data network 108-3 completely (along with one or more access points 306 via 3G/4G/Wi-Fi, e.g.), as opposed to through the PSTN 108-2, thereby excluding other carriers from handling the call. With the servers/switches of the infrastructure 102 routing calls via the data network 108-3, complete call tracking may be achieved without the need of a call tracking number. Accordingly, certain embodiments may allow for tracking of a great number of providers, where the tracking not limited by a telephone number inventory.

In some embodiments, the client device 205 configured with the application 351-1 may provide a softphone dedicated to the device that facilitates communications with provider representatives and the infrastructure 102, as well as call tracking, via the data network 108-3. In some embodiments, the client device 205 configured with the application 351-1 may send provisioning information to the infrastructure 102-3 that may indicate communication reference information 302 and/or identification information 304, as discussed herein. The communication reference information 302 may be stored in the application 351-1 and/or the infrastructure 102-3. In some embodiments, communication reference information 302 could correspond to dedicated reference information for a softphone dedicated to the device.

In some embodiments, to make a voice connection responsive to a click-to-call selection by the user of the client device 205, one or more IP messages may be sent via one or more access points to one or more servers/switches of the infrastructure 102, as indicated by interactions 307(a) and 307(b). The one or more IP messages may indicate the communication reference information 302, the identification information 304, and/or another identifier (which could be an authentication token/key, in some embodiments) from which phone number information of the client device 205 may be identified and/or determined. The one or more IP messages could indicate the phone number information for a provider representative corresponding to the particularized content object selected. Alternatively, an identifier of the provider representative and/or particularized content object could be indicated, and the infrastructure 102 could determine the phone number information for the corresponding provider representative, e.g., based on information stored for the provider. In some embodiments, one or more SIP requests may be sent via one or more access points to one or more servers/switches of the infrastructure 102. By routing of the messaging to the infrastructure 102, other telecommunication carriers could be excluded.

In some embodiments, the infrastructure 102 can place separate VoIP calls over the IP network(s) 108-3 to the provider representative (311(*a*), (*b*)) and the caller (313(*a*), (*b*)), and then bridge the calls (315). Accordingly, each of the provider representative and the caller receives an inbound call (311(*a*), (*b*)) placed via the packet switched network 108-3, and the infrastructure 102 joins the separate calls. In some embodiments, the two calls are merged responsive to the each of the caller and the provider representative accepting the call.

In some embodiments, to make a voice connection responsive to a click-to-call selection by the user of the client device 205, the infrastructure 102 can route a VoIP call established with the caller over the IP network(s) 108-3 to the provider representative. Accordingly, only the provider representative receives an inbound call. For example without limitation, a SIP request from the client device 205 could be reconfigured and redirected based at least in part on the phone number of the provider representative. A SIP request could be configured so that response messaging is routed to the client device 205 and/or the infrastructure 102. In some embodiments, the call from the caller is connected to the provider representative responsive to the provider representative accepting the call.

In various embodiments, the infrastructure 102 may interface with the caller and/or the provider representative using one or more suitable types of internet telephony systems, such as, for example, SIP-based internet telephony, H.323-based internet telephony, and/or the like. Accordingly, various embodiments of the infrastructure 102 may support multiple, different types of internet telephony systems. In some embodiments, the infrastructure 102 may include one or more servers 242-1 and one or more controllers 242-2, which may be SIP servers and session border controllers, in order to interface with the IP network(s) 108-3, control messaging, and facilitate set-up, voice conversation, and tear-down of VoIP calls to or from the infrastructure 102. The one or more controllers 242-2 could handle processing and routing of incoming requests from the client device 205.

In various embodiments, the application 351-1 and/or the infrastructure 102 may track information about calls, which information may include any suitable about particular particularized content objects, as discussed herein. For example without limitation, the application 351-1 and/or the infrastructure 102 may be configured to track information relating to particularized content objects and calls to facilitate the gathering, processing, evaluating, and presenting of information for a provider interface, as discussed in the following. In some embodiments, certain features discussed with reference to client device 205 could likewise apply to the provider communication device 207, which could have installed thereon an application 351 to facilitate the features.

Figure 5:
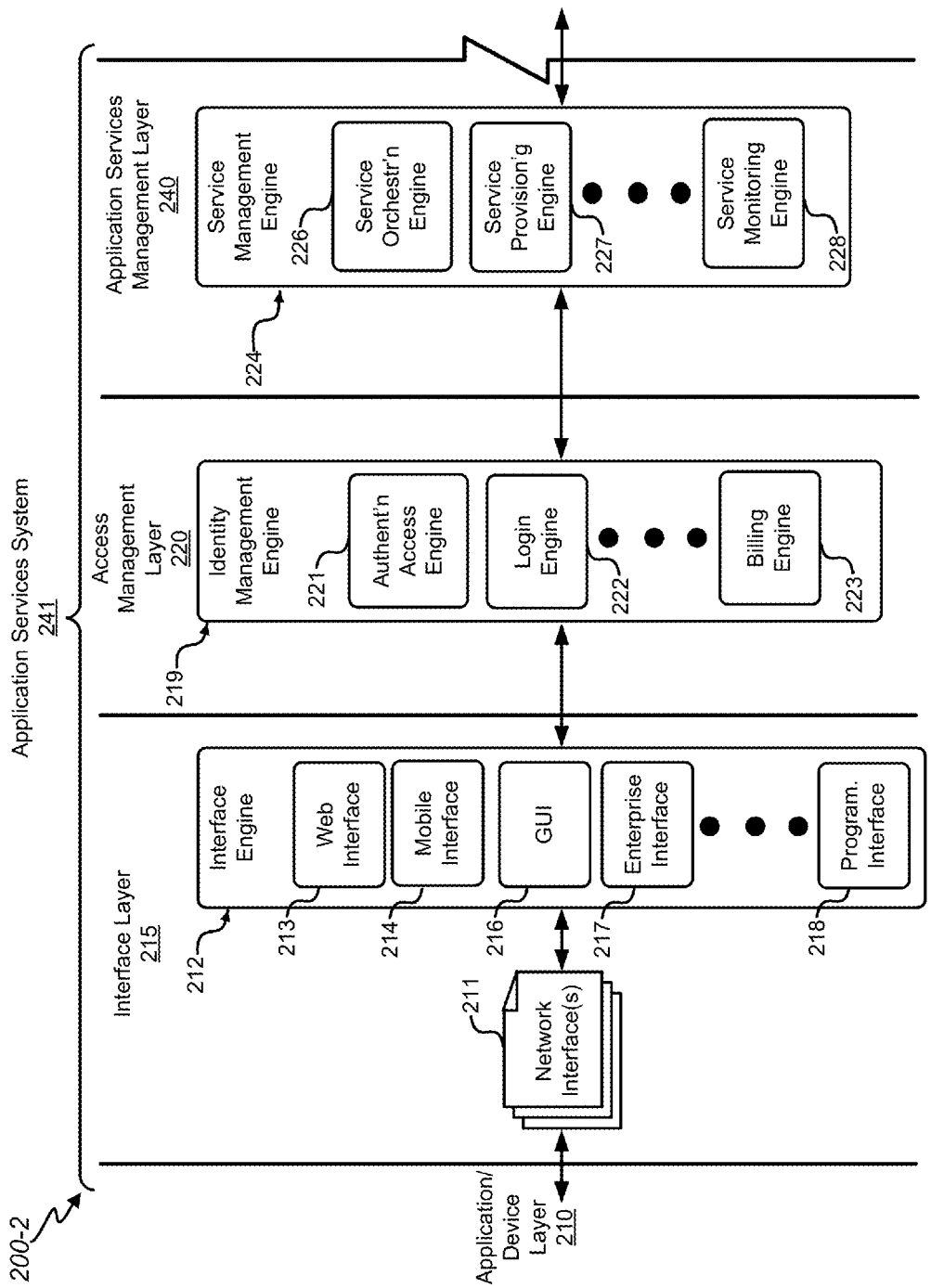
FIG. 5 shows a diagram of another portion of the architecture stack of the interaction infrastructure including certain aspects of the application services system, in accordance with certain embodiments of the present disclosure.

FIG. 5 shows a diagram of a portion 200-2 of the architecture stack 200 of the interaction infrastructure 102, in accordance with certain embodiments of the present disclosure. The portion 200-2 at least partially includes the interface layer 215, the access management layer 220, and the application services management layer 240. In some embodiments, the application services system 241 may correspond at least partially to the interface layer 215, the access management layer 220, and the application services management layer 240. While engines, repositories, and other components are described separately in this disclosure, it should be appreciated that the components may be combined and/or implemented differently in any combination to provide certain features in various embodiments. In various embodiments, different processes running on one or more shared resources may implement some of the components.

The interaction processing infrastructure 102 may include one or more network interfaces 211 communicatively coupled to one or more servers, which may include communication servers, web servers, gateways, application servers, database servers, and/or one or more other types of servers. The network interface(s) 211 may include any suitable input/output module or other system/device operable to serve as an interface between one or more components of the interaction infrastructure 102 and the network 108. The interaction infrastructure 102 may use the network interfaces 211 to communicate over the network 108 using any suitable transmission protocol and/or standard.

The interface layer 215 may include one or more interface engines 212. The interface engine 212 may be configured to generate one or more interfaces 105, 107, 111, 114 (e.g., web interfaces 213, mobile app interfaces 214, graphical user interfaces 216, enterprise application interfaces 217, programmatic interfaces 218, and/or the like) to enable data to flow to client devices 205, 207 via respective applications 206, 208. In various embodiments, the interfaces of interface engine 212 may be embodied in hardware and/or software. The interface engine 212 may include logic to send, present, and receive information, with one or more of the interfaces to/from one or more end-users, service providers, and/or data sources. The interface engine 212 may utilize one or more network interfaces to transfer and receive information through the network 108. The interaction infrastructure 102 may pull and/or push information from those entities.

Generally, interfaces may be configured to receive user input, present dynamic presentations that depend on user input, and otherwise respond to user input. In some examples, such input may be provided via one or more input devices (e.g., a keyboard, touchscreen, joystick, mouse, microphone, devices capable of capturing inputs, and the like) operated by one or more users of user devices. Output may be provided via one or more output devices (e.g., a display or speaker). The web interfaces 213 and mobile interfaces 214 may include any suitable web interface and mobile interface configured to interact with elements of the interaction infrastructure 102. The graphical user interfaces 216 may include any suitable graphical user interface configured to interact with elements of the interaction infrastructure 102. The enterprise interface 217 may include internal interfaces for accessing element of the interaction infrastructure 102 via an internal network of an enterprise. The programmatic interfaces 218 may include one or a combination of an API, a programmatic user interface, and/or other similar interfaces for defining core functions for accessing elements of the interaction infrastructure 102. A programmatic interface 218, for example, may specify software components in terms of associated operations.

Elements of the interface layer 215, for example, the interface engine 212, may communicate with calls and inputs directed to and/or received from the access management layer 220. In some embodiments, the access management layer 220 may include one or more identity management engines 219. Generally, the identity management engine 219 can be configured to provide identity services, such as access management and authorization services for end-users and/or providers serviced by the interaction infrastructure 102. In some embodiments, the identity management engine 219 may control information about end-users and providers that utilize the services provided by the interaction infrastructure 102. The control information may include information that authenticates the identities of end-users and/or providers and that specifies authorized actions with respect to various system resources and services.

In some embodiments, the identity management engine 219 may include logic for implementing features in various embodiments. By way of example without limitation, the identity management engine 219 may include logic one or more aspects of: handling user registration; managing account creation, updates, authentication, handling; and/or the like. The identity management engine 219 may be configured for acquiring, processing, formatting, and/or storing authentication information in the one or more authentication information repositories 257 (described further below).

In some embodiments, the identity management engine 219 may include a plurality of engines configured to manage different aspects of interacting with elements of the interaction infrastructure 102, such as user interactions with applications serviced by the interaction infrastructure 102. The engines may include, for example, an authentication access engine 221, a login engine 222, and a billing engine 223. The different engines of the identity management engine 219 can define routines, protocols, standards, and/or the like for interacting with elements of the interaction infrastructure 102. The authentication access engine 221 may evaluate rules and conditions under which users may access elements of the interaction infrastructure 102. These rules and conditions may be user-defined (e.g., by an administrator or reviewer), learned over time, and/or may be dynamically updated and/or evaluated based on characteristics of the user or the user's device attempting to access the interaction infrastructure 102. The login engine 222 may evaluate the rules and conditions under which users are able to log in to the interaction system or access applications associated with the interaction system. Thus, while authentication access engine 221 may evaluate the rules to determine which users may access the interaction infrastructure 102, the login engine 222 may evaluate the particular credentials, profiles, etc. associated with each authenticated user.

The application services management layer 240 may include one or more service management engines 224. The service management engines 224 may include one or more service orchestration engines 226, one or more service provisioning engines 227, and/or one or more service monitoring engines 228. By way of example without limitation, in some embodiments, a client device 205 or 207 running an application 206 or 208 may interact with the interaction infrastructure 102 by transmitting a service request 201 to the interaction infrastructure 102 for one or more services provided by the interaction infrastructure 102. In some embodiments, the service request 201 may be received via an interface facilitated by the interface engine 212. The service request 201 may be processed by the service management engine 224 and, consequent to the processing, information identifying one or more services and, in some embodiments, information uniquely identifying a user. The service orchestration engine 226 may utilize the information to orchestrate the provisioning of services and resources responsive to the service request 201. In some embodiments, the service orchestration engine 226 may orchestrate the provisioning of services and resources using the service provisioning engine 227. In certain embodiments, the service orchestration engine 226 may enable the management of processes associated with each service request 201 and may apply entity logic to determine whether and how a service 202 should be provisioned. The service orchestration engine 226 may send a request to the service provisioning engine 227 to prompt the service provisioning engine 227 to allocate resources and configure those resources needed for the service 202. The service 202 may be tracked by the service monitoring engine 228. In some instances, the service monitoring engine 228 may be configured to collect usage statistics for the services 202.

Figure 6:
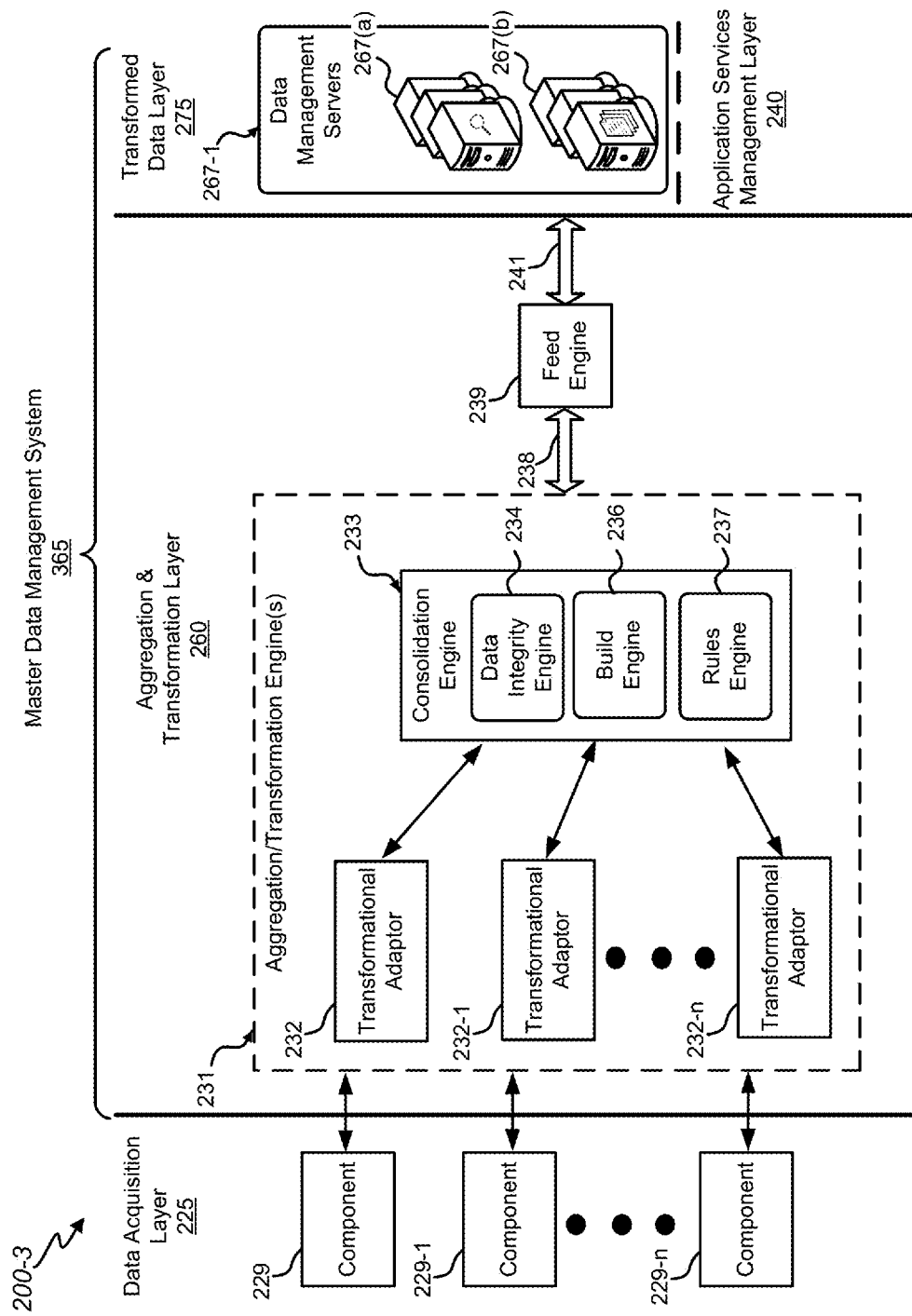
FIG. 6 shows a diagram of another portion of the architecture stack of the interaction infrastructure including certain aspects of a master data management system, in accordance with certain embodiments of the present disclosure.

FIG. 6 shows a diagram of another portion 200-3 of the architecture stack 200 of the interaction infrastructure 102, in accordance with certain embodiments of the present disclosure. In particular, the portion 200-3 at least in partially includes the data acquisition layer 225, the aggregation and transformation layer 260, and the transformed data layer 275. The data acquisition layer 225 may receive data from components 229. In various embodiments, the components 229 may correspond to any one or combination of data sources disclosed herein and/or the like, with aggregation being facilitated in some embodiments with any one or combination of interfaces 105, 107, 111, 114 and/or client devices 205, 207. In some embodiments, the components 229 may include complimentary layers to facilitate data transmission, such as a transmission layer, generation layer, and/or a receiving layer to communicate and/or receive data via the data acquisition layer 225. In various embodiments, the input from the components 229 may correspond to any one or combination of raw data, unstructured data, structured data, information, and/or content which may include media content, text, documents, files, instructions, code, executable files, images, video, audio, and/or any other suitable content suitable for embodiments of the present disclosure. For example, data from 20, 200, or any number of different sources may be merged together with data generated internally, data previously received, data from third parties, etc. The data could relate to end-users, providers, entities, geographic locations, demographic information, and/or the like. For example, the aggregation and transformation layer 260 may identify which data and records are about the same entity and may merge characteristics from different sources into one composite object that can be used by the application services as a basis for services provided.

The aggregation and transformation layer 260 may provide a pipeline that processes data input from the components 229, applies rules, transforms the data, feeds the transformed data to the transformed data layer 275 and/or the application services management layer 240. The aggregation and transformation layer 260 may include one or more aggregation and/or transformation engines 231. In various embodiments, the aggregation and/or transformation engine 231 may correspond to an integral engine or separate engines working in conjunction. The aggregation/transformation engine 231 may transform, translate, or otherwise adjust data collected.

In some embodiments, two or more of the components 229 may generate data according to different formats. The data can then be transformed, translated, or otherwise adjusted by the engine 231. For example, acquired data may be converted from a first format to a second format using one or more conversion rules, which may be user-defined, heuristic, and/or machine-learned. In some embodiments, the transformation engine 231 may perform similar operations with respect to other data generated by elements of the interaction infrastructure 102.

In some embodiments, the aggregation and/or transformation engines 231 may include one or more transformational adaptors 232. In some embodiments, one or more transformational adaptors 232 may be associated with the components 229 to effect the transformations. The transformational adaptors 232 may be implemented, in various embodiments, in hardware and/or software. In some embodiments, a transformational adaptor 232 may include a hardware device and/or software component that transforms, translates, converts, or otherwise adjusts the acquired data. In various embodiments, the adjustment operations may be executed within the data acquisition layer 225 and/or the transformation layer 260.

A consolidation engine 233 may process manifold data sets that may, for instance, come from different sources or the same source, for example, by way of one or more updates to data previously provided by a particular source, and the consolidation engine 233 may consolidate the data sets to form a composite data set. The consolidation may include organizing, categorizing, qualifying, and/or comparing the sets of information; detecting, identifying, and/or handling errors/discrepancies; and/or otherwise processing the data sets. In some embodiments, the consolidation engine 233 may identify subset of entities that are more important than the rest, may process data to identify relations to at least one entity of the subset of entities, and may process data having such relation first. In some embodiments, the consolidation engine 233 may only consolidate the data having such relation and may disregard and/or dispose of data that does not possess such relation.

With certain embodiments, a data integrity engine 234 with one or more processors may check data sets to ensure quality of the data. The data integrity engine 234 may assess each piece of information relating to an aspect (e.g., data relating to a listing of information for an entity, such name, location, reviews, ratings, etc.) and may assign a weight to the information according to a score. Any suitable scoring system may be used. Missing information, for example, could have a lower score than non-missing information; and the missing information could be scored even lower, the more important the information is to the aspect. Information may be weighted according to the source. For example, in some instances, information relating to a company that is gathered from the company's website may be weighted higher or lower relative to information gathered from a third party's website; tracking data gathered from an end-user device, for example, may be considered more reliable than corresponding/conflicting information from a third party directory service. Scoring profiles (e.g., compiled for end-users, providers, entities, etc.) based the information based upon the underlying reliability of information may avoid provisioning of misdirected, redundant, unwanted, and/or unnecessary services.

In certain embodiments, the data integrity engine 234 may examine items of information and assign scores according to how important such information is to services, generally. The data integrity engine 234 may take into consideration service categories. Data pertinent to service categories may be prepared as a basis for provisioning services corresponding to particular categories. In certain embodiments, the data integrity engine 234 may adjust scoring of information in view of a specific services and/or specific categories of services. In certain embodiments, the data integrity engine 234 may examine items of information in view of a specific services and/or specific categories of services upfront, thereby rendering subsequent readjustment unnecessary. Based on the scoring, certain data may be discarded or flagged for possible follow-up and/or prompting for further information and/or clarifying information may be identified, generated, and/or provided. Accordingly, composite content can be made more reliably with possible follow-up and/or prompting for a data source to link to for more missing information.

In various embodiments, a rules engine 237 may be configured to create and manage entity rules, condition-response rules, alert/reports rules, data-formatting rules, data-sharing rules, transmission rules, aggregation rules, user authorization rules, and other similar rules. Such rules may be user-defined, fixed, heuristics, learned by elements of the interaction infrastructure 102, and any combination of the foregoing. In some embodiments, the rules engine 237 may be included in the consolidation engine 233. In some embodiments, the rules engine 237 may be separate from the consolidation engine 233.

A build engine 236 may assess quality of the data and/or the data sources. The build engine 236 may build one best data set that relates to a particular entity. In some embodiments, the build engine 236 may build multiple high-quality data sets that relate to a particular entity, but are tailored for different purposes (e.g., different locations, intermediary channels, medial channels, and/or the like).

A feed engine 239 may be configured to process received input 238 from the aggregation/transformation engine 231. In some embodiments, the feed engine 239 may be integral with the aggregation/transformation engine 231. The feed engine 239 may generate one or more feeds 241 transferred to the transformed data layer 275 (e.g., for storage) and/or the application services management layer 240 (e.g., for more immediate use, by the content provisioning management layer 255 or another application service). In some embodiments, the feed engine 239 may generate a single feeder 241—a universal feed object—to feed the transformed data layer 275 and/or the application services management layer 240. The feed engine 239 may feed transformed data (which may include transformed information and/or transformed content in some embodiments).

In some embodiments, the feed engine 239 may implement a feeding process that feeds transformed data (which may include information and/or content in some embodiments) based on a last finishing point of a previous feeding process. The feed engine 239, in some embodiments, may push the transformed data/content/information into one or more temporary indexes. In some embodiments, the feed engine 239 may further transform the transformed data/content/information into a feed object with a data-interchange format that facilitates parsing. The feed engine 239 and/or the aggregation/transformation engine 231 may translate the data into understandable data, information, and/or content. The transformed data, information, and/or content may be directed to certain tables and/or data stores 268 based on the type of and/or an entity category to which the data, information, and/or content relates. For example, in some embodiments, the master data management system 265 may manages provider content and feeds into search indexes and the content provisioning system.

The feeding process may include multiple processes, in some embodiments. For example, the feed engine 239 may spin out two processes: one process for communicating with a search server system 267(*a*); and one process for communicating with a document server system 267(*b*). The search server system 267(*a*) and/or the document server system 267(*b*) may process the temporary index and determine which data is absent from the data stores 268. Consequent to determining which data is needed, the data may be fed to the data stores 268.

In some embodiments, the data may be feed to the search server system 267(*a*) and/or the document server system 267(*b*) on a periodic basis (e.g., every 15 minutes or any other time period). The search server system 267(*a*), in some embodiments, may only retain in its search indexes information needed for retrieving content objects (e.g., documents) and ranking the content objects. Thus, with such embodiments, other information not necessary for retrieval and ranking (e.g., images corresponding to an entity). The document server system 267(*b*) may have every entity attribute indexed for information retrieval. This bifurcation may allow for the interaction infrastructure 102 to perform super-fast retrieval. The search server system 267(*a*), in some embodiments, may perform matching, sorting, and/or the like, and hence may be CPU heavy. The document server system 267(b), in some embodiments, may be a disk I/O intense system and can handle those kinds of loads.

Figure 7:
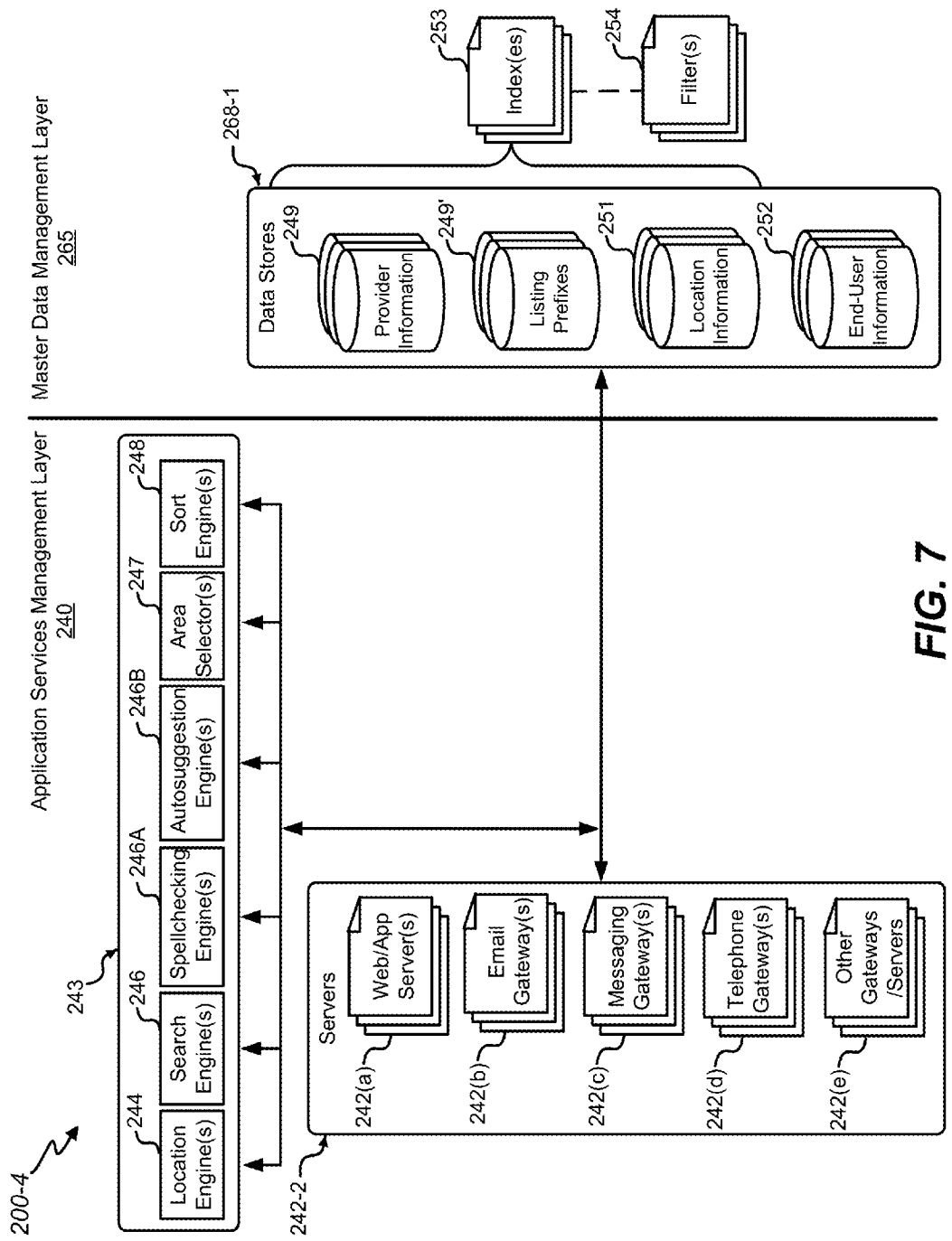
FIG. 7 shows a diagram of another portion of the architecture stack of the interaction infrastructure including certain aspects of the application services management and master data management layers, in accordance with certain embodiments of the present disclosure.

FIG. 7 shows a diagram of another portion 200-4 of the architecture stack 200 of the interaction infrastructure 102, in accordance with certain embodiments of the present disclosure. The portion 200-4 may, in some embodiments, correspond to portions of the application services management layer 240 and the master data management layer 265; and, in accordance with some embodiments, at least part of the application services management layer 240 may at least partially correspond to the search engine services layer 245. As depicted in FIG. 7, the server system 242 may include one or more communication servers. The server system 242 may include one or more web and/or application servers 242(a), one or more email gateways 242(b), one or more instant messaging gateways 242(c), one or more telephone gateways 242(d), one or more other gateways 242(e), such as television gateways, and/or one or more other types of servers, such as an application gateway (not shown) to interface with different servers. Some embodiments may use one type of communication server 242, such as a web server 242(a), to receive search requests and another type of communication server 242 to provide the search results. Some embodiments may use different types of communication servers 242 to service different types of client devices 205, 207.

The web and/or application server(s) 242(a) (referenced hereafter as a web server 242(a)) may include one or more web server and/or one or more application servers, such as mobile app servers. In some embodiments, a web 242(a) may communicate with a client device 205, 207 via HyperText Transfer Protocol (HTTP) and/or other types of communication protocols, such as File Transfer Protocol (FTP), Wireless Application Protocol (WAP), etc. A web and/or application server(s) server 242(a) may provide static web pages, dynamic web pages, and/or web services. In some embodiments, a web server 242(a) may provide web applications to a client device 205, 207 for execution in a web browser running on the client device 205, 207; and the web applications may include scripts, such as Java, JavaScript, etc., for execution within an isolated environment in a browser. In some embodiments, the web server 242(a) may provide rich-client applications to the client device 205, 207; and the rich-client application may be programmed in traditional programming languages to have full access to functions of the operating system running on the client device 205, 207.

In some embodiments, the communication servers 242 provide a user interface for user interaction with content objects. For example, the web servers 242(a) may provide a user interface via static web pages, dynamic web pages, and/or web services, etc. For example, the web servers 242(a) may provide content objects with links to detail information pages of the provider information 249, such as a map, entity hours, driving directions, etc. The web servers 242(a) may provide user interfaces for the users to rate the content, provide reviews, view reviews from other users, etc. The web servers 242(a) may provide user interfaces to make reservations or to complete transactions via the content objects. The web servers 242(a) can track various different types of user interactions with the content objects to determine or estimate the level of user interest in the content. The web servers 242(a) may provide rich client applications for execution in the mobile computing device to provide the user interfaces.

The communications server(s) 242 may be communicatively coupled to one or more information handling engines 243 that may provide functionality when executed by one or more servers to provide enhanced service handling features described herein. In some embodiments, one or more of the engines 243 and/or other modules may be servers communicating with other server(s) of the interaction infrastructure 102. The server communication may be over a network, such as an internal network, a local area network, a wide area network, an intranet, Internet, and/or the like. Any one or combination of the various servers may run on common or separate computers. In some embodiments, there may be one or more layers of application servers between communication servers and the data stores 268 to process the entity logic and data access of the rich client applications.

The information handling engines 243 may include one or more of a location engine(s) 244, a search engine(s) 246, a geo-aware spellchecking engine(s) 246A, a geo-aware autosuggestion engine(s) 246B, an area selector(s) 247, and/or a sort engine(s) 248 to process the search request and present search results based on the information stored in one or more data repositories 268. Other engines 243 may include and/or utilize the search engine 246 in various embodiments. In some embodiments, the search engine 246 may include logic for implementing searching the data stores 268 according to a search request. The searching may be in response to information received over the network 108 from a user. Responsive to a query, the search engine 246 may search, retrieve, modify, and/or cause transfer of particular information from one or more information repositories.

The one or more data repositories 268 may include provider information 249 about commercial entities or public end-user information, or other types of searchable end-user information. The one or more provider information repositories 249 may retain any local provider information (e.g., listings of provider information) suitable for embodiments of this disclosure, such as entity, product, and service information. In certain embodiments, the local provider information may correspond to directory information of the kind that may be available via Yellow Pages services and the like.

Provider information 249 may have street addresses or other location parameters, such as longitude and latitude coordinates, stored as locations in one or more location information repositories 251. The provider information 249 may include addresses, telephone numbers, descriptive content, notifications, and/or end-user information, etc. Provider information 249 may be associated with locations 251. The locations 251 may be part of the provider information 249, or associated with the provider information 249. In some embodiments, the provider information 249 may include information related to entity entities at corresponding locations 251. The entities may be entities or people. Some of the entities may pay fees to promote their content. Some of the entities may have free promotion. In some embodiments, the provider information 249 may be accessible to the public or to registered members.

In some embodiments, the data repository(ies) 268 may include one or more end-user information repositories 252. In some embodiments, a client device 205, 207 may store end-user information 252. In some embodiments, both the client device 205, 207 and the online data repository(ies) 268 store the end-user information 252 for a particular end-user. In some embodiments, when there is a data communication connection between the client device 205, 207 and the online data repository(ies) 268, the client device 205, 207 and the online data repository(ies) 268 may synchronize their copies of the end-user information 252 for the end-user. The end-user information 252 may be associated with the corresponding end-users. In some embodiments, an end-user may create corresponding end-user information 252. The web servers 242(*a*) may generally limit the access to the end-user information 252 to those who created the corresponding end-user information 252.

In various embodiments, the data repository(ies)/data store(s) 268 may be implemented in various ways. For example, one or more data processing systems may store the information related to the provider information 249, the locations 251, and the end-user information 252. For example, one or more relational or object-oriented databases, or flat files on one or more computers or networked storage devices, may store the information related to the provider information 249, the locations 251, and the end-user information 252. In some embodiments, a centralized system stores the information about the provider information 249, the locations 251, and the end-user information 252; alternatively, a distributed/cloud system, network-based system, such as being implemented with a peer-to-peer network, or Internet, may store the information about the provider information 249, the locations 251, and the end-user information 252.

In various embodiments, one or more of the location engine 244, the search engine 246, the geo-aware spellchecking engine 246A, the geo-aware autosuggestion engine 246B, the area selector 247, the sort engine 248, and/or other modules may be stored in the one or more memories and may include one or more software applications, executable with the processors, for receiving and processing data requests. In some embodiments, one or more of the location engine 244, the search engine 246, the geo-aware spellchecking engine 246A, the geo-aware autosuggestion engine 246B, the area selector 247, the sort engine 248, and/or other modules may be servers communicating with the communication server(s) 242. The server communication may be over a network, such as a local area network, a wide area network, an intranet, Internet, and/or the like. Any one or combination of the various servers may run on common or separate computers. In some embodiments, there may be one or more layers of application servers between the communication server 242 and the data stores 268 to process the entity logic and data access of the rich client applications. Alternatively, application servers may be integrated with the communication servers 242, such as the web servers 242(*a*). Certain embodiments are not limited to a particular type of connections among the communication servers 242, the location engine 244, the search engine 246, the geo-aware spellchecking engine 246A, the geo-aware autosuggestion engine 246B, the area selector 247, the sort engine 248, the data repository(ies) 268, and/or other modules.

In some embodiments, one computer system implements one or more of the servers 242, the location engine 244, the search engine 246, the geo-aware spellchecking engine 246A, the geo-aware autosuggestion engine 246B, the area selector 247, and the sort engine 248. Alternatively, different processes running on one or more shared computers may implement some of the components 242, 244, 246, 246A, 246B, 247, and/or 248. For example, one computing module, thread, or process may implement multiple of the components. In some embodiments, special purpose data processing systems implement the one or more of the components, such as using Application-Specific Integrated Circuit (ASIC) or Field-Programmable Gate Array (FPGA). In some embodiments, processes running according to software instructions on general purpose data processing systems, such as general purpose personal computers or server computers, can implement the components. Thus, the implementations are not limited to hardware, software, or particular combinations of hardware and software.

One or more of the location engine 244, the search engine 246, the spellchecking engine 246A, the geo-aware spellchecking engine 246A, the geo-aware autosuggestion engine 246B, the sort engine 248, and/or other modules may be configured to perform any of the steps of methods according to the present disclosure. In some embodiments, the location engine(s) 244 may include one or more engines and may use GPS coordinates, cellular tower triangulation techniques, Wi-Fi-based location information, carrier-provided location information, and/or other location determination systems to identify a location of the client device 205, 207. In some embodiments, the location engine 244 determines a location of interest to the end-user related to a search request (also referred to as a "search location"). In some embodiments, the location engine 244 determines a location of interest to the end-user related to a phone call initiated with the client device 205, 207 (also referred to a "call location"). The call location and/or search location may be based on a location of the client device 205, 207. In some embodiments, the end-user may explicitly specify the search location and/or call location in a search request; and the location engine 244 extracts the location from the search request. In some embodiments, a search location and/or call location may be based on end-user information 252 stored for a particular end-user and associated with identification information of the end-user or the client device 205, 207. In some embodiments, the end-user may specify some or all of the end-user information 252.

In some embodiments, the location engine 244 may automatically identify the call location and/or search location based on determining the current location of the client device 205, 207 that is used to submit a search request and/or initiate a phone call. For example, the location engine 244 may determine the location of the client device 205, 207 based on a connection point the client device 205, 207 used to access the network 108 (e.g., based on the location of a wireless network access point, a base station of a cellular communication system, or a connection point to a wired network). In some embodiments, the client device 205, 207 automatically determines its current position (e.g., via a satellite positioning system, or a cellular positioning system) and transmits the determined or estimated position to the web server 242(*a*) with the search request, or provides the position in response to a request from the location engine 244.

In some embodiments, the search engine 246 may retrieve content from the data stores 268 according to a search request. In some embodiments, the search engine 246 may include or otherwise be configured to use the geo-aware spellchecking engine 246A, and/or the geo-aware autosuggestion engine 246B. In some embodiments, the geo-aware spellchecking engine(s) 246A may be used with the string corresponding to the search request to identify corrections for misspellings in search strings and/or to otherwise account for spelling variations in order to provide results with a greater degree of relevance. In some embodiments, the geo-aware spellchecking engine(s) 246A may be used with the string corresponding to the search request to identify corrections for misspellings in search strings and/or to otherwise account for spelling variations in order to provide results with a greater degree of relevance. In some embodiments, the geo-aware autosuggestion engine 246B may be used with the geo-aware spellchecking engine(s) 246A, may include the geo-aware spellchecking engine(s) 246A, and/or may be otherwise configured to account for geo-aware spelling variations and to provide such geo-aware features in conjunction with the geo-aware suggestion features described herein.

In some embodiments, the sort engine 248 may rank content objects pertaining to providers in the search results according to the distance between the search location and/or call location and the locations 251 corresponding to the provider, or according to current levels of user interest in the retrieved content. The web servers 242(*a*) may track various different types of user interactions with the content objects to determine or estimate the level of user interest in the content objects. The sort engine 248 may rank the content objects according to other criteria, in accordance with other embodiments described herein. In various embodiments, the search engine 246 may be configured to search for and/or correlate user data, provider data, location data, and/or other data, in accordance with various embodiments described herein. In some embodiments, the sort engine 248 may be used to provide sorting features in conjunction with the geo-aware suggestion features described herein. Additional details and potential embodiments related to this functionality is discussed below in reference to FIGS. 13-17.

The client device 205 may indicate a geographic location when submitting the query. Alternatively, the system may determine an indication of the geographic location of the client device 205 based on the submitted query. In various embodiments, the area selector 247 may be configured to select search areas, in accordance with various embodiments described herein. In some embodiments, the area selector 247 may select a first geographic area based on the call location and/or search location identified by the location engine 244. The search engine 246 may then retrieve a first set of content objects (which could include service provider information in some embodiments) that have corresponding location(s) within the selected first geographic area and that satisfies the search criteria. In some embodiments, if sufficient results are not found for the first geographic area, a second geographic area may be selected in an iterative process, which second area may or may not include the first geographic area, for searching. The first geographic area could correspond to a service area in some embodiments. In some embodiments, the search engine 246 may search for providers in a target area to obtain a set of search results; the area selector 247 may select geographic areas and selects groups of results that are within the selected geographic areas respectively. In some embodiments, the geo-aware autosuggestion engine 246B may be used with the area selector 247, may include the area selector 247, and/or may be otherwise configured to provide for such area selection features in conjunction with the geo-aware suggestion features described herein.

In some embodiments, the client device 205, 207 includes a web browser which allows the end-user to submit a search request to one of the web servers 242(*a*) for location dependent information, such as a listing 252 of a provider. Alternatively or additionally in some embodiments, the client device 205, 207 includes a mobile application which allows the end-user to submit a search request to one of the web servers 242(*a*) for location dependent information. Alternatively, the client device 205, 207 may provide the search request via other communication channels, such as email, short message service (SMS), instant messaging (IM), telephone connection, etc. For example, the client device 205, 207 may provide the search request to an email gateway 242(*b*) via email, or to an IM gateway 242(*c*) via instant messaging, or to a telephone gateway 242(*c*) via a telephone call, or to a television gateway 242(*e*) via an interactive television system. Some embodiments may use other types of gateways, such as gateways for SMS. Thus, the disclosure is not limited to the examples or combinations illustrated.

Certain embodiments may provide for associating listing information 249, location information 251, and prefixes 249' for the listings of provider information. One or more indexes 253 for the associated provider information 249, location information 251, and prefixes 249' may be built, updated, and maintained in some embodiments. In some embodiments, one or more inverted indexes 253 may be implemented. The one or more inverted indexes 253 may store mapping for the associated provider information 249, location information 251, and prefixes 249'. The one or more inverted indexes 253 may allow for faster information retrieval with search engine(s) 246 according certain embodiments.

In some embodiments, particular words may be stored in indexes 253. In some embodiments, each word may be linked to one or more documents, collections, files, fields, database structure/elements, or other forms of listing information that contain those words. In some embodiments, one or more inverted lists for each n-gram corresponding to the words may be created and may be associated with the words. For example, consider the string of "Max Bar & Grill," which can be decomposed into 2-gram sets such as {'ma', 'ax', 'x#', '#b', ... } where # stands for a space; into 3-gram sets such as {'max', 'ax#', 'x#b', ... }; and/or into other n-grams sets. In some embodiments, the decomposition may include word-level decomposition. Using the same example string of "Max Bar & Grill," various n-gram sets could include {'max', 'bar', 'grill', 'max bar', 'bar &', '& gril', 'max grill', 'bar & grill', ... }, for example.

An inverted list for a given n-gram may include any and/or all instances of strings from a plurality of strings that contain the n-gram. In some embodiments, a list may include identifiers of strings, in lieu of actual strings, for mapping to actual strings. This may improve efficiency. The string identifiers could be unique identifiers.

In some embodiments, the indexes 253 may allow for approximate string matching at least partially based on decomposition of strings, such as into n-grams or words, and building inverted lists based on the decompositions. In some embodiments, inverted lists may be based on tokens or other identifiers associated with the n-grams or words. In some embodiments, similarity of strings may be measured in terms of similarity of the respective n-grams, words, and/or identifiers. In some embodiments, the indexes 253 may include a multiplicity of possible variations for various strings. For example, the example string of "Max Bar & Grill" can have multiple corresponding strings at the word level, such as "mac's bar & grill," "mack's bar & grill," "mac's bar 'n grill," "max bar 'n grill," "macs bar & grill," "maxbar grill," "maxbargrill," etc. Thus, misspellings and spelling variations may be anticipated. Stemming may be used to allow for variations such as "sport bar" instead of "sports bar." Including misspellings and spelling variations may allow for the capture of the relevant information. The same example string of "Max Bar & Grill" can have multiple corresponding strings at the character level for various n-gram sets in some embodiments. Accordingly, the indexes 253 may allow for prefix matching that is not too strict and, more generally, the indexes 253 may allow for fuzzy search engine capabilities.

Various embodiments may employ various similarity measures that may be tailored to facilitate linking to the indexes and/or retrieval of documents and/or listing information retained in any other suitable form, collection, file, field, database structure/element, etc. For example, TF/IDF (term frequency/inverse document frequency) may be used to assess the significance of a particular word/n-gram with respect to a particular document and/or with respect to particular strings. The IDF for each n-gram in one or more strings, such as strings within a database, dataset, or table within a database, may be determined. The IDF of a token or string is the inverse of the total number of times that this token or string appears in a data collection, such as a database. In some embodiments, an IDF may indicate a weight for weighted similarity measures.

In some embodiments, the search engine may employ similarity measures between multiple strings to allow for fuzzy searching. The search engine may process one or more characters corresponding to user input of a search string and parse the search string into sets of n-grams compared the search string with index information. For example, the characters of an incomplete user-entered search string could be "macs b". The characters could be processed and decomposed into n-grams similar to the examples given above. The sets of characters could be compared to index entries to assess similarity using any suitable algorithm. Some embodiments may identify intersections between multiple sets and assigned a similarity score based on the extent of n-gram intersections between the search string and index entries, with a greater extent of an intersection of common characters indicating a greater degree of potential similarity between corresponding sets. For example, the search string "macs b" may be identified as a having a high extent of intersection with one or more index entries for "Max Bar & Grill," which may include the variant "macs bar & grill."

In some embodiments, the string length may be taken into account as a qualification for similar measures in order to allow for anticipatory/predictive auto-suggestion features discussed herein. In other words, the shorter length of the incomplete search string "macs b" with respect to the longer length of the index entries for "Max Bar & Grill" may be accounted for when assessing similarity. The disparity of lengths may not prevent identification of similarity. Hence, the high extent of intersection with n-grams of similar length and ordering associated with the n-grams of the first portion(s) of "Max Bar & Grill" may be identified even though the incomplete search string "macs b" may not have a high extent of intersection with subsequent portion(s) of "Max Bar & Grill." However, comparable string lengths may also be considered in assigning greater similarity scores. For example, the incomplete search string "macs b" may have high similarity with index entries for "Max Bar & Grill," but also with index entries for "Mac's Bar." In such instances, the aspect of comparable lengths of the search string and "Mac's Bar" may be recognized as indicating even greater similarity and thus the similarity score between the two may be higher than the similarity score between the search string and "Max Bar & Grill."

In some embodiments, a similar order of the intersecting sets may be taken as an additional indication of similarity. For example, a user-entered search string with "grill macs" may have a certain extent of character intersection with index entries corresponding to one entity, "Max Bar & Grill," and may have a certain extent of characters section with index entries corresponding to another entity, "Grill Max," however the orders of the intersecting sets may be recognized as being different with respect to these example cases. The ordering of n-grams of the search string "grill macs" has a greater correspondence to the ordering of n-grams of "Grill Max" than it does with respect to "Max Bar & Grill." Accordingly, the search string "grill macs" may be accorded a greater similarity score with respect to "Grill Max" and a lesser similarity score with respect to "Max Bar & Grill."

The above examples consider an entity name, however various embodiments may employ the same methods with respect to other types of listing information. For example, category and/or keyword strings can be decomposed in similar manner. Furthermore, entity names may be associated with various categories and/or keywords. For example, in some embodiments, sets corresponding to a given entity may include associated categories and/or keywords. Shingles of words associated with listings, service areas, and popular queries may be stored. In some embodiments, sets corresponding to a given entity may be linked to other sets of categories and/or keywords, for example, via pointers and/or other look-up tables. It should be understood that any suitable relational database approach may be used to associate the various sets and/or members thereof.

As addressed above, certain embodiments may provide a spellchecker service that is geo-sensitive. For example, for a search in the area of Monrovia, Calif., the geo-aware spellchecker 246A may recognize that an entry of "Plummer" should not be corrected to "Plumber." To facilitate the geo-sensitive spellchecking, words corresponding to listings, and variations of the words, may be stored and linked to corresponding location information. The linking may be provided by way of the one or more indexes 253, with the word variations and locations being stored in inverted index(es) in some embodiments. Accordingly, with the word variations, the indexes 253 may store corrections for misspelled search strings in order to account for spelling variations. However, not all corrections make sense for a particular area, as in the example given above. To address that reality, the indexes 253 may be configured such that the linked location information allows for spellchecking tailored to an end-user location and or a search location associated with an end-user request. The geo-aware spellchecker 246A may determine whether one or more corrections or an original query makes more sense in a particular area. Based on that determination, corrections which do not make sense in that area may be filtered out. Accordingly, the accuracy of spelling corrections may be improved, and false positives may be minimized.

The geo-aware spellchecker 246A may receive the search string and may identify one or more potential corrections for the search string. The geo-aware spellchecker 246A may look up the search string and the one or more potential corrections in the index(es) 253, comparing the search string and the one or more potential corrections to listing information for the identified location. If the search string is identified as a possibility for the particular location, then that may be an indication that the search string should not be corrected. If, however, the search string is not identified as a possibility for the particular location, then that may be an indication that the search string should be corrected. In some embodiments, a decision tree may be employed to check the search string first, then the most likely applicable potential correction, then the next most likely applicable potential correction, and so on until a positive indication is found in the index(es) 253. In some embodiments, the geo-aware spellchecker 246A may identify one or more potential corrections for the search string first in a geo-oblivious manner, and then analyze the potential corrections for applicability to an identified location. In some embodiments, the geo-aware spellchecker 246A may only identify a limited set of one or more potential corrections for the search string that are applicable to an identified location.

Certain embodiments may provide a clustering-based approach to facilitate the geo-sensitive spellchecking Words corresponding to listings, and variations of the words, may be stored and linked to corresponding location information, where the location information may include location identifiers, such as latitude and longitude coordinates, for the listings. For example, entity names may be stored with coordinates for the entities. Then, clusters may be formed based on the location information. For example, when displayed on a map, entities with a given entity name (such as a chain of restaurants) may have multiple locations. Using any suitable clustering algorithm, one or more boundaries may be drawn or otherwise defined to surround one or more clusters of the entities.

The corresponding clusters of data may be used for verification of a search string and one or more potential corrections for the search string. The geo-aware spellchecker 246A may receive the search string and may identify one or more potential corrections for the search string. The geo-aware spellchecker 246A may look up the search string and the one or more potential corrections in the clustered data, comparing the search string and the one or more potential corrections to listing information in the cluster that corresponds to the identified location. Stated otherwise, the geo-aware spellchecker 246A may check if a word and/or n-gram is found in the cluster. If the search string is identified as a possibility for the particular location, then that may be an indication that the search string should not be corrected. If, however, the search string is not identified as a possibility for the particular location, then that may be an indication that the search string should be corrected. In some embodiments, a decision tree may be employed with the cluster, as discussed above.

As addressed above, certain embodiments may provide an autosuggestion service that is geo-sensitive. The autosuggestion service may provide type-ahead suggestions that are geographically relevant. As a user types a search query, the user may be presented with the type-ahead suggestions that are relevant to user's current geography and/or another geography of interest. Though reference is made herein to type-ahead suggestions and in some embodiments one or more suggestions could appear in the query field as a type-ahead suggestion, the term type-ahead suggestion could include other manners of presentation, such as over at least a portion of the query field, or beside the query field so that a user may accept a suggestion via selection of a space key, selection of an enter key, or any other suitable manner of selection. In some embodiments, the search engine 246 may configured with the geo-aware autosuggester 246B to effect a geo-aware autosuggest search engine. In some embodiments, the search engine 246 may include the geo-aware autosuggester 246B. In some embodiments, the search engine 246 may not include, but may be configured to work in conjunction with, the geo-aware autosuggester 246B. In various embodiments, the geo-aware autosuggester 246B may be integral with or independent of the search engine 246. In various embodiments, a geo-aware autosuggester 246B could be implemented separately or without the spellchecking module 246A. In some embodiments, the geo-aware spellchecking module 246A could be configured as a geo-aware autosuggester 246B such that autosuggestion features are an extension of spellchecking features.

The geo-aware autosuggester 246B could receive a series of search string characters and perform a lookup with the reception of each character or set of multiple characters. The lookup could be performed with one or more indexes 253. In some embodiments, one or more filters 254 could be used in conjunction with the one or more indexes 253. To facilitate the geo-aware autosuggestion, words corresponding to suggestions/listings, and variations of the words in some embodiments, may be stored and linked to corresponding location information. For example, suggestions/listings corresponding sets of words and/or n-grams may be linked to location information in the indexes 253.

The autosuggestion service may provide suggestions that are relevant to a geographical area(s) of interest. The suggestions may correspond to listings that are in close proximity to a search area, as providing suggestions that are too far away from the search area may negatively impact the user experience. In providing suggestions, the autosuggestion service may allow for a quick response time so that suggestions are provided between key presses of a user. By way of example, the autosuggestion service may provide suggestions in the order of milliseconds or tens of millisecond in response to each character input. Given such constraints, it may be advantageous to divide geographical areas into multiple smaller areas. A code may be assigned to each small area, and that area code may be assigned to the suggestions relevant to that area.

Accordingly, the location information may include location identifiers. Linked information may be distinguished, segregated, and/or categorized based on location in any suitable manner, with any suitable location identifiers being used to link information to corresponding areas. In various embodiments, the location could have any suitable level of specificity, e.g., including a county, a municipality, zip code, school district, entity directory service area, and/or the like. For example, a zip code, a collection of zip codes, one or more listing service directory codes (which may correspond to particular telephone directory service areas, which service areas could be defined by zip code(s)), and/or the like may be used as a basis for linking information to a location.

Figure 8:
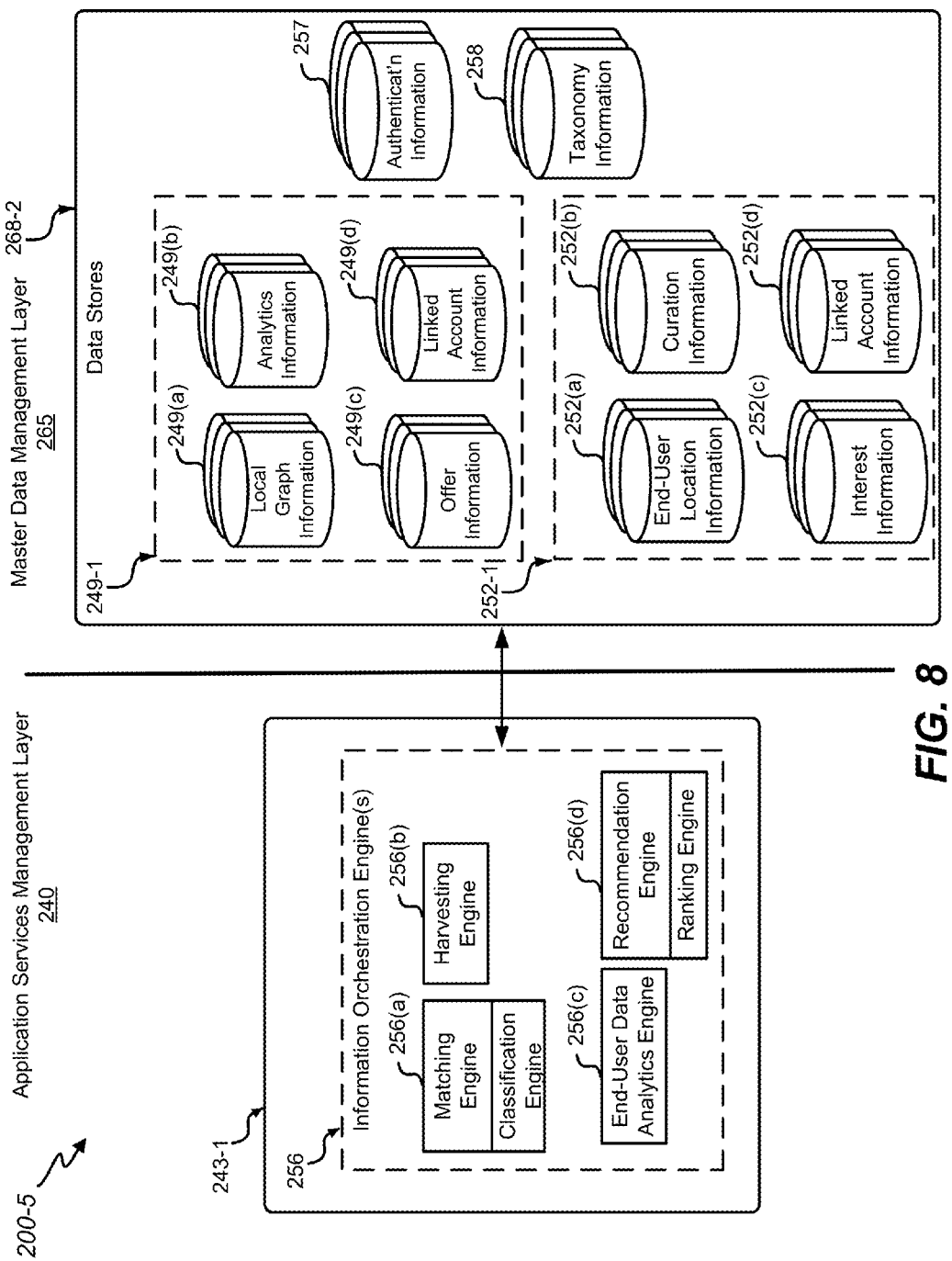
FIG. 8 shows a diagram of another portion of the architecture stack of the interaction infrastructure including certain aspects of an information orchestration layer, in accordance with certain embodiments of the present disclosure.

FIG. 8 shows a diagram of another portion 200-5 of the architecture stack 200 of the interaction infrastructure 102, in accordance with certain embodiments of the present disclosure. The portion 200-5 may, in some embodiments, correspond to portions of the application services management layer 240 and the master data management layer 265; and, in accordance with some embodiments, at least part of the application services management layer 240 may at least partially correspond to the customized orchestration layer 250.

The customized orchestration layer 250 may include one or more of the information handling engines 243. The engines 243 may include one or more information orchestration engine(s) 256. In some embodiments, the information orchestration engine(s) 256 may include logic for implementing any features of personalized orchestration of entity information and/or user-specific services in various embodiments disclosed herein. In some embodiments, the information orchestration engine(s) 256 may facilitate an application on the end-user device to provide any such features. In some embodiments, the information orchestration engine(s) 256 may be incorporated in the application.

In certain embodiments, the information orchestration engine(s) 256 may be configured to compile keyword criteria, for example, in an ontology, and could include an ontology reasoner or semantic reasoning module to make logical inferences from a set of facts in the ontology. Accordingly, the information orchestration engine(s) 256 may correspond to a reasoning engine configured to effect one or more features described herein. A pattern-based reasoner could be employed to use various statistical techniques in analyzing interest data in order to make inferences based on the analysis. A transitive reasoner could be employed to infer relationships from a set of relationships related to interest data. In certain embodiments, the information orchestration engine(s) 256 may include logic for implementing workflow features in various embodiments.

In some embodiments, the information orchestration engine(s) 256 may include logic to implement and/or otherwise facilitate any taxonomy, classification, categorization, correlation, mapping, qualification, scoring, organization, and/or the like features discussed herein. In some embodiments, the information orchestration engine(s) 256 may include a matching engine 256(a) configured to facilitate one or more such features. For example, the matching engine 256(*a*) may be or include a classification engine configured to classify each of a plurality of entities into at least one category of a set of categories that represent classifications of entities based at least in part on one or more sets of characteristics defined for classifying various entities. For example, information with respect to a particular entity may be analyzed in order to identify one or more entity characteristics. The matching engine 256(*a*) can receive entity information, identify characteristics of the entity based at least in part on the entity information, and match the entity to one or more categories based on category information retained in a repository. The entity may be matched to one or more categories that each represent classifications of entity sharing common characteristics. In some embodiments, one or more taxonomies that map particular profile information to particular categories may be used in correlating entity profile information with one or more categories. The entity could be classified according to products and/or services that the entity provides. The entity could be classified according to location, for example, a segment that the entity serves and/or a physical site of the entity. The entity could be linked to location identifier(s) (such as a directory code(s) relevant to the entity listing of the suggestion); geo coordinates corresponding to the entity (e.g., latitude and longitude); and/or the like.

As another example, the matching engine 256(*a*) may be or include a classification engine configured to classify each of a plurality of end-users into at least one category of a set of categories that represent classifications of end-users based at least in part on one or more sets of characteristics defined for classifying various end-users. As a further example, the matching engine 256(*a*) may be configured to process first information enabling unique identification of a particular end-user, process second information about a first location corresponding to the end-user, and match the end-user to a first category from the set of categories.

In some embodiments, the matching engine 256(*a*) may be configured to match the user to one or more entities based at least in part on correlating categories. The matching could, in some embodiments, be based at least partially on comparing user characteristics/categories with entity characteristics/categories. For example, they may be matched according to preferences, certain biographical information, demographic information, interests, location information, etc.

Any suitable correlation process may be employed. A scoring system could be correlated to the category scheme in some embodiments, such that certain scores correspond to matches of certain categories. Some embodiments may score a match with a numerical expression, for example, a match score, with higher scores being assigned to higher correlations of user characteristics/categories with entity characteristics/categories. A high correlation may be identified using any suitable qualification scheme (e.g., a score threshold, a score ranking, etc.).

In some embodiments, the information orchestration engine(s) 256 may include one or more harvesting engines 256(*b*). In some embodiments, the harvesting engine 256(*b*) may include logic for implementing information logging features in various embodiments. In some embodiments, the harvesting engine 256(*b*) may be configured to gather data about an identified end-user from one or more data sources. By way of example without limitation, the harvesting engine 256(*b*) could process data pulled and/or pushed from various entities. The harvesting engine 256(*b*) could handle process, extracting, formatting, and/or storing/recording data including data for indicia of interest, preference data, taxonomy data, mapping data, and/or the like. In some embodiments, the harvesting engine 256(*b*) may work in conjunction with the service monitoring engine 228; in some embodiments, the harvesting engine 256(*b*) may correspond in whole or in part to the service monitoring engine 228. The harvested data may then be analyzed to determine one or more characteristics of the first end-user.

In some embodiments, the information orchestration engine(s) 256 may include interest data analytics modules may include logic to retrieve, process, derive, compile, aggregate, handle, store, report, and/or present information relating to interest data. In some embodiments, the information orchestration engine(s) 256 may include one or more end-user data analytics engines 256(*c*) configured to facilitate one or more such features. In some embodiments, one or more data analytics engines 256(*c*) may include logic to retrieve, process, derive, compile, aggregate, handle, store, report, and/or present information relating to end-user data. The performance analytics engine(s) 256(*c*) may be configured to present any desirable information in any desirable manner. With respect to a particular provider, the logging engine(s) 256(*b*) and end-user data analytics engine(s) 256(*c*) may facilitate various features of one or more provider interfaces, in accordance with certain embodiments herein.

In some embodiments, the information orchestration engine(s) 256 may include one or more recommendation engines 256(*d*). The recommendation engine 256(*d*) may be configured to analyze end-user information 252 for particular end-users and aggregated, classified provider information 249 to identify a set of one or more recommendations (e.g., of offers, entities to add to a collection, etc.). The recommendation engine 256(*d*) may generate one or more recommendations. Certain embodiments may identify recommendations based at least partially on similarities of characteristics of a first end-user and characteristics of other users having associations with entities (e.g., having added the entities to their collections). Any suitable algorithm for assessing similarity may be employed. Some embodiments may identify intersections between multiple sets of characteristics. Having set intersections identified, the intersections may be compared. A greater extent of an intersection may be an indication of a greater degree of similarity between the users. In some embodiments, the sets may be ranked according to the extent of the intersections.

In some embodiments, the data stores 268 may include one or more authentication information repositories 257 may retain any authentication information suitable to facilitate security for embodiments of this disclosure. The authentication information repositories 257 may include database(s), database management system(s), server(s) to facilitate management/provision/transfer of authentication information, and/or the like. The repositories 257 may retain authentication information of one or more particular end-users, providers, and/or other data sources. The authentication information may include information to check credentials of end-users, providers, and/or other data sources that may use one of their corresponding interfaces to seek access, transfer information, and/or make entity-related interactions with the interaction infrastructure 102. The authentication information may be used to provide security for entity interactions, restrict the access granted to a certain set of information and/or features, implement certain control and/or features for certain parties, and/or the like.

In some embodiments, the one or more data stores 268 may include one or more taxonomy information repositories 258 to retain any suitable information associated with taxonomy feature in accordance with various embodiments disclosed herein. For example, one or more taxonomy information repositories 258 may retain mapping information, classification information, scoring criteria, and/or the like. Information retained in one or more taxonomy information repositories 258 may be used to classify user interest data/indicia, classify entities, map user interests, entities, and/or interest categories, and/or otherwise correlate and organize information in accordance with various embodiments disclosed herein.

As described above, the one or more provider information repositories 249 may retain provider information of particular providers. The repositories 249 may retain any information related to providers, including entities and people, which may have street addresses or other location parameters, such as longitude and latitude coordinates, maps, driving directions, and/or the like, stored as locations in one or more location information repositories 251. For example, one or more provider information repositories 249 may retain any information related to provider identification information, provider profiles, provider certification information, entity description, product descriptions, service descriptions, ratings/reviews/comments/preference indicia associated with providers, provider websites, provider authentication information, provider statuses, provider relationships, organization details, payment methods, accounting information, credit information, asset information, collateral information, address information, contact information, entity hours, availability, user account information, descriptive content, notifications, and/or the like.

In some embodiments, provider information may include local graph information 249(*a*). The local graph information 249(*a*) may include mapping information about a provider's connections to collections, windows, end-users, and/or the like via the orchestration service. The local graph information 249(*a*) may include classification information about a provider and relation to user interest data and entity categories. Generally, the local graph information 249(*a*) may include any information to facilitate provider inclusion in the orchestration platform in accordance with various embodiments described herein.

Provider information may include analytics information 249(*b*). The analytics information 249(*b*) may include any performance information related to particular providers, including any end-user data analytics related to particular providers. Provider information may include offer information 249(*c*) retained for particular providers. The offer information 249(*c*) may include offers that particular providers have created, entity rules associated with provisioning offers to end-users, and/or the like. Provider information may include linked account information 249(*d*). The linked account information 249(*d*) may include information about a provider's account(s) that are linked with the orchestration system, such authentication information for linked accounts, which accounts may include email accounts, short messaging accounts, online social/entity networking accounts, and/or the like. The analytics information 249(*b*), the offer information 249(*c*), and the linked account information 249(*d*) may include any information to facilitate various features of one or more provider interfaces, in accordance with certain embodiments herein.

The one or more end-user information repositories 252 may retain any suitable information associated with users in accordance with various embodiments disclosed herein. The end-user information may include end-user identification information, payment methods, accounting information, contact information, user account information, and/or the like. One or more end-user information repositories 252 may retain any information related to end-user location information 252(*a*), curation information 252(*b*), interest information 252(*c*) related to end-user (which may include information related to indicia of interest), linked account information 252(*d*), and/or the like. The curation information 252(*b*) may include local graph information, which may include information about providers of interest, providers that have been added to a user's collection, geo-specific criteria for end-user collections/profile, entity information otherwise associated with the end-user (which may include collection followings, e.g.), notes by the end-user, photos and/or other images associated with the end-user, preferences of the end-user, arrangement/organizational particulars for entity information associated with the end-user, end-user requests, and/or any suitable information to facilitate any one or combination of the personal curation features described herein. The linked account information 252(*d*) may include information about an end-user's account(s) that are linked with the orchestration system, end-user notification profiles, end-user authentication information, and/or any information to facilitate various features of one or more end-user interfaces, in accordance with certain embodiments herein.

In some embodiments, a client device 205, 207 may store end-user information 252. In some embodiments, both the client device 205, 207 and the online data stores 268 may store the end-user information 252 for a particular end-user. In some embodiments, when there is a data communication connection between the client device 205, 207 and the online data stores 268, the client device 205, 207 and the online data stores 268 may synchronize their copies of the end-user information 252 for the end-user.

Figure 9:
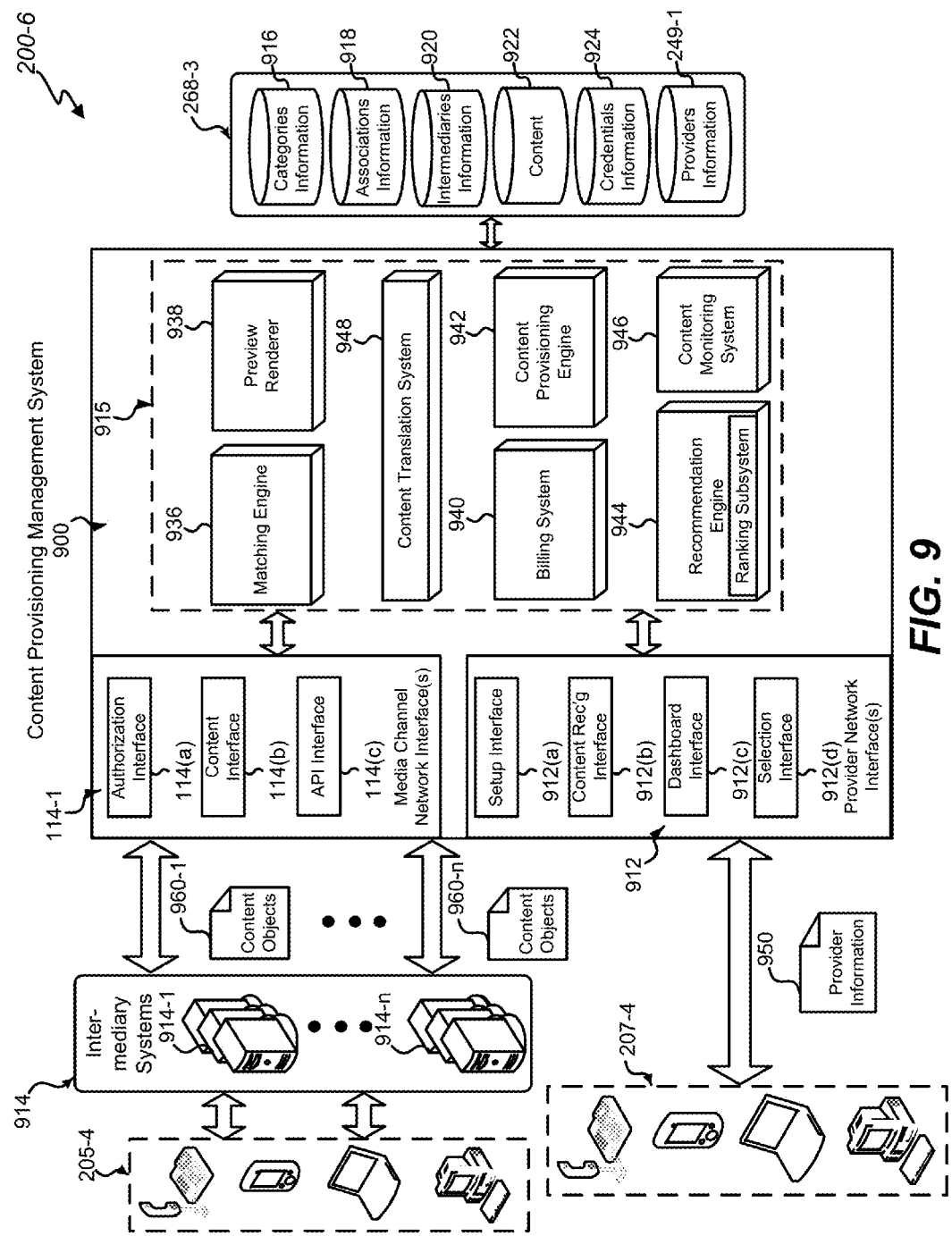
FIG. 9 shows a diagram of another portion of the architecture stack of the interaction infrastructure including certain aspects of a content provisioning management system, in accordance with certain embodiments of the present disclosure.

FIG. 9 shows a diagram of another portion 200-6 of the architecture stack 200 of the interaction infrastructure 102, in accordance with certain embodiments of the present disclosure. The portion 200-6 may, in some embodiments, correspond to portions of the application services management layer 240 and the master data management layer 265. In accordance with some embodiments, portion 200-6 may at least partially correspond to the content provisioning management layer 255.

In some embodiments, a content provisioning management system 900 may provide a single interface for a provider to manage content transmitted by intermediary systems 914 to client devices 205 on behalf of a provider. In some embodiments, the content provisioning management system 900 can use categories to customize recommendations to the provider in managing content provided to intermediary systems 914.

The provider may make decisions that can include implementing recommendations provided by the content provisioning management system 900. By using the content provisioning management system 900, the provider does not need to manage each intermediary relationship separately. Further, the provider can be provided more summary information about end-user sentiment and/or activity, than could be observed through separate intermediary interactions.

The content provisioning management system 900 can provide a central point to manage information between the provider devices 207, intermediary systems 914, and end-user devices 205. The content provisioning management system 900 monitors and analyzes particularized content served by intermediary systems 914. Some content served by intermediary systems 914 is provided by end-user devices 205, for example, in form of end-user ratings, review, and/or other feedback. The content provisioning management system 900 may provide information about content provided by intermediary systems 914 to the provider devices 207. The content provisioning management system 900 can receive information from the provider devices 207 and translate the information to particularized content objects that can be transmitted to the intermediary systems 914 for use by intermediary systems 914.

The content provisioning management system 900 can analyze the content objects distributed by intermediary systems 914. Based on the analysis, the content provisioning management system 900 can provide recommendations, statistics, identify areas of weakness and/or identify areas of competence. In some embodiments, the content provisioning management system 900 can implement recommendations.

Intermediary systems 914 can distribute content that is accessed by end-user devices 205. In some embodiments, end-user devices 205 provide content to intermediary systems 914 to serve. Some intermediary systems 914 can allow interaction with content through APIs, such as receiving and/or transmitting content and/or notifications. As intermediary systems 914 attract end-users, it can be desirable for a provider to interact with end-user devices 205 through intermediary systems 914.

In some embodiments, the content provisioning management system 900 may be configured to match providers to intermediary systems 914 and select particular intermediary systems 914 for serving content 960 of particular providers. In some embodiments, the content provisioning management system 900 can assign intermediary systems 914 to categories. Some intermediaries can be assigned to specific categories. Other intermediaries can be considered generically applicable. In some embodiments, the content provisioning management system 900 can recommend to providers both generic intermediaries and category-specific intermediaries.

When used herein, a category may correspond to a grouping of providers that share common characteristics. Categories can include other categories (sometimes referred to as subcategories). Categories do not have to be mutually exclusive, as a provider can be assigned more than one category.

Provider specifications may be received from the provider device 207. A provider may provide unique identification information to content provisioning management system 900. The provider may specify a specific geographic area for the services provided by the provider device 207. The content provisioning management system 900 may provide distribution information (e.g., about creating a provider listing) for one or more intermediaries to a provider device 207. In some embodiments, the content provisioning management system 900 may determine a category to which the provider belongs. And, based on the category selected, the content provisioning management system 900 may recommend distribution information (e.g., creating a provider listing) for one or more intermediaries.

After receiving a selection of intermediaries, the content provisioning management system 900 may determine a superset of content to request from the provider device 207. Having received client information 950, the content provisioning management system 900 can translate the client information 950 to content 960-1 to 960-n compatible with each intermediary system 960-1 to 960-n. Content 960-1 to 960-n can then be transmitted to matching intermediary systems 960-1 to 960-n.

The content provisioning management system 900 may include provider network interface 912, engines 915, data stores 268, and intermediary network interface 114-1. In various embodiments, the one or more engines 915 may be implemented by one or more servers. In other embodiments, each engine 915 may comprise a set of servers that interact with other servers (e.g., data stores 268, engines 915, provider network interfaces 912, media channel network interfaces 114) through API calls.

The provider network interface 912 can communicate with provider devices 207 and receive client content 206-1 to 206-n. The provider network interface 912 may include interfaces to enable the management system functionality. The provider network interface 912 may include a setup interface 912(*a*) that enables the content provisioning management system 900 to receive unique identifying information of a provider. The provider network interface 912 may include a content receiving interface 912(*b*) that enables receipt of provider information 950. The provider network interface 912 may include a dashboard interface 912(*c*) that enables provisioning of information about content served to provide devices 207 to enable monitoring of intermediary content and changing intermediary content (e.g., add a new address, provide a new posting, etc.). The provider network interface 912 may include a selection interface 912(*d*) that provides recommendations of intermediaries and receives selections of intermediaries. The provider network interface 912 may include other provider network interfaces 912 and can communicate using various protocols and APIs.

The content provisioning management system 900 can include engines 218 that process information from data stores 208, provider network interface 912 and intermediary network interface 250. The content provisioning management system 900 may include a recommendation engine 244. The recommendation engine 944 may be configured to provide a list of intermediaries retrieved from the associations data store 918 and intermediaries data store 920. A ranking subsystem 944 can order the list of intermediaries for recommendation to the provider.

In some embodiments, the content provisioning management system 900 may include a matching engine 936 that may receive unique provider information and match the provider to a category from a category data store 916. The category data store 916 may include information about categories and characteristics of providers that may be identified as part of the category. Based on the matched category, the recommendation engine 944 can provide a list of intermediaries associated with the category and generic intermediaries retrieved from the associations data store 918 and intermediaries data store 920. The association data store 918 may include information about provider associations with intermediaries. In some embodiments, the association data store 918 may include information about provider associations with categories, as well. The intermediaries data store 920 may include information about intermediaries including content accepted, ranking information, etc. In some embodiments, the intermediary data store 920 may include category affinities, as well. The ranking subsystem 944 can order the list of intermediaries for recommendation to the provider.

A content provisioning engine 942 may receive a selection of intermediaries from provider device 207 and determine a superset of provider information 950 to receive. The content provisioning engine 942 may receive provider information 950 and may store it in a content repository 922. The content repository 922 may include provider information 950 as well as translated content from content translation system 948. The content provisioning engine 942 may generate content objects 960 based on the provider information 950. In some embodiments, the content provisioning engine 942 may cause the provider information 950 to be translated through translation system 948. The translation system 948 may generate content 960 that matches content requirements (e.g., protocol, format, content type, and/or the like) of the intermediary system 914 in order to distribute the content 960.

A preview renderer 938 may use the provider information 950 to generate a preview of how provider content would appear if served by a particular intermediary system 914. When a preview is approved by a provider, the content provisioning engine 942 may transmit one or more content objects 960 to one or more intermediary systems 914. If needed, content provisioning engine 242 may create accounts with one or more intermediary systems 914 on behalf of a provider, may store credentials in credential store 924. The credential data store 924 may include credentials that are used on behalf of providers to access one or more accounts of intermediary systems 914. Credentials may include username/passwords, tokens, certificates, etc. The content provisioning engine 942 may use credentials to provide content objects 960 to serve via the intermediary systems 914. Content monitoring system 946 may monitor the intermediary systems 914 for changes to distributed content. Content changes may be reported back to provider device 207 by the content monitoring system 946 with recommendations on fixing any problems. The content provisioning engine 942 may implement recommendations by content monitoring system 246.

A billing system 940 may track usage, billing, and/or authorization to use the management system. The billing system 940 may bill providers based on a number of intermediaries per month, each intermediary interaction, for each service utilized and/or a monthly fee. The billing system 940 may operate in conjunction with payment processors to enable billing and payment for services.

The media channel network interface 114-1 may communicate with intermediary systems 914. The media channel network interface 114-1 may include an authorization interface 114(*a*) that uses credentials from credential data store 916 to access intermediary systems 914 on behalf of providers. A content interface 114(*b*) may be configured to send and receive content objects 960 to/from intermediary systems 914 on behalf of providers. An API interface 114(*c*) may access intermediary systems 914 using APIs and provide API access to the content provisioning management system 900 by intermediary systems 914.

In one example, a car parts store representative uses a web-browser client 207-2 to connect to the content provisioning management system 900. The representative uses the setup interface 912(*a*) to provide a provider name, address, and product/service details. The recommendation engine 944 may provide the representative with a list of intermediaries (e.g., Facebook.com™, Google Local Listings™, Yellowpages.com™, and LinkedIn.com™) from intermediary data store 920. In some embodiments, the matching engine 936 may determine that the car parts store is part of an automotive category based on characteristics from category data store 916, and the recommendation engine 944 may provide the representative with a list of intermediaries that match the category of automotive (e.g., autosbarter.com) as well as generic intermediaries from intermediary data store 920. After the representative makes the selection, the billing system 940 may require payment for the services requested (e.g., 10 intermediaries per month). The content provisioning engine 242 may determine a superset of content needed for the 10 intermediaries selected, including hours, photographs, contact information, description and a list of representative products. The content provisioning engine 942 may receive the provider information 950, store it in the content repository 920, and cause the preview renderer 938 to provide a preview of the content to the client device 207. The content provisioning engine 942 may generate content based on the information 950 which may include cause any non-conforming content to be translated through the content translation system 948 (e.g., resizing and reformatting pictures, translating formats of documents, selecting portions of provided information and inserting them into content objects, etc.). The content provisioning engine 942 may receive credentials for access to intermediary systems 914 from the client device 207 or may create them on behalf of the provider and store the credentials in the credential store 224. Using the credentials, the content provisioning engine 942 may use the authorization interface 114(*a*), the content interface 114(*b*), and/or the API interface 114(*c*) to deliver content 960 to intermediary systems 914. The content monitoring system 946 may monitor intermediary activities, responses, and may ensure that the content continues to be correctly provisioned. Corrections may be sent to the content provisioning engine 942 to be corrected.

In some embodiments, the content provisioning management system 900 may alternatively or additionally be configured to direct content 960 directly to client devices 205 without the intermediary of the intermediary systems 914. For example, content objects 960 may be directed to the client devices 205 as results to queries, end-user-initiated and/or system-initiated, serviced by the search engine services layer 245. As another example, content objects 960 may be directed to the client devices 205 as results to queries and/or recommendations, end-user-initiated and/or system-initiated, serviced by the customized orchestration layer 250, which may or may not use the search engine services layer 245 in various embodiments. In various embodiments, content objects 960 may be generated for presentation with various types of media channels (e.g., web page, WAP page, short message, television programs, news articles, etc.).

In some embodiments, one or more of the data stores 268, for example, provider information data store 249, the content data store 922, and/or the like, may contain phone numbers of target phones. Typically, the target phones belong to providers. In some embodiments, communication references may be embedded in the content 960 and provided to the client devices 205. The communication references may allow routing of calls from client devices 205 at least partially based on location in accordance with certain embodiments of this disclosure. In some embodiments, a communication reference may be a phone number. The phone number could indicate a category of providers. In some embodiments, a communication reference may facilitate a click-to-call feature.

In embodiments where a client device 205 is a mobile device, content 960 may be transferred to the device 205 through wireless communication connections, such as cellular communication links, wireless access points for wireless local area network, etc. In some embodiments, a client device 205 may be able to initiate a phone call (e.g., automatically dialing according to the encoded phone number embedded in the content information when a user selects the number). In some embodiments, dialing a phone number corresponding to a communication reference may connect the phone call to the call management system 1000, which described further below in reference to FIG. 10. The call management system 1000 may include one or more routers 1014, which may include switching equipment. The router 1014 may include one or both of a router and a decoder. In some embodiments, based at least partially on the communication reference selected, such as a phone number dialed and/or a call button selected, the router 1014 may determine one or more corresponding target communication references using the data stores 268 and may connect the phone call to one or more target provider devices 207 through the network(s) 108. The network 108 may include a telephone network that may be circuit switched, package switched, or partially circuit switched and partially package switched. For example, the telephone network may partially use the Internet to carry the phone call (e.g., through VoIP). For example, a connection between a client device 205 and the call management system 1000 may be carried using VoIP; and the connection between a router and a decoder of the router 1014 may be carried using a land-line based, circuit-switched telephone network.

Figure 10:
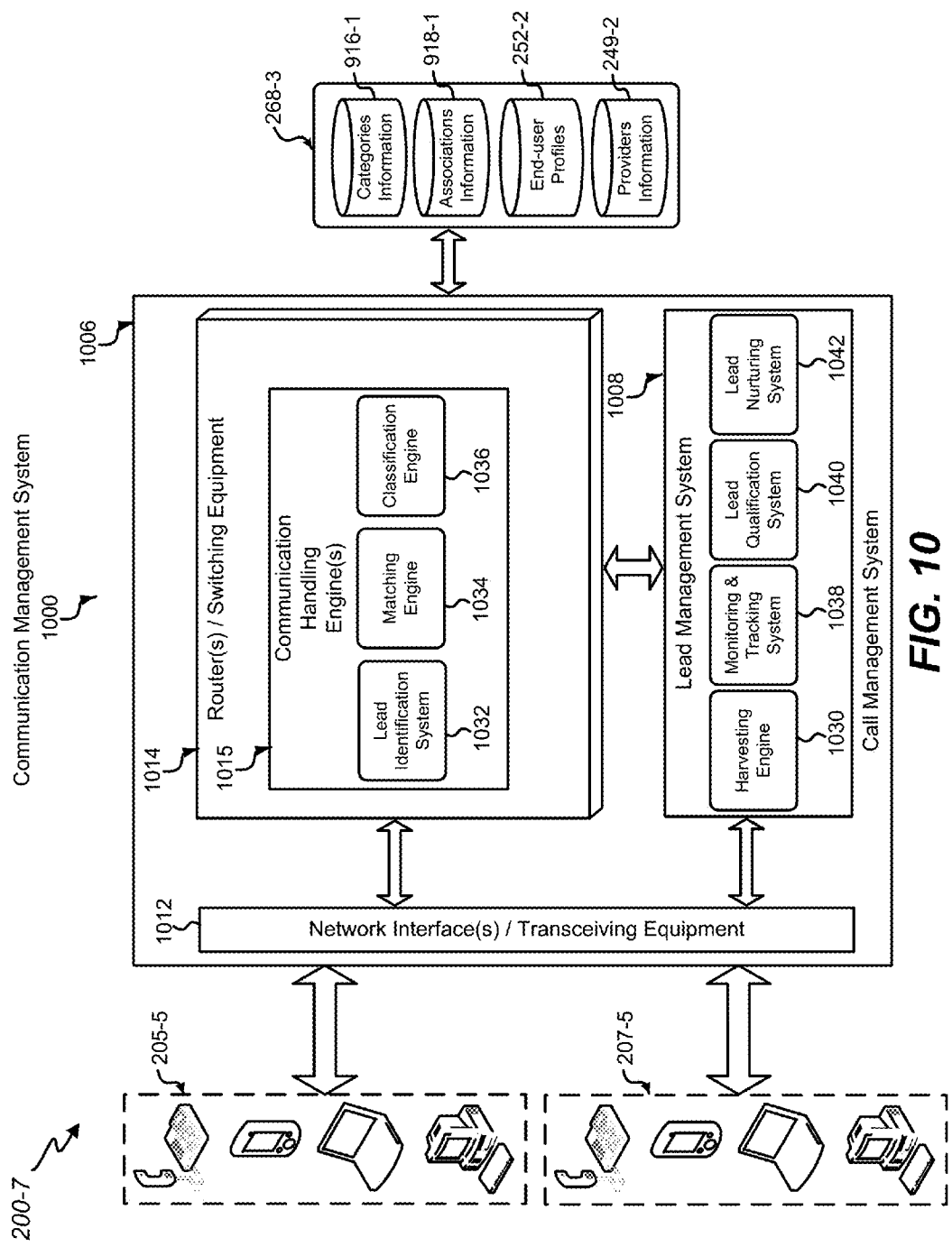
FIG. 10 shows a diagram of another portion of the architecture stack of the interaction infrastructure including certain aspects of a communication management system, in accordance with certain embodiments of the present disclosure.

FIG. 10 shows a diagram of another portion 200-7 of the architecture stack 200 of the interaction infrastructure 102, in accordance with certain embodiments of the present disclosure. The portion 200-7 may, in some embodiments, correspond to portions of the application services management layer 240 and the master data management layer 265 and, in accordance with some embodiments, may at least partially correspond to the communication management layer 260.

The communication management system 1000 may be configured to allow for routing communications between different client devices 205 and 207 and for qualifying communications in real time. The communication management system 1000 may include a call management system 1006 and a lead management system 1008. The communication management system 1000 may include may include logic to implement and/or otherwise facilitate any call handling features disclosed herein. By way of example without limitation, the communication management system 1000 may include one or more call handling modules that may be configured to one or more of decode, route, and/or redirect calls to/from subscribers and provider representatives. Similarly, the communication management system 1000 may include one or more message handling modules that may include logic to implement and/or otherwise facilitate any message handling features disclosed herein. While systems, engines, repositories, and other components are described separately herein, it should be appreciated that the components may be combined and/or implemented differently in any combination to provide certain features in various embodiments. In various embodiments, different processes running on one or more shared computers may implement some of the components.

The communication management system 1000 may be, correspond to, and/or include one or more servers that, in various embodiments, may include one or more switches and/or media gateways, such as telephone, messaging, email, application, and/or other types of gateways. The communication management system 1000 may be configured to determine which communications from end-users (e.g., calls) go to which providers (and/or vice versa). The communication management system 1000 may include one or more network interfaces 1012, one or more processors and memory. In various embodiments, one or more of the processor(s), memory, and/or network interface(s) 1012 may correspond to the one or more servers. The network interface(s) 1012 may include any suitable input/output module or other system/device operable to serve as an interface between one or more components of the interaction processing infrastructure 102 and the one or more networks 108. The network interfaces 1012 may be used to communicate over the networks 108 using any suitable transmission protocol and/or standard. The one or more network interfaces 1012 may be configured to facilitate communication between end-user interfaces 205 and provider interfaces 207. In some embodiments, for example, the communications between end-user interface(s) 205 and provider interface(s) 207 could correspond to communication between a set of callers and a set of receivers, respectively.

The communication management system 1000 may include one or more of engines and/or modules that may be stored in the one or more memories and may include one or more software applications, executable with the processors, for receiving and processing requests. The one or more of engines and/or other modules may be configured to perform any of the steps of methods described in the present disclosure. The one or more of engines may include routing engine(s) 1014 that may include logic to implement and/or otherwise facilitate any communication handling features discussed herein. By way of example without limitation, the routing engine 1014 may be configured to one or more of decode, route, and/or redirect calls to/from end-users and providers. The communication management system 1000 may make real-time decisions in order to improve end-user experience and provider service. Accordingly, certain embodiments may provide real-time, dynamic routing as a generalized solution.

The routing engine 1014 may include a communication handling engine 1015, in some embodiments. In some embodiments, the routing engine 1014 may be separate from the communication handling engine 1015. The communication handling engine 1015 may include one or more telephony switches in communication with one or more data stores and the network interface 1012. The communication handling engine 1015 may be configured to receive inbound calls from callers, determine caller data pertinent to the calls, perform information analysis of the caller data, gather additional caller data as needed, and match callers to providers. Accordingly, the communication handling engine 1015 may be or include a call handling engine. In some embodiments, the communication handling engine 1015 may include a message handling engine to provide message handling features disclosed herein.

In some embodiments, when a call transmission responsive to a content object is received, the call may be connected to the transceiving equipment 1012. The transceiving equipment 1012 may be connected to the router/switching equipment 1014, which selectively connects incoming connections from client devices 205 and outgoing connections to provider device 207. In some embodiments, the transceiving equipment 1012 and the router/switching equipment 1014 are circuit-switched, including Private Branch Exchange (PBX) and a dedicated voice network. In some embodiments, the transceiving equipment 1012 and the router/switching equipment 1014 may be packet-switched, including Internet Protocol (IP) based PBX, a data communication network and a gateway.

In some embodiments, the data stores 268 may include category information repository 1016, association information repository 1018, and lead profile information repository 252-2, which may retain any suitable information to facilitate certain features disclosed herein. Types of information are disclosed further herein with further description of embodiments using features directed to categories, associations of callers and/or providers with certain categories, associations of callers with providers, providers profiles, lead profiles and qualifications, and/or the like.

A reverse proxy may be used to monitor calls. Phone numbers may be tracked both on the end-user side and on the provider side. This stored information may be used to route calls from particular callers to particular providers. Phone numbers may be tracked to differentiate good, bad, proximate, and unknown leads. The database 252-2 storing lead information allows for a more complete picture regarding the leads that may be used for routing end-users. Where a particular provider is not available, the end-user could be routed to others. A reference number for the callee may be used to track how the end-user interacts with the callee. In some embodiments, a general vanity number (e.g., 1-800-dentist) may be used, for example. In some embodiments, an icon on a webpage, mobile app, etc. may be provided for user selection to be connected to a first available provider that may satisfy the user's request. Accordingly, with certain embodiments, an end-user may not see a number. With some embodiments, a user may provide his phone number, and then the communication management system 1000, functioning as a routing system, may call that number to join the call with a provider.

The communication management system 1000 may include a harvesting engine 1030 configured to harvest information about callers, caller areas, and/or providers. In some embodiments, the harvesting engine 1030 may correspond to the harvesting engine 256(*b*); in some embodiments, the harvesting engine 1030 may be separate and distinct from the harvesting engine 256(*b*). The harvesting engine 1030 may be configured to perform any one or combination of features directed to facilitating data capture regarding callers, caller areas, and/or providers disclosed herein. For example, the harvesting engine 1030 may gather and process caller data, which may be specific to a particular caller and/or may be generally related to the caller. In some embodiments, the harvesting engine 1030 may determine additional information needed based on caller data for a given caller. The harvesting engine 1030 may gather the additional information. The caller data may be gathered from one or more data stores of the system, such as a lead profile information repository 252-2, and/or one or more data sources via the data acquisition interface(s) 111, which could be third-party data sources.

Particular callers may be qualified based at least in part on the caller data gathered. The caller data may be analyzed with respect to individual callers. The communication management system 1000 may be configured to classify callers into one or more categories based at least in part on caller data.

The call management system 1006 may include a lead identification system 1032 configured to facilitate any one or combination of the lead identification features disclosed herein. For example, responsive to an incoming transmission from a client device 205 corresponding to a lead, the lead identification system 1032 may determine lead information. As indicated further herein with reference to FIG. 10, the lead information may include call information 1104, internal information 1108, area information 1112, specific information 1114, and/or the like. The lead information may be determined from one or more internal data repositories 268 and/or one or more data sources via interfaces 111. In some embodiments, the lead identification system 1032 may include one or more session module controllers that may identify a caller and a callee (e.g., based on the ring-to number), and may initiate SIP processes so then a free switch may determine to which number to route the call.

The communication management system 1000 may include a matching engine 1034 configured to perform any one or combination of features directed to matching or otherwise correlating information about callers, caller areas, and/or providers disclosed herein. For example, in some embodiments, the matching engine 1034 may receive caller information, identify characteristics of the caller based at least in part on lead profile information, and match the caller to one or more categories from a category information repository 1016. As another example, in some embodiments, the matching engine 1034 could match a caller to one or more providers based at least in part on correlating categories from the category information repository 1016.

The communication management system 1000 may include a classification engine 1036 configured to perform any one or combination of features directed to classifying or otherwise categorizing callers, caller areas, providers, and/or provider service areas disclosed herein. In some embodiments, the matching engine 1034 may include the classification engine 1036; in other embodiments, the two engines may be separate but work in conjunction with one another.

The communication handling engine 1015 and/or the lead management system 1008 may include a monitoring and tracking system 1038 configured to monitor any suitable aspects pertaining to callers and/or providers. For example, the monitoring system 1038 may monitor calls routed to particular providers in order to assess the success of routing the lead. In some embodiments, the monitoring system 1038 may be configured to identify whether a caller is successfully connected with a provider, whether the call is missed, whether the call is dropped/disconnected/receives a busy tone, whether the call is routed to voicemail, and/or whether a voicemail is left. In some embodiments, the monitoring system 1038 may include Automatic Number Identification (ANI) logic and Caller Name Service (CNS) to identify callers.

In some embodiments, the monitoring system 1038 may be configured to track the length of calls or other calls aspects. In some embodiments, the monitoring system 1038 may be configured to record and/or transcribe calls. In some embodiments, the monitoring system 1038 may be configured to identify and capture keywords from calls. The monitoring system 1038 may be configured to facilitate other tracking features disclosed herein, such as keeping track of confirmed leads, potential leads, confirmed spammers, and conditionally confirmed spammers. The database 252 may include and/or serve as a filtering database to store information on indicia of spam callers, such as originating numbers of spam callers. The monitoring system 1038 may build the dataset of the filtering database 252 based at least in part on who is actually calling one or more providers. The monitoring system 1038 could monitor which numbers fail to overcome the filter processes to start filtering the spam calls automatically for multiple providers serviced by the platform. In some embodiments, the monitoring system 1038 could monitor which numbers successfully overcome the filter processes to build the data set of the filtering database 252 with information on confirmed leads/non-spammers.

In some embodiments, the filtering database 252 may include known numbers and/or codes of confirmed leads. For example, online leads may be tracked with unique codes, communication references, extensions, etc. that are given to the phone system. End-users that use a client application of the platform (say, a mobile app) may be identified by phone number and/or other identification reference.

In some embodiments, the monitoring system 1038 may build the filtering database 252 with information about known spammers from data sources via the data acquisition interface(s) 111 (e.g., a website sourcing a list of telemarketer numbers). Many spammers make calls that show up as coming from certain numbers, and oftentimes the numbers are not valid. In some embodiments, the tracking system 1038 may build the filtering database 252 with information about invalid numbers as some spammers spoof numbers with invalid numbers (e.g., invalid area codes, incomplete numbers, unavailable numbers such as 1011, etc.) to allow for number validation. Accordingly, certain embodiments may provide for filtering based on detection of invalid numbers as an indication of spoofing.

The call management system 1000 may operate as a lead routing system configured to facilitate any one or combination of the lead routing features disclosed herein. The lead management system 1008 may be configured to facilitate lead management features exposed to providers disclosed herein. A lead qualification system 1040, which could include the matching engine 1034 and/or classification engine 1036 in some embodiments, may qualify the lead. For example, the lead qualification system 1040 may score the lead based at least in part on categories 1016. The lead qualification system 1040 may include logic to implement and/or otherwise facilitate any lead qualification features discussed herein. By way of example without limitation, the lead qualification system 1040 may be configured to one or more of qualify a lead according to a graduated lead scale, categorize a lead according to a category scheme, score a lead according to a lead scoring scheme, and/or the like. Various aspects of lead qualification according to various embodiments are discussed further herein. In certain embodiments, the lead qualification system 1040 may be configured to compile keyword criteria, for example, in an ontology. The lead qualification system 1040 could include an ontology reasoner or semantic reasoning module to make logical inferences from a set of facts in the ontology. Accordingly, the lead qualification system 1040 may correspond to a reasoning engine configured to effect one or more lead qualification features. A pattern-based reasoner could be employed to use various statistical techniques in analyzing call/lead data in order to make inferences based on the analysis. A transitive reasoner could be employed to infer relationships from a set of relationships related to call/lead data.

The management system 1008 may include a lead nurturing system 1042 configured to facilitate any one or combination of the post-routing lead handling features disclosed herein. For example, the lead management system 1008 may route information between a provider mobile app and the backend system for tracking of lead nurturing. In various embodiments, the lead management system 1008 may allow the system to be exposed through a provider mobile app, an online provider portal, and/or through alternate messaging means such as email. In some embodiments, the lead nurturing system 1042 may generate a nurturing scheme based at least in part on the scoring and/or category information and may transmit notifications to provider devices 207 regarding the scheme and acquire input from the providers regarding the scheme options. The lead management system 1008 may manage the nurturing communication with the lead with content objects being transmitted via email, calls, push notifications, etc. to the lead device(s) 205 and/or the like.

Figure 11:
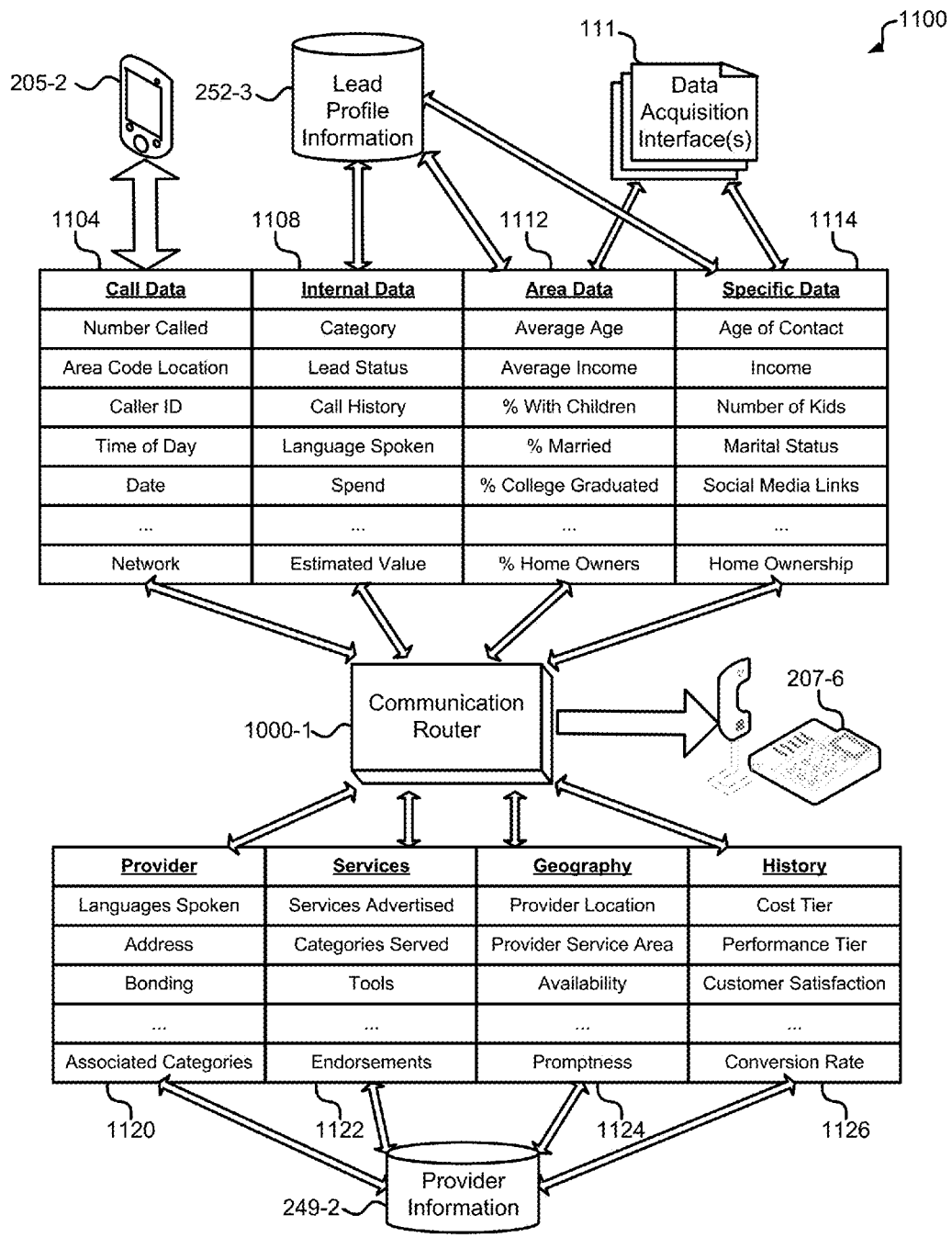
FIG. 11 illustrates certain aspects of lead routing data flow, in accordance with certain embodiments of the present disclosure.

FIG. 11 illustrates certain aspects of routing data flow 1100, in accordance with certain embodiments of the present disclosure. The communication management system 900 operating as a router 900-1 may be configured to gather caller data, which may be specific to a particular caller and/or may be generally related to the caller (e.g., information about the caller's location). The caller data may be gathered from one or more data repositories of the system, such as an end-user profile information repository 252, and/or one or more data sources via data acquisition interface(s) 111, which could be third-party data sources. Any suitable categories may be employed for characterization of callers.

The caller data may include call data 1104, such as information about any one or combination of the number called, area code, caller ID, time of day, data, network, and/or the like. The communication router 1000-1 may identify characteristics corresponding to calls based at least in part on a set of call data 1104. The communication router 1000-1 may determine additional information based at least in part on the call data 1104. The additional set of information may include additional characteristics corresponding to the calls. In some embodiments, the additional information may include additional information, such as call data 1104 and/or another type of data such as data 1108, 1112, 1114, and/or the like.

The caller data may include internal information 1108, such as information about any one or a combination of characterizations, qualifications, etc. of the call determined by the management system 900. By way of example, such information may concern any one or a combination of categories, lead status, previous call interactions, language, value, and/or the like associated with the caller. Though the example depicts certain other types of information as separate from the internal information 1108, the internal information 1108 may include other types of information.

The caller data may include caller-specific data 1114, such as demographic data. The caller data gathering may further include capturing other end-user-specific data. Any suitable end-user specific information could be harvested in order to allow for characterization of a particular caller. Using the phone number, the area from where call originates, population density, average income, age information for the area, past calls from an area to particular categories in particular time periods, and/or the like, the communication router 1000-1 may determine people in the area are facing a particular problem or that have a particular need or inclination. Thus, the caller data may include area data 1112 pertinent to the location identified for the caller.

The communication router 900-1 may identify a need of a caller and then match the caller to a provider. In various embodiments, any one or combination of various types of provider information may be used to match a caller with a provider. The provider information may include provider information 1120. The provider information may include services information 1122. The provider information may include geographical information 1124. The provider information may include history information 1126. Accordingly, data may be captured on the provider side to provide bases for routing calls.

Certain embodiments may provide for identifying the status of a lead after the call has been matched and routed to a provider. Certain embodiments may add end-user management post call routing. After the caller is connected with a service provider and an end-user selects a provider, the status of the lead may be updated to indicate the user's need is fulfilled. Similarly, where a user fails to select a provider, the status may indicate that the end-user may benefit from follow-up. Thus, other providers may be contacted or reminders may be transmitted to the originally matched provider. Additionally, if several providers are contacted, once an end-user selects a provider for a service, the system may notify the other providers.

Thus, certain embodiments may provide for efficient methods of monitoring end-users on behalf of a provider. Certain embodiments provide strong tools to monitor end-users for providers that interface with end-users via phone calls. The system may provide visibility on how an end-user lead is progressing with multiple providers in which end-user information is transmitted. With end-user information associated with a lead being matched and routed to multiple providers according to some embodiments, there is a need to determine when an end-user has decided on a provider so that the lead may be removed from the data stores of other providers, i.e., so that other providers can be notified of the change. Certain embodiments provide valuable aid to providers by identifying, tracking, and converting their leads.

Figure 12:
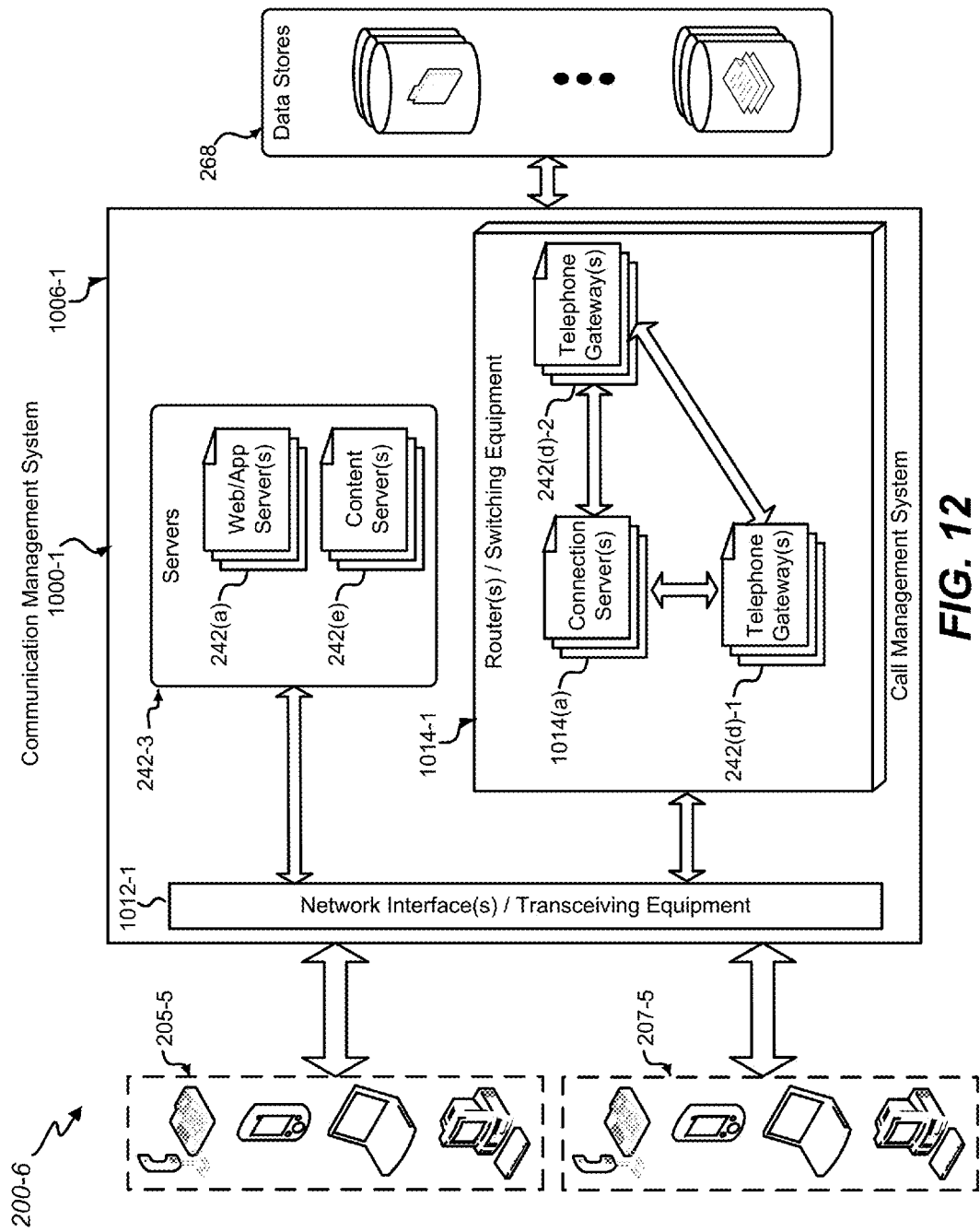
FIG. 12 shows a diagram of aspects of the communication management system, in accordance with certain embodiments of the present disclosure.

FIG. 12 shows a diagram of aspects of the communication management system 900-1, in accordance with certain embodiments of the present disclosure. In some embodiments, a client device 205 may receive content objects, particularized to certain providers and generated by the application services system 241 based on provider information from the data store 268, via a web and/or application server 242(a) of the application services system 241. In various embodiments, the client device 205 may query the web/app server 242(a) directly or indirectly. In some embodiments, the web server 242(a) or a content server 242(e) may selectively serve content objects obtained from different sources/databases. In some embodiments, one or more of the servers 242 may be included in the communication management system 900, as illustrated in the example depicted. In some embodiments, one or more of the servers 242 may be included in other portions of the infrastructure 102.

In some embodiments, the router(s) and/or switching equipment 1014 may include one or more connection servers 1014(a). In some embodiments, the connection server(s) 1014(a) may be configured to implement one or more engines and/or otherwise facilitate one or more features of the router router(s)/switching equipment 1014.

In some embodiments, when the client device 205 requests the connection server 1014(a) to provide a connection to the provider device 207 via the reference of the connection server 1014(a), the connection server 1014(a) determines whether the client device 205 is within the service area of the provider device 207 before connecting the client device 205 to the provider device 207. In some embodiments, if the location of the client device 205 is outside the service area of the provider, the connection server 1014(a) provides alternative providers who provide services similar to those of the provider and whose service areas cover the location of the client device 205.

In some embodiments, the content objects served by the web/app server 242(a) contain telephonic references, which may be used by the client device 205 to call the connection server 1014(a). The connection server 1014(a) identifies the telephone contact information of the corresponding providers based on the telephonic references called by the client device 205 and then further connects the call to the provider(s).

In some embodiments, the client device 205 may be softphone-implemented at least in part via software, such as an instant messenger, a VoIP client application running on a computer, an applet embedded in a web page, a handheld device, a cellular phone, a cordless phone, a Bluetooth phone, a WiFi phone, etc. In some embodiments, the client device 205 may be implemented via hardwire circuitry, such Application-Specific Integrated Circuit (ASIC); in some embodiments, the client device 205) may be implemented partially via special purpose hardwire circuitry and partially via software, such as Application-Specific Integrated Circuit (ASIC) or Field-Programmable Gate Array (FPGA) with software/firmware; and in some embodiments, the client device 205 may be implemented using a set of general purpose hardwire components that are under the control of software. In some embodiments, the client device 205 is a Plain Old Telephone Set (POTS).

In some embodiments, the telephonic references in the content objects that are retrieved directly or indirectly via the web/app server 242(a) are SIP URIs which contain encrypted information, such as the telephone number of the provider, an identifier of the caller, information about the query (in embodiments where the content is responsive to a query, which may be end-user generated or system-generated, such as intermediary system generated), the service geographic area of the provider corresponding to the particularized content object, and/or the position of the content object in the sorted list of the search result, etc. The connection server 1014(a) decrypts the SIP URI that is used to call the connection server 1014(a) to further connect the call to the provider.

In some embodiments, the query of the client device 205 is submitted to the web/app server 242(a) with an identifier of the caller, such as a telephone number of the caller, a user identifier of a telephonic apparatus, a serial number or other device identifier of a telephonic apparatus, an internet address of the telephonic apparatus, a softphone user ID, a number unique to the softphone user ID among different softphone user IDs, etc. In some embodiments, the identifier of the caller is encrypted in the SIP URI. When the client device 205 calls the connection server 1014(a) using the SIP URI, the connection server 1014(a) may determine whether the call is made from the same apparatus or caller that submitted the query. For example, the connection server 1014(a) may prevent other telephonic apparatuses or callers that did not perform the query from calling the provider device 207 using the result of the query. The connection provider may also use the identifier information of the caller to determine whether a query is generated by a machine in an automated fashion and to determine whether the query and/or the calls from the caller should be blocked. For example, after a provider complains about a call from a caller, the connection server may block the queries and/or calls from the caller (e.g., for a period of time) to that provider, a subset of providers or all providers.

In some embodiments, the client device 205 may be capable of making a VoIP call but using a protocol different from the protocol used by the gateway (e.g., SIP); and a gateway 242(d)-1 is used to interface the client device 205 and the connection server 1014(a). In some embodiments, the client device 205 may be capable of making a SIP call using the SIP URI to reach the connection server 1014(a) without the gateway 242(d)-1. In some embodiments, the client device 205 makes a call over a PSTN; and a telecommunication carrier bridges the call from the PSTN to the connection provider on a data network.

In some embodiments, the provider device 207 uses a telephone that is connected on the PSTN; and the connection server 1014(a) uses the gateway 242(d)-2 to reach provider device 207. In some embodiments, the gateway 242(d)-2 is operated by a telecommunication carrier of the connection provider. In some embodiments, the connection server 1014(a) uses the gateways (242(d)-1 and 242(d)-2) to set up the call and direct the gateways (242(d)-1 and 242(d)-2) to make a direct media connection that does not go through the connection server 1014(a) to provide the telephone connection between the client device 205 and the provider device 207. In some embodiments, the provider device 207 uses a telephone that is connected on a data network; and the gateway 242(d)-2 is used to bridge the protocol used by the telephone of the provider device 207 and the protocol used by the connection server 1014(a). In some embodiments, the telephone of the provider device 207 and the connection server 1014(a) may use the same protocol; and the connection server 1014(a) may call the telephone of the provider device 207 directly (e.g., via SIP) without a gateway 242(d)-2.

In some embodiments, the client device 205(a) obtains content objects particularized to providers directly or indirectly via a web server 242(a) of the connection provider. Content obtained from other sources may also be selectively presented with the content objects obtained from the data store 268 in response to a search request from the caller, in some embodiments.

In some embodiments, the connection server 1014(a) encrypts information related to the search, the provider's telephonic contact information, the caller's identification information, the ID of the server 242, etc. in the SIP URI which may be called by the client device 205 to reach the connection server 1014(a). Alternatively, other types of telephonic references may be used, such as telephone numbers with extensions, VoIP user identifiers, etc. In some embodiments, the telephonic reference may be a link to the web server 242(*a*), which may be visited to cause the connection server 1014(*a*) to callback the client device 205 at the client device 205.

The information may be encrypted/encoded in the telephonic references provided in the content objects. In some embodiments, the telephonic references may be used in a database to look up the associated information such as the provider's telephonic contact information, the keywords used in the search, caller's identification information, the ID of the distributor of the client device 205(*a*) or a ID of a partner whose web server caused the user terminal to visit the web server 242(*a*) for the search, promotions/electronic coupons provided with the content object, etc.

In some embodiments, the SIP URI provided in the content object via the web server 242(*a*) may be used to call the connection server 1014(*a*) for a telephone connection to the provider device 207. The SIP URI contains information in an encrypted string (e.g., sip:<Encrypted String>@sip.yp.com), such as information about the provider, information about the user who performed the query, information about the intermediary system that distributes the hardware and/or the software of the telephone apparatus and/or who distributes the content objects to the client device 205, and information about the query, such as a search term used in the query, the timestamp of the search, the order number of the content object in the result set, an identification of the content object, promotions/electronic coupons provided with the content object, etc. The telephone apparatus 205(*b*) is connected to the connection server 1014(*a*) at the SIP "end point," before being further connected by the connection server 1014(*a*) to the provider device 207.

In some embodiments, the client device 205(*a*) is configured to have the capability to store or bookmark the SIP URI provided in the content object. For example, the SIP URI may be stored in association with the content object or provider in a contact book maintained on the client device 205(*a*). In some embodiments, a gateway 242(*d*) is used to bridge the call from the telephone apparatus 205(*b*) that is in one VoIP domain (e.g., based on a proprietary protocol for VoIP) and the connection server 1014(*a*) that is in another VoIP domain (e.g., based on an open standard VoIP protocol).

In some embodiments, the SIP URI is provided as a communication reference which may be used directly by the telephone apparatus 205(*b*) to call the gateway 242(*d*) which further connects the call to the connection server 1014(*a*). For example, when the telephone apparatus is configured generally to initiate calls to traditional telephone numbers or VoIP user IDs (e.g., via a proprietary protocol), the telephone apparatus may be configured to treat the SIP URI as a VoIP user ID associated with the gateway. In some embodiments, a portion of the SIP URI (e.g., the encrypted string) may be used as VoIP user ID to reach the gateway.

In some embodiments, the web server 242(*a*) provides the particularized content object with a traditional telephone number instead of the SIP URI. The traditional telephone number may or may not include an extension. The telephone apparatus 205(*b*) uses the gateway 242(*d*) to access PSTN and reach the connection server 1014(*a*) via a telecommunication carrier which bridges the call from the PSTN to the connection server 1014(*a*). The telecommunication carrier may provide the call to the connection server 1014(*a*) via a SIP call. In some embodiments, the extension is to be dialed by the telephonic apparatus after the telephonic connection between the client device 205 and the connection server 1014(*a*) is established. In another embodiment, the extension is to be dialed by the gateway 242(*d*). In a further embodiment, the gateway 242(*d*) places a SIP call to the connection server 1014(*a*), bypassing the telecommunication carrier of the connection provider; and the extension is used to construct the SIP URI of the call (or be included in the SIP INVITE message sent from the gateway 242(*d*)).

In some embodiments, the gateway 242(*d*) used to bridge the call to the PSTN may prevent the connection server 1014(*a*) from identifying the caller via ANI service. To provide information to identify the caller, the gateway 242(*d*) may be further configured to provide the information about the caller to the connection server 1014(*a*) via call ID information or via extension. In some embodiments, the gateway 242(*d*) may bypass the telecommunication carrier and connect the call to the connection provider via a SIP call and provide the information about the caller in the FROM header of the SIP INVITE message.

In some embodiments, when a gateway 242(*d*) is used to bridge one protocol used by the telephone apparatus (e.g., a proprietary protocol) and another protocol used by the connection server (e.g., SIP), the telephone network is configured to route the call to the gateway that is nearest to the connection server to reduce the distance over the Internet between the gateway and the connection server. The client device 205 may use other gateways to reach other callees.

In some embodiments, the client device 205(*a*) is configured to identify a geographic area to the connection server 1014(*a*) when submitting a query; and the connection provider may return particularized content objects/listings based on the geographic area and/or selectively block the calls from end-users who are outside the service area of the providers. In some embodiments, the client device 205 is configured to identify a geographic area to the connection server 1014(*a*) when initiating a call to the connection server 1014(*a*); and the connection server 1014(*a*) may selectively block the calls from end-users who are outside the service area of the providers or provide opportunities to connect to alternative providers (e.g., through prompts provided and input received via a human operator or an Interactive Voice Response (IVR) system).

Figure 13:
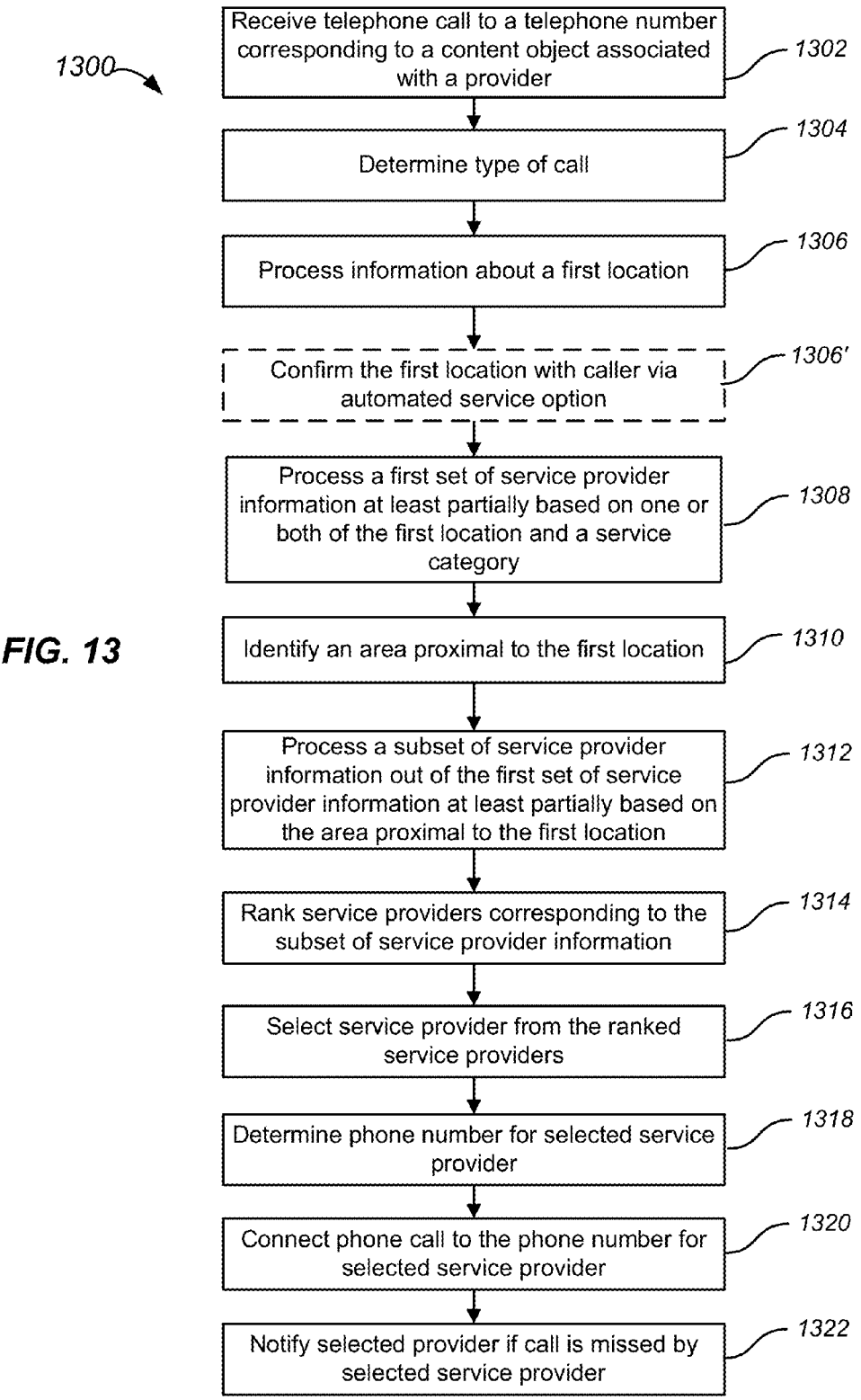
FIG. 13 shows an example method of processing providers in a geographical search area to a user of a computing device, in accordance with certain embodiments of the present disclosure.

FIG. 13 illustrates an example method 1300 of processing calls to identify providers in a geographical area associated with an end-user of a client device 205, in accordance with certain embodiments of the present disclosure. According to some embodiments, the method 1300 may begin as indicated by 1302. Teachings of the present disclosure may be implemented in a variety of configurations that may correspond to systems described herein. As such, the order of the steps comprising the method 1300 may be shuffled in any suitable manner and may depend on the implementation chosen. Moreover, while the following steps may be separated for the sake of description, it should be understood that certain steps may be performed simultaneously or substantially simultaneously.

The method 1300 could allow for user identification of search criteria at any one or more of various suitable points in the process flow, according to various embodiments. By way of example without limitation, the user may identify search criteria prior to, contemporaneous with, and/or after any one or more of the method steps. For instance, a user may enter a keyword associated with a provider into a mobile application and may obtain a telephone number for providers associated with the keyword and/or search criteria. In some embodiments, the search criteria may be set as a default, for example, for a user profile, an application, a mobile application, and/or an account associated with the user/user device. With some embodiments, an application and/or a mobile application may automatically perform one or more of the method steps.

Though not depicted in FIG. 13, in some embodiments, a mobile application 206, which is configured to run on a client device 205, may be provided. The mobile application 351 may be provided in any suitable way. For non-limiting example, the mobile application 351 may be made available from the call management system 1006 or any website for download to the client device 205; alternatively, it may be pre-installed on the mobile computing device. The mobile application 351 may be stored in the memory 334 and/or computer-readable media 346 of the client device 205.

As indicated by block 1302, a telephone call to a telephone number may be received. The telephone call may correspond to a content object for a provider. The content object may be provided by the content provisioning management system 900 through any suitable manner as described above in reference to FIG. 9. For example, the content object may be provisioned or transmitted from the content provisioning management system 900 to the client device 205 in response to a search for a provider through the mobile application 351, a user entered keyword associated with a type of service or type of provider, and/or any other activity that indicates that an end-user is looking for one or more services from one or more providers. The content object may be generic for a particular type of service (e.g., lawyers, etc.) and/or may be contact-specific for a particular provider (e.g., Bob's Law Office, etc.).

An end-user may initiate a call in order to be matched and connected with a provider. The call could have been initiated in any suitable way. For example, the call could have been initiated by an end-user dialing a telephone number that was displayed in the content object displayed through a mobile application 351. Alternatively and/or additionally, the mobile application 351 may automatically initiate a call in response to a user selecting a particular provider and/or any other information provided through the mobile application 351. In some embodiments, a telephone number may be presented in content information in a format such that, when the user selects a communication reference, the user device (e.g., a cellular phone or a computer) dials a telephone number corresponding to the communication reference. For example, the call could have been initiated by the end-user selecting a "click-to-call" option displayed via the user device. The user selection may be in the form of a keyboard/keypad input, a touch pad input, a track ball input, a mouse input, a voice command, etc. In some embodiments, user devices can automatically dial the telephone number. For example, a cellular phone, a computer or a PDA can dial a phone number using a Dual Tone Multi-Frequency (DTMF) generator. In some embodiments, the user device may initiate the phone call through a VoIP system. As described above in reference to FIG. 10, a call management system 1006 may receive a call from the end-user client device and routing equipment 1014 including a matching engine 1034 of the call management system 1006 may process the call to match a caller with the most effective provider. The matching engine 1034 may use an end-user's location as well as end-user profile data store 252-2, geographic information (from any number of third party systems) associated with the end-user's location, providers information data store 249-2, and any other information available to the call management system 1006 to determine the best match for the caller. Additional information regarding the matching processes is provided below.

As indicated by block 1304, a type of call may be determined in some embodiments. It may be determined, for example, if the call is from one or more of a landline phone, a cellular phone, a portable number, a temporary number (i.e., a number associated with a temporary or prepaid phone), and/or another line type. For example, in some embodiments, a received telephony message may be analyzed to determine a line type. Any suitable processes may be implemented for determining the type of call being received. For instance, the telephone number associated with the received message may be analyzed to determine whether any information associated with the number indicates the type of line. For example, the system may request telephone number registration information associated with the receiving telephone number to determine available information associated with the call. Additionally and/or alternatively, the telecommunication protocol of the received call and/or the telephone network (cellular, internet, etc.) over which the telephone call is received may indicate the type of call.

As indicated by block 1306, information about a first location may be processed. The information may be processed at, by, and/or with the client device 205 and/or the call management system 1006. In some embodiments, the location engine 244 may process information about a first location. In some embodiments, the information may be automatically gathered and may correspond to the location of the client device 205. In some embodiments, the client device 205 automatically determines its current position (e.g., via a satellite positioning system, or a cellular positioning system) and transmits the determined or estimated position to the location engine 244. The client device 205 could provide the position in response to a request from the location engine 244.

For example, in the case of a cellular number, the user device may be a wireless mobile device, and the location of the wireless mobile device can be determined using a number of ways. For instance, the client device 205 may include one or more GPS receivers 338, one or more accelerometers, one or more magnetometers, and/or one or more gyroscopes that enable determination of its position based on data provided by these components and/or signals received by these components, such as received satellite signals. In certain embodiments, triangulation methods (e.g., triangulation based on cellular towers, Wi-Fi-based location, carrier-provided location, or any suitable cloud-based location method, service, source, and/or technique) may be employed to identify the location of the computing device. In the case of GPS, the GPS receiver 338 may facilitate the identification of GPS coordinates.

In some embodiments, location information may be obtained from a cellular positioning system. An indication of a location from which the call originates may be derived at least in part from base stations in relation to mobile computing device. In some embodiments, a cellular communication system may determine the location of a cellular phone. In some embodiments, a location of a cellular phone may be determined using a method known as Time Difference of Arrival (TDOA) in which the reception times of a cellular signal from a mobile station are measured at several base stations to determine the position of the cellular phone. Alternatively, a method known as Advanced Forward Link Trilateration (AFLT), or Enhanced Observed Time Difference (EOTD), can be used, which measures the reception times of cellular signals from several base stations to the cellular phone.

In some embodiments, the cellular site in which the mobile device can communicate to a based station can be used to determine a rough position of the cellular phone. In general, any method used by a cellular phone provider to get location information (e.g., for emergency service) can be used. An access point for a wireless local area network or a wireless personal area network typically has a small coverage area. Based on the location of the access point, location information (e.g., the city, or more precise location information) can be obtained. Location information may be obtained from a cellular location server, in some embodiments. The location may be based at least in part on and/or determined at the mobile station or determined at a server station. In some embodiments, a third party data source (e.g., accessed through a data acquisition interface 111), such as a cellular provider system, may provide an indication of a location from which the call originates.

In some embodiments, the location of the mobile device may be determined via a satellite positioning system or a pseudolite positioning system. The location of the mobile device may be determined automatically through a Global Positioning System (GPS) receiver that is connected to, or built within, the mobile device. Pseudolites are ground-based transmitters signals similar to a GPS. Pseudolites are useful in situations where signals from an orbiting satellite might be unavailable, such as tunnels, mines, buildings or other enclosed areas. A satellite/pseudolite signal receiver may determine its location and transmit the location through the cellular phone to a cellular communication system, or transmit the received signals to a location server which computes the location.

If the call comes from a landline phone, then an area associated with the phone number of the calling device may be indicated as being associated with the calling device. For example without limitation, the area code of the number may indicate an area associated with the calling device. The first six digits may more specifically indicate an area associated with the calling device. For example, the three digit area code and three digit central office code of a caller number can provide geographic information of varying specificity depending on the population density of an area and the number of area codes and/or central office codes associated with a particular city, state, region, etc. This may indicate a location of the caller. For example without limitation, this may indicate a location of the caller within a radius of 15 miles, depending on the particular area.

In some embodiments, a geographic area associated with the phone number may be determined via a look-up in any suitable database using the telephone number of the caller. In some embodiments, a portable number may be identified at least partially based on cross-referencing one or more of portable telephone numbers, portable number databases, customer records, subscriber databases, operator databases, centralized databases, donor databases, and/or the like.

In some embodiments, the telephone number of the caller may be determined through Automatic Number Identification (ANI). For example, the communication handling engine 1015 may determine the phone number of the user through ANI, which is a phone system feature that provides the billing number of the person making the phone call. Thus, the user phone number can be automatically determined through ANI, and ANI can be used to determine location information. Although the location information determined from ANI may not represent a correct position of a mobile device, content information about the location determined from ANI may still indicate a useful geographic area for the user. In some embodiments, caller name information from calling name delivery (CNAM), also known as caller identification or caller ID, may be used to determine particular details about the caller.

In some embodiments, IP address of a computing device, for example, a mobile computing device such as a tablet, may be a basis for location information. In the case that the user device is accessing the Internet through an Internet Provider, location information for the user device can be obtained automatically from the Internet Provider.

In some embodiments, location information can be identified based on past interactions with a telephone number of an end-user and thus, the call management system may compile a database of end-user calls. For example, past searches and/or call interactions may be stored and used for inferring a location for a present search and/or call interaction. For example, the last 5 calls from a particular end-user may have related to a particular area and/or region and the system may determine that the area is a home search area and/or location for the end-user.

Additionally, in some embodiments, location information can be based at least partially on past experience with an end-user profile or other past interactions through the mobile application operating on the end-user communication device. For instance, past interactions through the mobile application that did not necessarily result in a telephone call may be stored and analyzed to determine both a local and/or home location of an end-user. For instance, if 90% of an end-user's previous searches through the mobile application related to a certain geographic region, a city, and/or a metropolitan area, the system may designate that area as a home location for the user device, user profile, telephone number, and/or any other information associated with the end-user that may be identified during a call. Additionally, more granular location determinations may be possible such that a system may determine a work location, second home/vacation home location, a gym, and/or any other location based information that can be gleaned from a user's previous call and mobile application interactions.

In some embodiments, the one or more data repositories 268 may store statistics of the monitored user interactions to determine an indicator of the level of end-user need for a provider listing. For example, user interactions in a particular area may indicate that end-users in the geographic area are having a lot of flooding issues. Additionally and/or alternatively, in some embodiments, monitoring end-user interactions with particular providers may show that certain providers are more popular than others. In some embodiments, the popularity of a provider listing among a set or subset of users, such as users of specific mobile computing device products, of a particular gender, of a particular age or age range, and/or having other suitable characteristics, may be analyzed and factored into provider matching and call routing. Such information may be obtained from other end-user interactions through the call management system 1006 and/or may be obtained from third party data providers through one or more network interfaces. For example, the data repository 268 may monitor web access by end-users to a provider listing, interactions between users and providers, and/or other information related to one or more providers through the interaction processing infrastructure 102. The end-user provider interaction information may be monitored and stored in any suitable manner. For example, the data repository 268 may store the interaction information in the form of counts of user interactions with provider listings.

In addition or in the alternative to automatically-gathered location information, a user may enter location information through the mobile application 351 operating on the client device 205. For example, the user may identify a location as a search criteria and/or a geographically important area for the call. The user may enter an address, a partial address, a city, a zip code, a location keyword, a location on a displayed map, or any suitable location-indicating information. As noted previously, the user may enter location information corresponding to a place of work, the user's home, or other favorite locations.

In some embodiments, location information can be obtained from user and provider preference data. In some embodiments, when the user searches for information without explicitly specifying a geographic area, the geographic area used for searching and filtering can be determined based on a typical geographic radius associated with the search criteria and/or service topic and the location of the user. For example, construction contractors may have a typical distance that such providers are willing to travel. Thus, the proximal area and/or search location for a call may be determined to be the location of the user plus a geographic distance that the type of provider is typically able to travel. As such, different types of searches and/or calls can have different distances and radii that such providers may be willing to travel depending on the type of service and/or the particularities of the provider. Accordingly, the radii of the call location and/or search location around the end-user location based on the request for one type of provider may be different for a different type of provider. In some embodiments, information associated with particular communication reference/phone number, such as the media channel used to provide the communication reference/phone number to the user, is decoded/retrieved using the provider information repository 249. Thus, the information associated with the communication reference/phone number can be tracked/stored, and location information can be inferred from the tracked information.

As indicated by block 1306', some embodiments may include an option where the first location may be confirmed with the caller. At any suitable point after the first location has been identified, the first location may be confirmed via an automated check. For example, an automated service option could be directed to the caller, saying, "We see you are calling from near Petaluma, is that right? If that is not right, state the location or press 2." If the first location is correct, the process flow may continue based on that first location. If the first location is incorrect, a different location may be identified. For example, a response by the caller indicating the different location may be identified with the voice recognition system and the call handling engine. The different location could be entered by the caller via the computing device in any suitable way. With the different location identified, the process flow may continue based on that different location as the first location. Accordingly, while the first location may be guessed with proximity techniques, if the guess is wrong, the call is not misdirected to providers that are not serving, or preferring to serve, that particular location. As such, by confirming an inferred location with an end-user, the system ensures that system resources are not being wasted and increases the chances of a successful match with a provider. Accordingly, the accuracy and efficiency of the call processing process and the call matching engine can be further increased through automatic confirmation with an end-user.

As indicated by block 1308, a first set of provider information may be processed. The first set of provider information may correspond to a first set of identified providers. The provider information may be stored in one or more data repositories 249. For example, the first set of provider information may include any suitable listings, location, and/or provider information corresponding to any number of providers. In some embodiments, the first set of provider information may be selected based at least in part on the first location. For example, those providers having selected options for location-based filtering of incoming calls in response to content objects may have identified distance thresholds, and, if the first location is within a given distance threshold specified by a given provider, then provider information corresponding to that provider may be included in the first set. For example, a particular provider may only want to be routed calls within 10 miles of the provider's store location. If the first location is within that specified range, information corresponding to the particular provider may be included in the first set of provider information. Accordingly, a first set of provider information may be processed based on the mutual proximity of the caller and the provider(s).

In some embodiments, the first set of provider information may be selected based at least in part on a type of service associated with a call. Any suitable method may be implemented for obtaining a type of service for a call. For example, in some embodiments, the first set of provider information may be selected responsive to a user selection of search criteria for provider information. For instance, if the call is responsive to a content object associated with one type of providers, only information corresponding to those providers may be included in the first set of provider information. Thus, the providers in the first set of provider information may be limited to a particular type of service for a call based on the telephone number used to contact the call management system 1006 and/or other search criteria or mobile application interactions performed by a user.

Additionally, in some embodiments, step 1308 may be performed prior to and/or independent of any user selection of search criteria for provider information. For example, in some embodiments, a user may call a general number for the call management system 1006 that is not associated with a particular provider criteria or service provider type. Thus, the matching engine 1034 may attempt to infer an end-user's service type search criteria without any specific indication by the end-user. As such, the system may analyze any one or any combination of, for example, past call interactions, mobile application use, historical location information, previous service requests, general information associated with the end-user's home, work, or current location, and any other user-specific information in order to obtain the best matching providers. For example, if an end-user's home location is flooding or otherwise having a wide problem shared amongst multiple end-users in the area, and the user information indicates that the end-user or a family member is a home owner, then contractors and other providers associated with the inferred search criteria (e.g., providers related to flooding), may be included in the first set of provider information. However, in such embodiments, because the inference may be based on circumstantial inferences, service providers for multiple different types of inferred search criteria may be included in the first set of provider information. Accordingly, for the same call, a second type of provider that is completely different from flooding providers may also be included in the first set of provider information.

Accordingly, some embodiments are capable of using user historical information (either through the calling system and/or mobile application use) as well as third party system and/or other end-user information to infer search criteria for determining provider information for a call matching process. Thus, embodiments of the call matching system can constantly determine the most useful information for end-users whether they specifically request information in a particular subject or not. Thus, the system efficiently and effectively determines the most likely provider match of the user without requiring the end-user to specifically request particular information and/or require the end-user to answer questions in order to build an end-user profile database of specific needs or personal information about the end-user. In various embodiments, step 1308 may be performed at, by, and/or with the client device 205 and/or the search engine 246 of the call management system.

As indicated by block 1310, an area proximal to the first location may be identified. The area proximal to the first location may correspond to a search area. In other words, the area may be the prime area in which to search for providers. According to some embodiments, the call management system 1006 identifies the area proximal to the first location. According to other embodiments, the mobile application executed on the client device 205 identifies an area proximal to the first location. In some embodiments, the area selector 247 identifies an area proximal to the first location. Any number of different methods may be implemented for identifying an area proximal to the first location and additional information regarding determination of the area proximal to the first location is further described below in reference to FIGS. 14-17.

Some embodiments may determine the most likely providers matching an end-user's needs by identifying an area proximal to the first location. Depending on the action and information available to the system, some embodiments may perform a number of calculations to determine the area proximal to the first location including the generation of a heat map based on user-specific and/or available historic user information, the location, and the provider information available in the area. In embodiments where less information is available and/or patterns associated with the user's behavior and/or location are not as apparent to a system, the proximal area may be much simpler to calculate. For instance, in embodiments where there is limited information available regarding the user's needs, prior interactions in the area, purpose for a user being present in that area, etc., a circular area of equal distance surrounding the first location may be used as the area proximal. For instance, if the user is stationary and has not provided an indication of the direction and/or purpose for their request, the area proximal may be calculated as any area within a circular 5 mile radius around the first location. However, where a user is moving (or about to move based on an indication of intent), the system knows the direction the end-user is headed based on the changing direction of the end-user client device and/or where the system knows nearby areas that the end-user has shown a previous need or has previously interacted with, the system may generate a spherical or shaped area including those areas that have special significance and/or where such information indicates that the end-user may be traveling to.

Accordingly, embodiments of the call management system 1006 may use a variety of different types of information about an end-user to determine potentially matching providers for the user call. Further, the call management system 1006 may factor these different types of user information into determining the searchable and/or filtering area proximal to the end-user's location. This is advantageous because it allows the call management system 1006 to effectively identify resources that match the end-user's current needs based on information that the end-user and/or providers are both conscious and unconscious of. This allows the system to provide the most effective provider information to the end-user in the quickest and most efficient manner without wasting the system resources and/or time of providers fielding non-specific, uninterested, and/or poorly matched end-user calls.

As indicated by block 1312, a subset of provider information out of the first set of provider information may be processed. The subset of provider information may correspond to a subset of identified providers. In some embodiments, the subset of provider information may be selected based at least in part on the area proximal to the first location. For example, those providers located within the area proximal to the first location may be identified, and the subset of provider information may correspond to those providers. For instance, the call management system may cross-reference the area proximal to the first location with the indicated area of service and/or location of a provider from the first set of provider information.

In some alternative embodiments, steps corresponding to blocks 1310, 1312 may be performed prior to steps corresponding to blocks 1308. Accordingly, an area proximal to the first location may be a basis for the first set, and the criteria discussed with block 1308 may be a basis for refining the first set to identify a subset. Additionally, in some embodiments, additional criteria, additional device location readings, and/or any other information based on the user's information data store and/or provider information data store may be used to further refine the final set of provider information for a call. For instance, in some embodiments, a threshold number of provider results may be implemented such that the system may continue to obtain additional details from the user's information and/or provider's information data stores until a list of providers of the appropriate size is determined. Additionally and/or alternatively, in some embodiments, criteria may be removed until a set of providers of the appropriate length is obtained for the call.

As indicated by block 1314, the providers corresponding to the subset of provider information may be ranked using any suitable criteria. In some embodiments, the ranking of the providers is partially based on the degree of matching between the end-user's determined geographic area and the provider's service area. For example, in some embodiments, when other conditions are the same (e.g., matching between search content and service, etc.), the further the provider is from the user in distance, the lower the rank of the corresponding provider. However, other criteria and/or matching information may outweigh pure distance calculations at times. In some embodiments, providers may ranked by how well they correlate to heat mapping based on various combinations of user data, location data, and provider data, as discussed herein.

As indicated by block 1316, a provider may be selected from the ranked providers. The selected provider may be the top-ranked provider, may be a lower-ranked provider where the top-ranked provider is not available for any reason, and/or a queue of providers may be selected in some embodiments where messages and/or notifications are being generated and transmitted to multiple providers.

As indicated by block 1318, a phone number for the selected provider may be determined. For example, in some embodiments, the communication handling engine 1015 may determine the phone number for the selected provider using the provider information repository 249. The communication handling engine may request the telephone reference from the provider information repository once the provider is selected for the telephone call or may obtain the telephone reference number for the top 5 number of providers to initiate a backup call and/or transmit a notification to the top ranked providers associated with the end-user after or concurrent with the call to the top-ranked provider.

As indicated by block 1320, the phone call may be routed/connected to the received phone number for the selected provider. For example, in some embodiments, the communication handling engine 1015 may connect the phone call, as discussed herein. Any suitable method for connecting the call may be used as described in the call management system description herein. For example, the communication handling engine 1015 could direct the call to the telephone number of the provider. In some embodiments, a phone router may transfer the call to the telephone number of the provider. In some embodiments, the telephone number of the provider may be provided to the user device, and the user device may initiate the phone call. In some embodiments, a phone router may be used to initiate phone calls both to the user device (or a separate user phone) and the target phone and then join the phone calls to connect the user to the target phone. In some embodiments, the selection of the target phone number is transmitted to the corresponding media channel, which forwards the request for making the phone call to a server (e.g., a web server) connected to the phone router. Alternatively, the content information can be formatted so that the selection is sent directly to the server that is connected to the phone router.

As indicated by block 1322, in some embodiments, one or more notifications may be transmitted to the selected provider if the call is missed by the selected provider or if any other notification criteria is triggered. For example, in some embodiments, keywords recited during a call and/or caller information may indicate to the system that a notification should be sent to the provider with the caller information, metadata, etc. In some embodiments, other providers may have notifications transmitted to them, not just the selected provider. For example, the top three ranked providers may be have notifications transmitted to them that an end-user was in their area and called for a particular service.

The one or more notifications may be based on a first location of the end-user and/or the area proximal to the end-user. For example, a provider may have previously identified how missed calls should be handled based on the location of the end-user. A provider may have previously identified the means of transmission for the notification, such as by one or more of email, short message service (SMS), voice mail, fax, or other communication channels, such as instant messaging, posting to the provider's website, etc. For instance, a provider may determine that if an end-user is headed in their direction, is within a short distance (i.e., 1 mile), and the service category associated with the provider typically includes short notice interactions (e.g., restaurants, haircuts, dry cleaning, manicures/pedicures, etc.), the provider may set their provider information to ensure that all possible methods of contacting the provider are met. For example, a SMS message and instant message may immediately be sent to the provider.

However, where the end-user is moving away from the provider, is at a medium and/or long distance away from a provider location (e.g., in a different city), and other indications show that the end-user is not likely to be urgently searching for a service provider at that moment, less urgent means of communication may be configured for contacting the provider. For instance, an email, a voice mail, a website message, etc., may be delivered so that they can respond within an amount of time commiserate with the urgency of the call. Accordingly, some embodiments allow a provider to configure their routing and/or contact preferences in a manner that matches their service. Thus, the system allows for efficient and thoughtful use of system resources and allows providers to handle calls from end-users according to the level of user need and/or likelihood of productive use of resources.

Further, note that in some embodiments, the system may determine that the user's likelihood of a call being productive for the provider is so low that a live call is not a beneficial use of a provider's resources. As such, the system may not attempt to contact the provider through a phone call at all and instead may transmit a notification to the provider of the end-user's call. Further, in some embodiments, notifications may be posted to a provider's website, service page, newsgroup, instant messenger, and/or any other area that a provider indicates as being associated with a particular distance range and/or productivity ranking for a call. Such embodiments are described in further detail below in reference to FIG. 18.

The call management system 1006 may automatically generate the notification(s) message based on the provider's preferences. To address missed calls, a provider may specify a filter based on the location of the caller. For instance, if a caller is located within a certain distance threshold of the provider, such as within 20 miles of the provider, a certain means of notification transmission may be used for missed calls. For example, an SMS text may be transmitted to the provider as notification of the missed call in some embodiments. In some embodiments, another means of notification may be used for other missed calls not meeting the distance criterion. Providers could specify any number of distance criteria and corresponding handling criteria. In some embodiments, providers may specify that no notifications be sent unless a distance criterion is met. For example, notifications may be posted on a website or app for later review by the provider. In some embodiments, the provider may specify that certain calls be recorded.

In some embodiments, providers may specify any suitable criteria for call handling. For example, providers may specify a provider's service area that may include more than a simple distance criterion. In various embodiments, the provider's service area may include any combination of the various features discussed herein with respect to a geographical area search criteria that may or may not be based on a user input. Accordingly, in some embodiments, two geographical areas may be employed by the system to determine the best match for a call: (i) a provider's service area and (ii) a user's area of need. Thus, in some embodiments, selection of a provider and subsequent call connection between the caller and the selected provider may be based at least partially on a union of a provider's service area and a user's area of need/interest. Thus, in some embodiments, additional criteria may also be used along with user location to determine a match between an end-user and a provider including service area, the previous interactions of the caller, a type of call being initiated, the number and identity of previous calls made by the end-user, the configuration of the provider's current system (i.e., on hold, already busy with a call, designated as on vacation, etc.), and/or any other suitable information associated with the provider and/or the end-user.

Additionally, in some embodiments, a notification may be transmitted to one or more providers instead of a call being connected. For instance, if the system determines that the interest level of the caller is lower than a threshold set by the provider, the system may generate a notification message instead of connecting the call. By allowing providers to further control when and by what level of interest an end-user may have before being directly connected to a provider, the system may allow providers to filter quality calls without taking time and system resources to discuss with multiple end-users that are low quality, unlikely to obtain the provider's services, attempting to solicit business, etc. For instance, in some embodiments, an interest level may be calculated based on the user's location and relation to their home location, the user's information, etc.

Further, in some embodiments, whether a call is connected or not, a notification may be generated and transmitted to the provider and/or the top-matched providers that indicates information associated with the end-user. For instance, a provider may receive a routed call from a user that is then disconnected before a full call or question can be answered.

However, a notification can be provided to the provider with the end-user's information so that the provider may follow up with the end-user at a later time to ensure their questions are answered. The provider may set criteria for such notifications including call length, keywords, and/or any other information to allow the provider to filter those calls that are high quality and those calls that were incorrectly routed and/or of lower quality.

Figure 14:
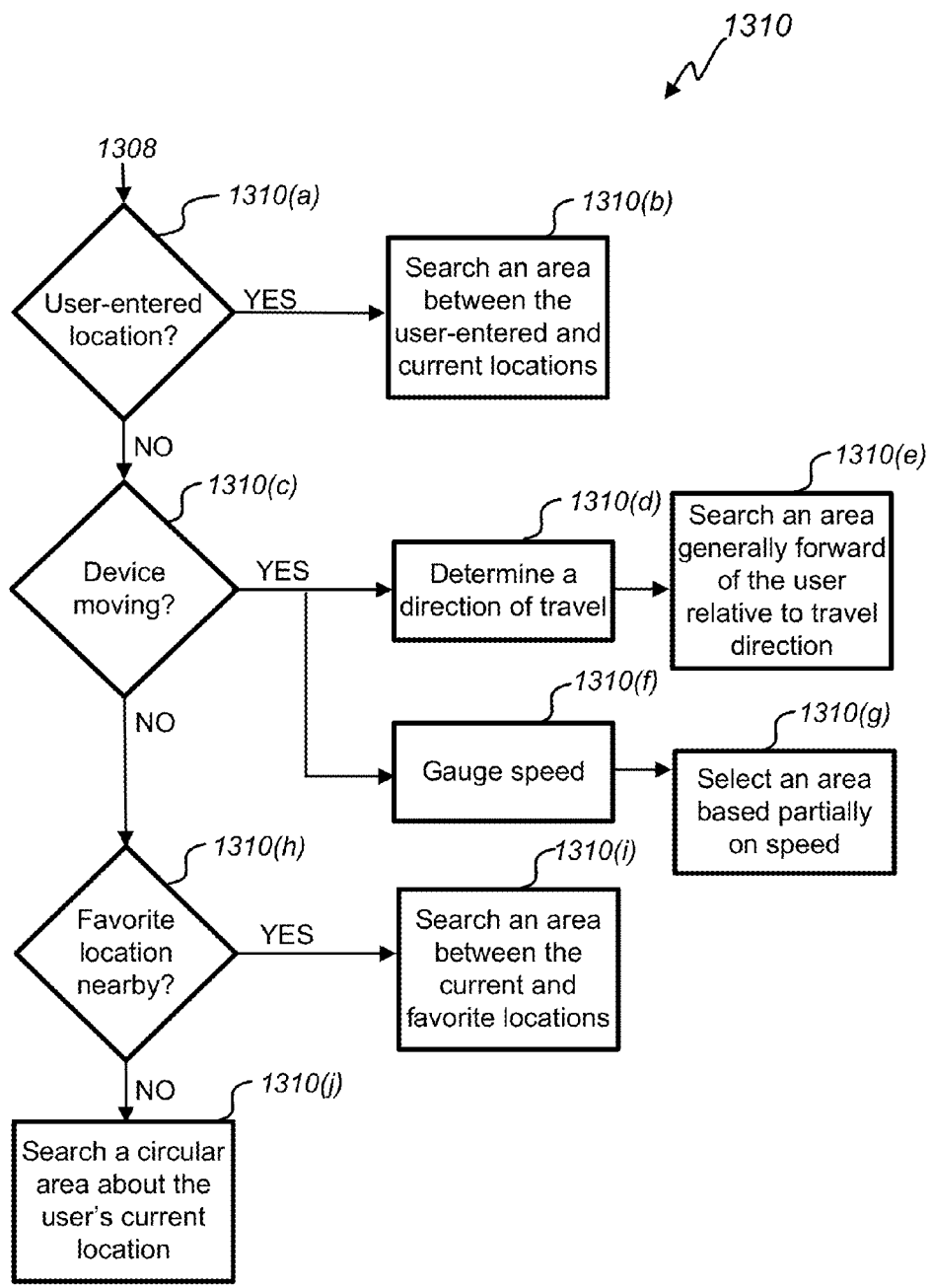
FIG. 14 shows an example subprocess of the method of processing providers in a geographical search area to a user of a computing device, in accordance with certain embodiments of the present disclosure.

FIG. 14 illustrates an example subprocess 1310 corresponding to step 1310 of method 1300, in accordance with certain embodiments of the present disclosure. In various embodiments, a search area proximal to the first location may have any of various suitable forms. A search area near the first location may be a circular area having one or more particular radii around the location with the location as the origin. The form of a search area may be tailored to the specific needs of the user. For example, if the user is at a workplace, it may be more appropriate to search an area between the workplace and the user's home. In such circumstances, a search area taking the form of a semi-circle, triangle, funnel-like shape, or other suitable shape generally extending from the workplace toward the home may be most convenient for the user so that the user does not go away from the user's usual path or direction home.

One non-limiting example of the subprocess 1310 may begin with a transition from block 1308 to step 1310(a). As indicated by block 1310(a), it may be determined whether the user entered a location or whether the process flow is based on the user's current (e.g., GPS-based) location. In the case of the user having entered a location, the proximal area to be searched may lie between the user's current location and the user-entered location, as indicated by block 1310(b). For instance, if the user-entered location corresponds to the user's home and the user's current location is in the same general vicinity, a primary search may target an area between the current location and the user's home location. If the primary search yields insufficient results, the search area may be expanded.

In the case of the user not having entered a location, it may be determined as indicated by block 1310(c) whether the user is moving, as indicated by movement of the client device 205. To make that determination, information about a second location may be processed in certain embodiment. Additional location information about the client device 205 may be automatically gathered, for example, via GPS coordinates. Alternatively, the user may indicate that the user is traveling in some cases via input to the client device 205.

If the client device 205 is moving, then a direction of travel may be determined, as indicated by block 1310(d). The call management system 1006 and/or the mobile application 351 may be adapted to determine a direction of travel based, at least in part, on the multiple locations identified. As indicated by block 1301(e), with a direction of travel determined, the search area for searching may be restricted to an area generally forward of the first location and the second location, relative to the direction of travel.

As indicated by block 1310(f), a speed of travel or movement may be gauged in some embodiments. For example, the call management system 1006 and/or the mobile application 351 may be adapted to determine a speed of travel based, at least in part, on correlating time information with the multiple locations identified. As indicated by block 1310(g), with a speed of travel determined, the selection of the search area may be based at least partially on the speed. As one non-limiting example, a semi-circular area forward of the user may be appropriate for lower rates of speed (e.g., at walking speed). Likewise, lesser radii may be appropriate for lower rates of speed. Conversely, a semi-circular area and lesser radii may not be appropriate for higher rates of speed (e.g., for a user traveling at a high rate of speed in a vehicle on a highway, a semicircular search may require backtracking by the user). A triangular or funnel-like shape, e.g., generally extending outward from the user's current location along the user's direction of travel may be most convenient for the user to minimize deviation from the user's route. Thus, the rate of speed may be classified by a movement mode that may correspond to walking, slow driving, fast driving, etc. Thus, the shape of the search area that is selected by the call management system 1006 may be based at least partially on the characterized activity of the end-user communication device as being associated with the one or more of the movement modes.

As indicated by block 1310(h), in the case of no user movement, in some embodiments, it may be determined whether one of the user's previously identified favorite locations is in the general vicinity of the user's location. If so, an area between the current and favorite locations may be searched, as indicated by block 1310(i). For example, if the user is in the general vicinity of the user's home, but not currently at home, it may be more appropriate to search an area between the user's current location and the user's home. And finally, as indicated by block 1310(j), absent other considerations, a search area near the user's current location may be a circular area having a particular radius around the location, with the user's current location as the origin.

According to some embodiments, the call management system 1006 identifies the search area; according to other embodiments, the mobile application 351 executed on the client device 205 identifies the search area. In certain embodiments, the search area may be iterative modified dependent upon the results of one or more searches. For example, an initial search for an initial search area in rural location may yield too few or no results; and the search area may consequently be expanded to increase the results.

Figure 15:
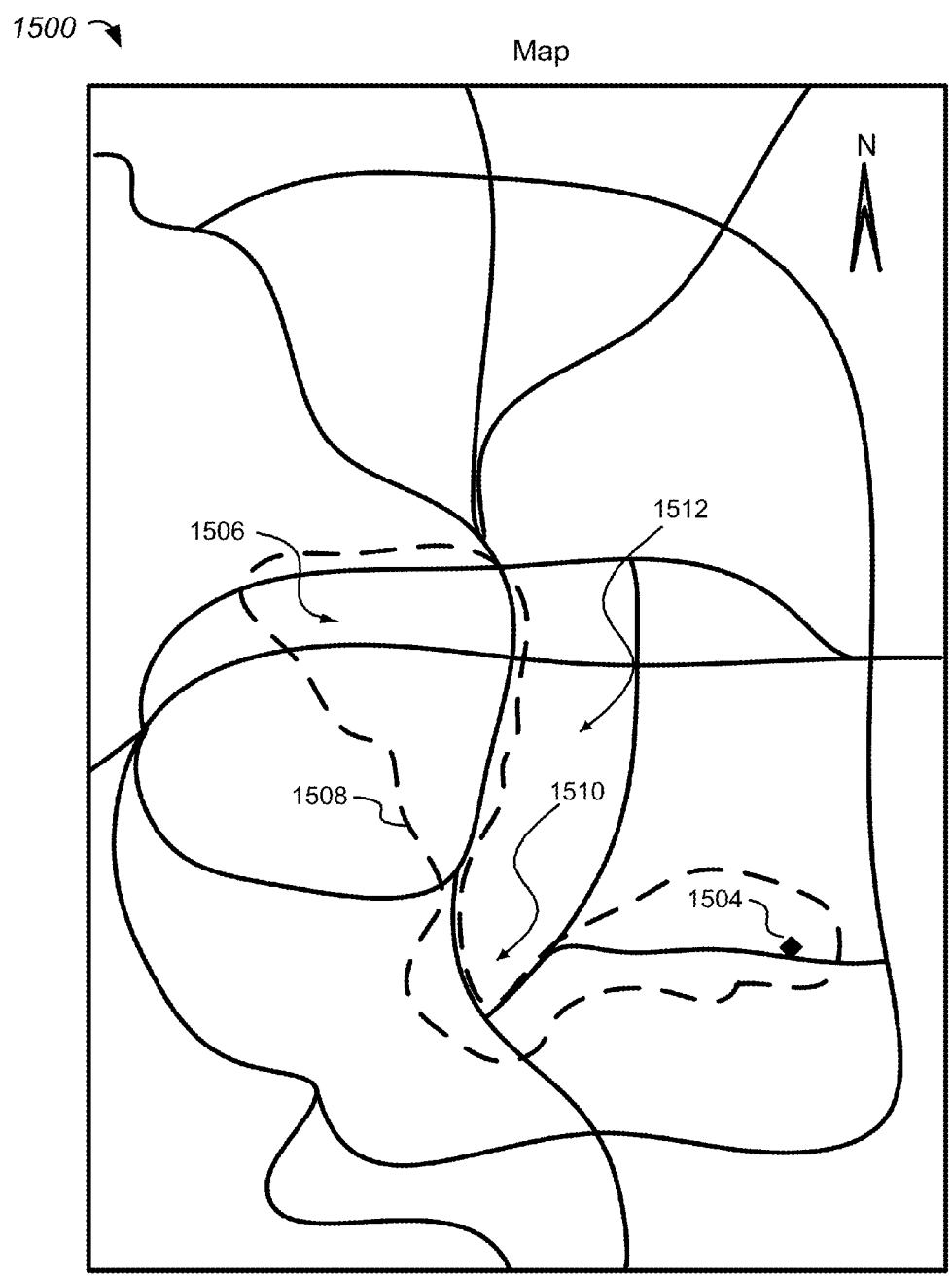
FIG. 15 shows a non-limiting example of a search area associated with an end-user of a call, in accordance with certain embodiments of the present disclosure.

FIG. 15 depicts an illustrative map 1500, in accordance with certain embodiments of the present disclosure. The map 1500 depicts various roads 1502 in an example location. The roads 1502 may represent the major highways in the location, while it is to be understood that other streets are omitted from FIG. 15 for the sake of clarity. In certain embodiments, the map 1500 may correspond to a map display on the client device 205.

FIG. 15 shows one non-limiting example search area 1508. The first location may correspond to a location 1504. In various embodiments, a search area could include a circular area about the origin 1504. A search area may not be circular but could be defined by any shape. The shape of a search area may be irregular, as in the example search area 1508. In some embodiments, the more information that is known about a particular end-user and/or the interests of the end-user, the more irregular and/or form-fitted a search area may be in shape. As such, where little is known about an end-user, the shape may be a simple circle, rectangle, triangle, etc., because it is difficult to know what interests and/or location that the end-user may be interested and/or moving toward. However, if there is a rich data set of interactions with the user, the system may more accurately infer the search area the end-user and may use the additional information to more effectively match potential providers to the end-user's location.

A search area may encompass and/or be defined by/with respect to a metropolitan area, commercial district, and/or the like. A search area may be defined at least in part by political, physical, and/or topographical map characteristics.

The form of a search area may be more tailored to the specific needs of the user in some embodiments, e.g., by taking into consideration a user's direction of travel. In the example search area 1508, the search area 1508 may be based on the user's direction of travel from the origin 1504. The search area 1508 may be based on the likely routes the user may take. A search area may be defined at least in part by deviation. For example, the deviation could be a max distance from one or more routes from the origin. The deviation could be quantified in distance as the crow flies (i.e., the shortest distance between the origin and the destination), driving distance, and/or driving time. For example, the search area 1508 may exclude an area 1510 that, while being close to the main highway, would involve relatively greater deviation in driving time and distance.

As another example of taking into consideration a user's direction of travel, the search area may be a triangular or funnel-like shape, e.g., generally extending outward from the user's current location along the user's direction of travel may be most convenient for the user to minimize deviation from the user's currently traveled route. Such a search area may be appropriate for relatively long and/or straight stretches of highway.

A search area could exclude certain locales for any of a variety of reasons. For example, a high-crime area could be excluded. For example, the search area 1508 may exclude an area 1512 because it has a high rate of crime relative to other areas nearby or because of any suitable reason. Other non-limiting examples of features of an area that could also be excluded include areas with known poor service records, poor facilities, high traffic areas, etc. An end-users' previous interactions, current location, and/or from any other information may be used to determine relative information regarding end-user expectations between areas.

Accordingly, the search area may be used as a search filter for searching for providers. And, accordingly, a set of identified providers may have corresponding locations in the search area. If no results are identified for a particular search area, the search area could be iteratively expanded in an attempt to capture one or more results. For example, in the event that a search in the search area 1508 yields no results, a different search area may be identified and used as a search filter.

Figure 16:
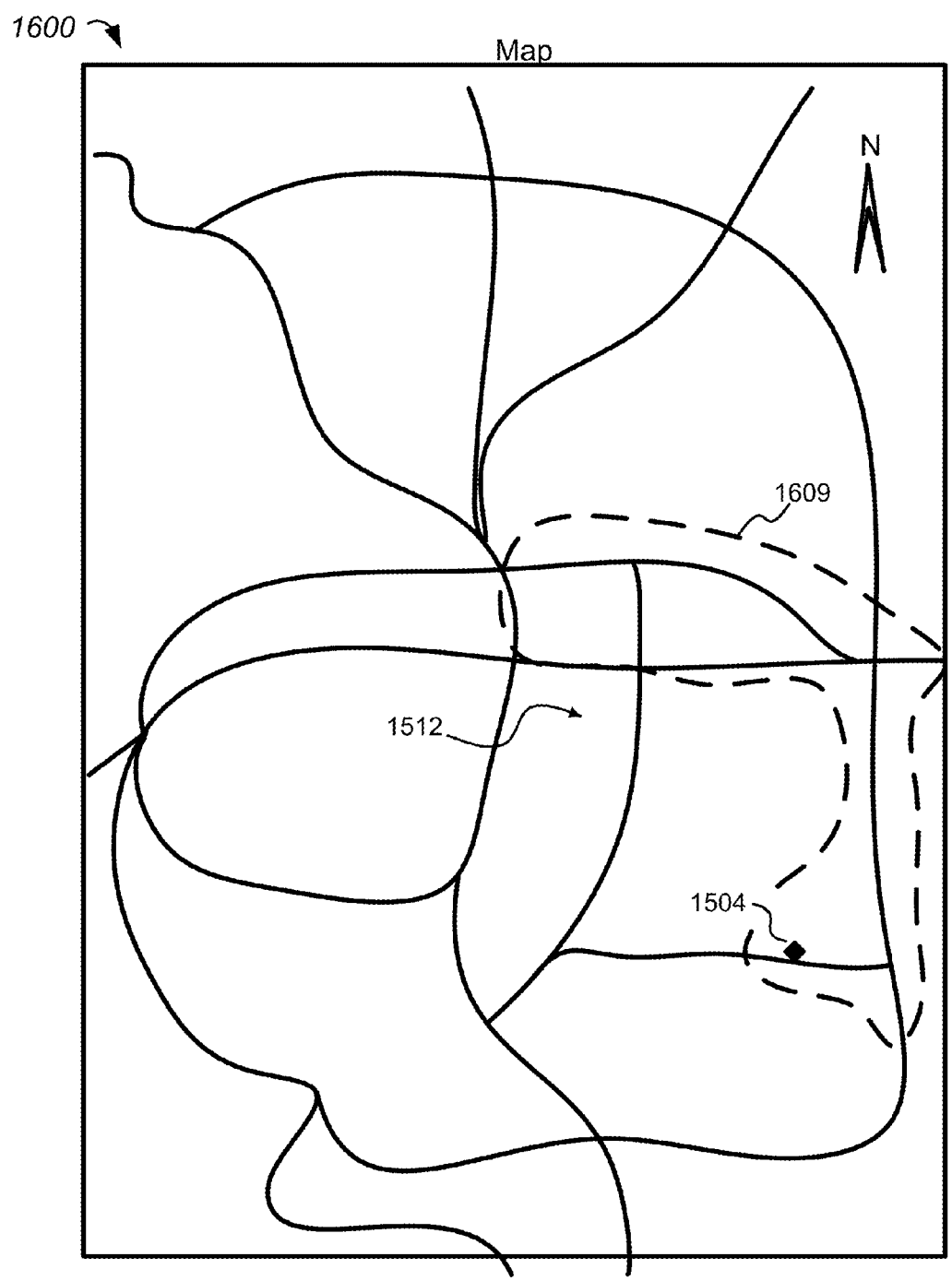
FIG. 16 shows another non-limiting example of a search area associated with an end-user of a call, in accordance with certain embodiments of the present disclosure.

FIG. 16 shows one non-limiting example search area 1609 that could be generated in response to such an event, in accordance with certain embodiments of the present disclosure. The search area 1609 could be based on the next best set of parameters with respect to the location 1504. The search area 1609, like search area 1508, could still take into consideration various factors, such as an excluding area 1512. If no results are identified for the search area 1609, the iterative expansion of the search area could continue in order to identify additional providers. Alternatively and/or additionally, in some embodiments, such a process could be continued until a threshold number of providers are identified within an expanding search area.

With certain embodiments according to the present disclosure, the combination of user data, location data, and/or provider data can be used to generate many types of heat maps. The heat maps may be graphical heat maps. Many types of data and subsets of data can be graphically depicted in isolation or in combination with other data in heat maps according to various embodiments. In some embodiments, heat maps may depict aspects of particular users or groups of users. In some embodiments, heat maps may depict aspects of particular providers and/or geographical areas. Thus, any of the provider call routing and matching functionality may use any of the data that is available to the call management system 1006 as shown in data stores 268.

Figure 17:
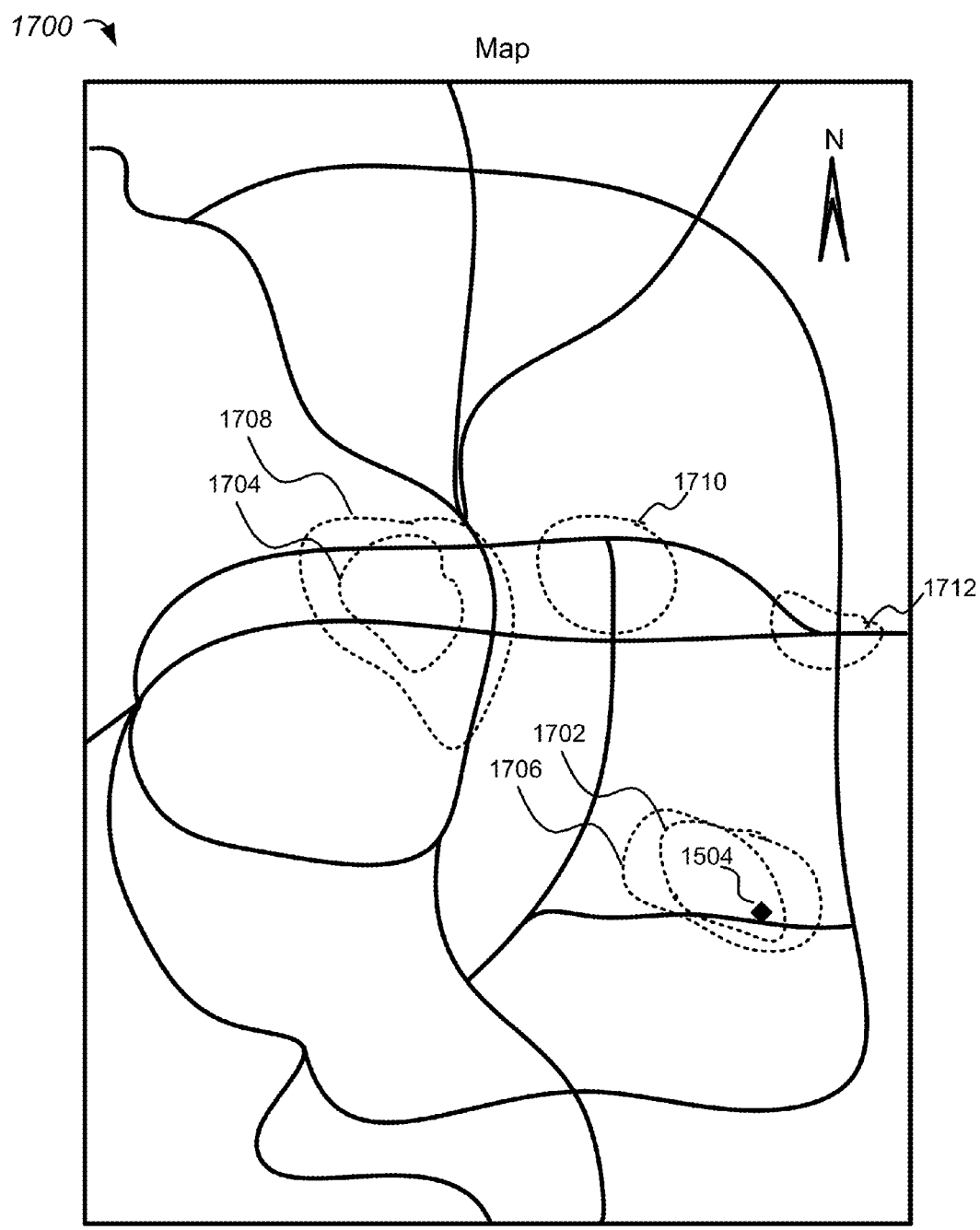
FIG. 17 shows a non-limiting example of heat-mapping in relation to a search area associated with an end-user of a call, in accordance with certain embodiments of the present disclosure.

FIG. 17 shows non-limiting example of heat mapping 1700, in accordance with certain embodiments of the present disclosure. In some embodiments, the heat mapping 1700 could be used to identify search areas (i.e., area's proximal to the user's location used for searching and matching providers) 1508, 1609 in the previous examples. In some embodiments, the heat mapping 1700 could also be used to facilitate ranking of providers, selecting the ranked providers, and/or determining a type of connection transmission to initiate with the selected provider. The call management system may generate heat maps in order to identify correlations of one or more of the user information for the user associated with the end-user communication device, at least a portion of the first set of provider information, and/or information corresponding to the user's location and use these correlations in multiple different analyses. For example, the heat map generation processes may include different types of analyses for each subsequent step described above in reference to FIG. 13. For example, in some embodiments, a different heat map may be generated for each process of determining a search area proximal to an end-user communication device location, determining matching providers associated with those areas, ranking the matched providers, and determining a call connection type associated with the selected provider. Alternatively and/or additionally, in some embodiments, a single heat map may be generated and used for each of the processes described above and/or only some of the processes.

The heat mapping 1700 may identify various "high correlation areas" that correspond to high correlations of user data, location data, and/or provider data. High correlation areas of different "degrees" may be identified, and may correspond to varying levels of correlation. For example, high correlation areas 1702 and 1704 may correspond to geographical areas where corresponding user, location, and provider data has very high degrees of mutual relations relative to data for other geographical areas such as 1706, 1708, 1710, and 1712, which in turn have higher degrees relative to other areas.

Accordingly, in the examples depicted, the search area 1508 could be based at least in part on areas 1702, 1704, 1706, and/or 1708; and the search area 1609 could be based at least in part on high correlation areas 1702, 1706, 1710, and/or 1712. Thus, the best coverage may be identified for a given search. Similarly, as the search area 1609 may not encompass high correlation areas 1704 and 1708, but may encompass high correlation areas 1710 and 1712, the search area 1609 may be identified as the next best search area for a given query.

Figure 18:
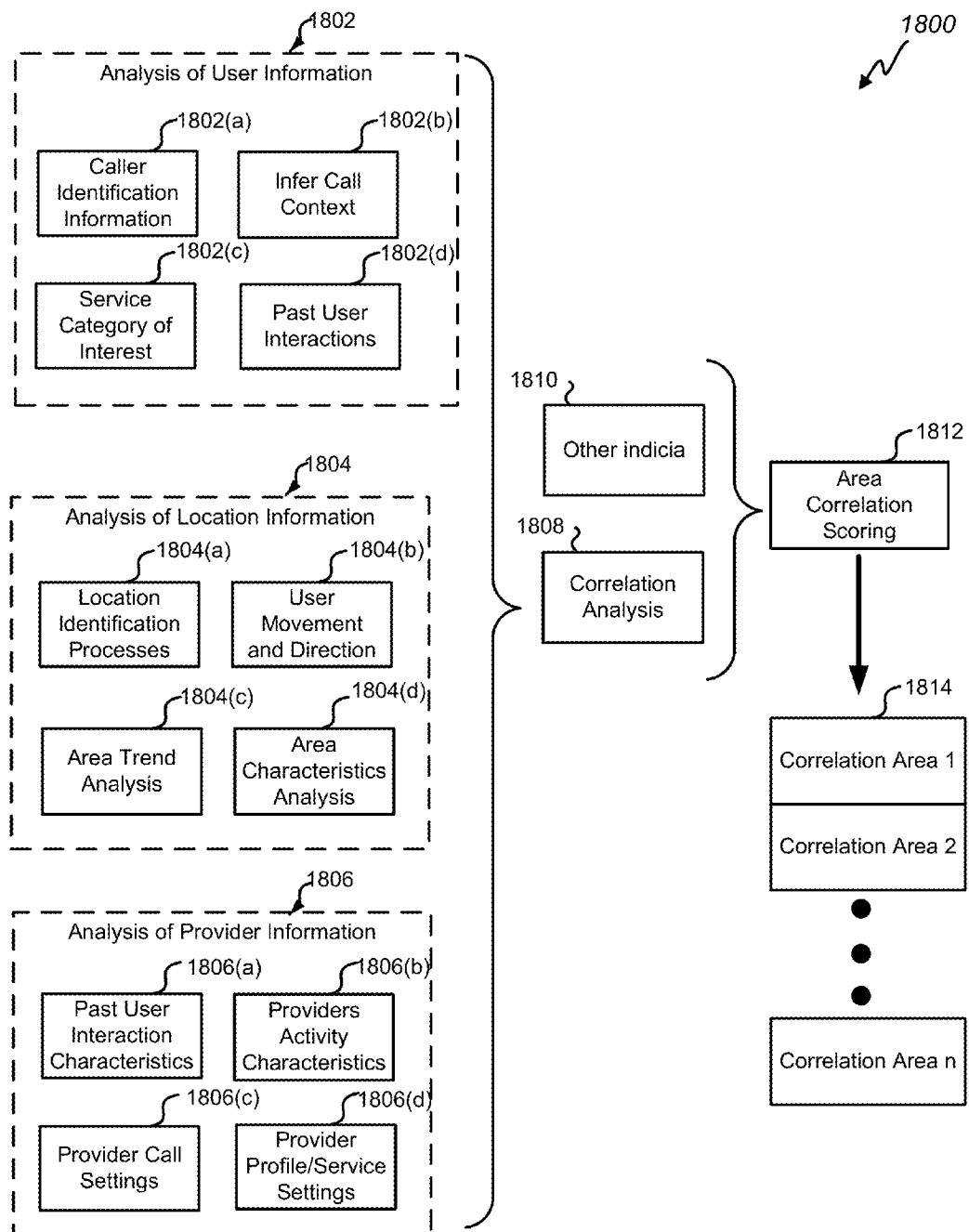
FIG. 18 shows an example method of generating a heat map by analyzing a combination of user information, location information, and provider information, in accordance with certain embodiments of the present disclosure.

FIG. 18 shows an example method of generating a heat map by analyzing a combination of user information, location information, and provider information, in accordance with certain embodiments of the present disclosure. In some embodiments, any combination of user data, location data, and provider data can be used to generate heat maps depicting strong correlations between characteristics of a particular consumer or a group of consumers and providers in an area. Any suitable calculations and/or analysis scheme may be implemented in order to identify correlations between one or a combination of user data, location data, and provider data.

As shown in FIG. 18, the generation of the heat map may include a wide variety of different types of information that are correlated, assigned a score, ranked according to the correlation score and analyzed in light of the location information to determine the areas with the highest correlation scores surrounding the user.

As indicated by block 1802, one or more processors within the call management system may gather and analyze user information for the call and subsequent heat map generation. The user information analysis may include, for example, analyzing caller identifier information 1802(*a*), inferring a call context 1802(*b*), identifying a service category of interest 1802(*c*), and analyzing past user interaction information 1802(*d*) amongst many other analyses that may be undertaken by the system using any of the characteristics described herein. Each of the various analyses may be completed through any suitable manner. For instance, analyzing caller identifier information analysis 1802(*a*) may include utilizing caller information based on calling name delivery (CNAM) and/or Automatic Number Identification (ANI) processes as detailed above. Additionally, the inferring a call context analysis 1802(*b*) may include analyzing preference information to identify where a user is, what actions they may be completing, and/or any other information about a user's experience. The past user interactions analysis 1802(*d*) may include analyzing past user locations, characteristics of previous interactions with providers including the duration, number, and results of previous calls, analysis of end-user device connections by media channel with the call management system 1006, and/or any other suitable user information stored at the user information databases and/or data stores of the call management system 1006.

As indicated by block 1804, one or more processors within the call management system may gather and analyze location information for the call and subsequent heat map generation. The location information analysis may include, for example, location identification processing 1804(*a*), user movement speed and direction determination 1804(*b*), area information identification and analysis 1804(*c*), as well as area characteristics analysis 1804(*d*), amongst many other analyses that may be undertaken by the system using any of the characteristics described herein. Each of the various analyses may be completed through any suitable manner. For example, the location identification processing 1804(*a*) may be determined based on a satellite positioning system, a pseudolite positioning system, carrier-provided location information, a cellular positioning system, Time Difference of Arrival (TDOA), Advanced Forward Link Trilateration (AFLT), Enhanced Observed Time Difference (EOTD), etc., as well as Wi-Fi-based location, access point for a wireless local area network or a wireless personal area network, IP address, and/or the like.

Further, as another example, user movement speed and direction determination 1804(*b*) may be determined by analyzing a direction of travel of an end-user communication device, as well as analyzing maps and street level route analysis including likely travel routes, main travel routes, deviation therefrom, and/or other traffic conditions. Additionally, the area information analysis 1804(*d*) may include identification of characteristics of the surrounding area including, for example, high user call density, volume, velocity, etc. The area characteristics analysis 1804(*d*) may include, for example, a determination and analysis of the characteristics of the surrounding area to the location, such as, for example, crime rate, opulence, population information, etc.

As indicated by block 1806, one or more processors within the call management system may gather and analyze provider information for the call and subsequent heat map generation. The provider information analysis may include, for example, analyzing past user interaction characteristics of the provider 1806(*a*), analyzing provider activity characteristics 1806(b), identifying provider call settings associated with end-user calls 1806(*c*), and analyzing provider profile and service settings information 1806(*d*), amongst many other analyses that may be undertaken by the system using any of the characteristics described herein. The past user interaction characteristics of the provider analysis 1806(*d*) may include, for example, a determination and analysis of the provider's history with the end-user as well as other general end-user interactions. Additionally, the providers activity characteristics analysis may include, for example, a determination and analysis of the provider type or category corresponding to high user interaction, density, volume, velocity, etc. in the area as well as providers corresponding to active user interactions, for example, that have recently interacted with other users and/or through other media channels (e.g., website posts, blog posts, etc.). Furthermore, the provider call settings analysis may include an analysis of the settings associated with the provider corresponding to user calls. These settings may include the notification types, the restrictions on transmitting live calls to the provider, the threshold distances for various provider locations as service areas with respect to user locations, and/or any other relevant information to the providers interacting with call from end-user communication devices. Additionally, the provider settings and/or service settings may the provider's hours of operation, do not disturb times, and/or the like.

As indicated by block 1808, one or more processors of the call management system 1006 may perform a correlation analysis between all of the various information analysis processes described above. The correlation analysis may compare the various information obtained during steps 1802-1806 against one another to identify correlations that exist between the end-user, the location, and the providers within the location. For example, pre-determined correlation rules, relationships, and pre-determined criteria may be analyzed to determine the correlations between providers, users, and locations based on the information identified above. The criteria may be updated based on current system performance such that the system improves the criteria relationships between various types of information.

As indicated by block 1810, one or more processors or modules of the call management system may identify other indicia or criteria that may be useful in identifying correlations and/or filtering noise, etc., to ensure the correlation results are as meaningful as possible.

As indicated by block 1812, one or more processors or modules of the call management system 1006 may determine the area correlation indicator of an area based on the location, user information, and provider information described above. Any suitable scoring scheme and/or correlation analysis scheme may be used in various embodiments. In some embodiments, correlation indicator scoring may include categories such as positive-correlation, neutral, and negative-correlation, or any suitable categories. The area correlation indicator scoring system could be correlated to the category scheme in some embodiments, such that certain scores correspond to certain categories. Some embodiments may assign an area within the search area with a number, for example, an area correlation indicator of 95. For example, in some embodiments, the user information associated with a user's call history may indicate that the user regularly visits a particular area and that the user is looking for a particular type of service. An area correlation indicator may be an assessment of an area as potentially matching the caller's needs. Accordingly, an area correlation indicator may indicate which areas the caller is more likely to travel to, thus providing a measure that a given caller will match well with one or more providers in that area. By way of example without limitation, a correlation indicator range could include correlation scores from 0 to 100, or from 0 to 1,000. Some embodiments may use methods of statistical analysis to derive a correlation score. Various embodiments may determine an area correlation indicator based on any one or more suitable quantifiers.

For example, some embodiments may employ a decision tree, checklist, workflow, and/or the like to capture various aspects of an area's characteristics in light of the user information and provider information in the area and assess those aspects to infer areas of importance or preference to the user. Such a decision tree, checklist, and/or workflow may incorporate any one or combination of the depicted aspects and/or similar aspects in any desired order, according to various embodiments.

As indicated by block 1814, one or more processors or modules of the call management system 1006 may rank the correlation areas based on each area correlation indicators and may determine those areas with high correlation (as described above in reference to FIG. 17) and those areas to be avoided (based on negative values and/or the other indicia of the correlation areas). Accordingly, the system may determine those areas that should be avoided and/or those areas that should be included in any determination of a search area associated with ranking the providers matching and routing for the call.

Thus, the heat map may be generated based on the information and processes described above. Thus, some embodiments may use user data, location data, and/or provider data to match the caller with a set of one or more providers. In some embodiments, the analysis may be performed in real time to increase the accuracy of the matches between a user and providers. Any suitable combination of data may be correlated with a heat map in accordance with various embodiments. As shown and described in reference to FIG. 11 above, any number of different types of information may be included in user data, location data, and provider data.

Furthermore, as described briefly above in reference to block 1322 of FIG. 13, in some embodiments, a notification or other type of connection may be transmitted to one or more providers instead of a call being connected. For instance, if the system determines that the interest level of the caller is lower than a threshold set by the provider, the system may generate a notification message instead of connecting the call. By allowing providers to further control when and by what level of interest an end-user may have before being directly connected to a provider, the system may allow providers to filter quality calls without taking time and system resources to discuss with multiple end-users that are low quality, unlikely to obtain the provider's services, attempting to solicit business, etc.

Figure 19:
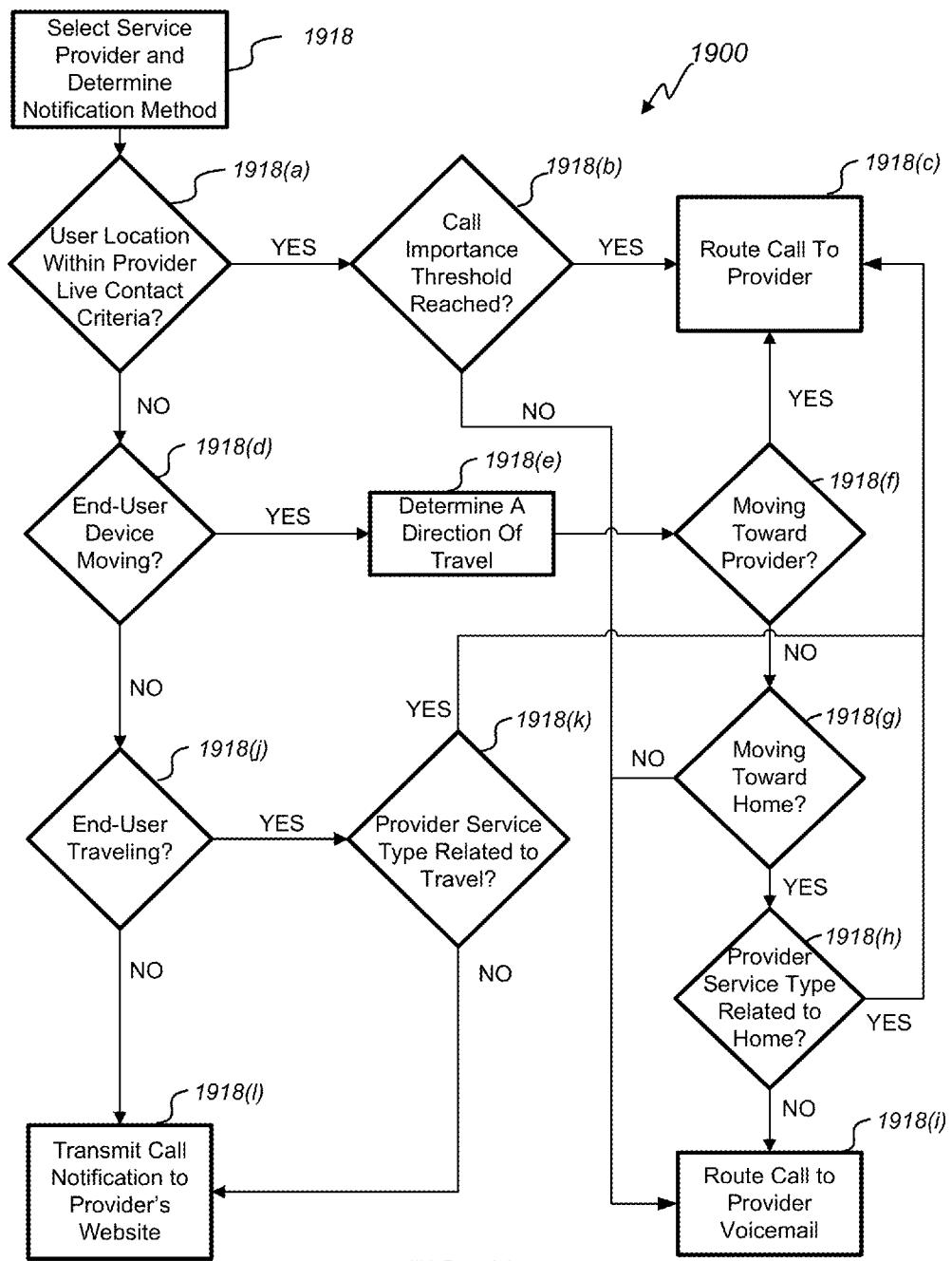
FIG. 19 shows an example method of connecting a selected provider with a user of a computing device, in accordance with certain embodiments of the present disclosure.

FIG. 19 shows an example method of a call management system 1006 facilitating and selecting one of multiple options for connecting a selected provider with a user of a computing device during a call, in accordance with certain embodiments of the present disclosure. As indicated by block 1918, the call management system 1006 may identify and facilitate the connection of the telephone call to a provider after the provider identification, selection, and matching processes described in reference to FIGS. 13-17 are complete. Thus, the non-limiting example shown in FIG. 19 begins at corresponding step 1318 of FIG. 13 where a provider has been selected for the call and the call management system 1006 is determining a telephone number for facilitating transmission of the call to the selected provider. Accordingly, FIG. 19 provides an exemplary method for identifying a type of connection to facilitate based at least in part upon the provider information of the selected provider received from the provider database, the location of the end-user communication device, and the user information received from the user information database.

As indicated by block 1918(*a*), the call management system 1006 may determine whether the identified location matches a provider's live call contact criteria. Providers may configure different ranges and/or threshold distances in which a user should be located in order to transmit a live call to the provider. Thus, a provider may be able to screen and/or limit the transmission of less important calls that are not initiated from a distance that is within a service area and/or otherwise limit unproductive calls. For instance, all calls initiated within the same city may be connected live but calls from different states, regions, and/or countries may not be connected live. A provider database may be updated to match the specific services provided by each provider and configured for successful connections by the provider.

As indicated by block 1918(*b*), if the user location is within the designated live call contact criteria indicated by the provider, the call may be analyzed for importance to determine whether the call is of sufficient importance to immediately facilitate routing of the call to a provider. The provider may configure an importance threshold using any of the various types of user, location, and provider information and criteria discussed above. For example, a provider may configure complex conditional tests based on multiple conditional variables associated with a matched call to determine whether the call is of sufficient importance. In some embodiments, an importance score may be assigned to each call based on the number of conditional variables triggered by a call. In other embodiments, a calculation of the correlation of a user location and user profile information may indicate the statistical likelihood of an important call which may then be compared to the importance threshold to determine whether the call meets the threshold. Accordingly, many different types of analysis may be applied using any and all of the different types of information available to the call management system 1006 that have been discussed herein in order to obtain a call's importance threshold and compare it to the provider's settings. Further, in some embodiments, a user may be requested to perform a Human Interaction Test (e.g., a CAPTCHA) to prove the end-user is a live human and such an indication can be used to further determine the call's importance (i.e., those calls that may be initiated by a machine and/or may be automated would not be considered important).

As indicated by block 1918(*c*), where the call is of sufficient importance and the calculation of the call's importance has met the provider's indicated importance threshold, the call may be routed to the provider and transmission of the call to the provider may be completed. Any of the methods for connection and transmission of calls described herein may be used by the system to connect the call live and/or if a call is missed, to determine the best methods for following up with the call.

As indicated by block 1918(*d*), where the location of the user is outside the live contact criteria of the provider, the call management system 1006 may identify whether the end-user communication device is moving or is stationary. The call management system 1006 may implement any of the location tracking methods and processes described herein in order to obtain the end-user's location and to determine whether the end-user is moving. For example, multiple location readings received from the end-user communication device and/or obtained from third party database sources associated with the end-user communication device. Additionally, the end-user may provide a future location and/or may otherwise indicate to the call management system 1006 of the status of the user.

As indicated by block 1918(*e*), where the call management system 1006 identifies that the end-user communication device of the user is moving, the call management system 1006 may determine a direction of travel for the end-user communication device. Any suitable processes may be implemented for determining the direction of travel including those methods described above in reference to FIG. 14. For example, the call management system 1006 may analyze the multiple locations obtained from the end-user communication device and may compare various samples from the multiple location information in light of known geographic and/or maps of the relevant area and may identify a direction in which the end-user communication device is moving.

As indicated by block 1918(*f*), once the call management system 1006 identifies the direction of travel, the system may process information about the direction in which the end-user communication device is moving in order to identify whether the end-user communication device is moving toward one or more locations associated with the selected provider. The call management system 1006 may compare the direction of movement and the user's current location to the location information stored in the provider database to identify whether the user is generally moving in their direction. However, in some embodiments, the system may apply specific constraints and/or obtain specific inputs and/or plans from the user regarding whether they are coming to one of the provider's locations.

Where it is determined that the user is moving toward the provider, the call may meet a level of importance that warrants a live call connection to the provider since the end-user may move into the live contact criteria identified by the provider and/or may be traveling to the provider's location. Accordingly, the call management system 1006 may select the type of connection to facilitate a live call to the provider even though the end-user is located outside of the live call criteria of the provider. Further, note that many of the same analyses may be applied to the various steps shown in FIG. 19. For example, in some embodiments, an importance threshold analysis and/or calculation may be performed before transmitting the call to the provider and/or any other further analysis may be performed to ensure the call is worth live connecting to the provider.

As indicated by block 1918(*g*), where the call management system 1006 identifies that the end-user communication device of the user is not moving toward the provider, the call management system 1006 may further process the direction information to determine whether the user is moving toward other important or meaningful locations. For example, the call management system 1006 may determine whether the user is traveling home, toward a relative's home, toward work, and/or any other relevant or favorite locations. If the user is not moving toward any relevant locations, a low importance notification and/or voice message transmission may be performed. Additionally, any of the other notification methods described herein may be performed (e.g., website post, social media network posting, etc.).

As indicated by block 1918(*h*), where the call management system 1006 identifies that the end-user communication device of the user is moving toward their home, the call management system 1006 may process information regarding the provider's information to identify in order to identify whether the selected provider is associated with a service category that matches with home locations. Thus, the type of service, service category, and/or any other provider information may be correlated to the direction of the user's movement and inferred future location as well.

As indicated by block 1918(*i*), where the call management system 1006 identifies that the provider is not associated with any home services and/or other relevant service categories, the call management system 1006 may determine that the call is less important and may transfer the call to the provider's voicemail or other less important notification types as discussed herein.

As indicated by block 1918(*j*), where the call management system 1006 identifies that the end-user communication device of the user is not within the live contact criteria and is not moving toward the provider (or is stationary), the call management system 1006 may process the location information in order to identify whether the end-user communication device is outside of a home region and/or is traveling away from home. Thus, the call management system 1006 may compare a home location associated with the user's information and the present location to determine if the user is traveling and/or on vacation.

As indicated by block 1918(*k*), where the end-user is characterized as traveling, the call management system 1006 may determine whether the provider information is associated with user travel which may increase the importance of a connection. Users away from a home location may have different practices and activities than those at home and providers that are associated with these categories may desire to take a live call from a user even if they would otherwise not meet the live call criteria. Accordingly, the call management system 1006 may perform any number of analyses of provider information to determine if the provider would benefit from such a situation.

As indicated by block 1918(*l*), where the call management system 1006 identifies that either the end-user is not away from a home location and/or where the provider is not interested in users away from a home region, the call management system 1006 may determine the call is not important and may transmit a call notification instead of a live call to the provider. Any number of different methods may be implemented for transferring such calls. For example, a message may be played to a user informing them they may be contacted in the future and a call may be terminated. In other embodiments, the user may be transferred to a different provider (e.g., a lower ranked matched provider) and/or any other suitable actions may be undertaken to improve the interaction with the consumer. A notification may then be issued to the provider including the contact information for the user and/or any other relevant information to inform the provider of the user's specific information for follow-up at a better time. Accordingly, any number of different call transmission, notification, and/or information gathering and disbursement processes may be implemented by the call management system 1006 to best tailor the call connection experience to both users and providers.

The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. Special-purpose computer systems disclosed herein include a computer-program product(s) stored in tangible computer-readable memory that directs the systems to perform the above-described methods. The systems include one or more processors that communicate with a number of peripheral devices via a bus subsystem. These peripheral devices may include user output device(s), user input device(s), communications interface(s), and a storage subsystem, such as random access memory (RAM) and non-volatile storage drive (e.g., disk drive, optical drive, solid state drive), which are forms of tangible computer-readable memory.

The computer-program products may be stored in non-volatile storage drive or another computer-readable medium and loaded into memory. Each processor may comprise a microprocessor, such as a microprocessor from Intel® or Advanced Micro Devices, Inc.®, or the like. To support computer-program products, the systems may run an operating system that handles the communications of the product with the noted components, as well as the communications between the noted components in support of the computer-program product. Exemplary operating systems may include Windows® or the like from Microsoft® Corporation, Solaris® from Oracle®, LINUX, UNIX, and/or the like.

The communications interface(s) may provide an interface to other communication networks and devices and may serve as an interface to receive data from and transmit data to other systems, WANs and/or the Internet. Embodiments of communications interface typically include an Ethernet card, a modem (telephone, satellite, cable, ISDN), a (asynchronous) digital subscriber line (DSL) unit, a FireWire® interface, a USB® interface, a wireless network adapter, and the like. For example, the communications interface may be coupled to a computer network, to a FireWire® bus, or the like. In other embodiments, the communications interface may be physically integrated on a motherboard, and/or may be a software program, or the like.

RAM and non-volatile storage drive are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM and non-volatile storage drive may be configured to store the basic programming and data constructs that provide the functionality of various embodiments of the present invention, as described above.

Software instruction sets that provide the functionality of the present invention may be stored in RAM and non-volatile storage drive. These instruction sets or code may be executed by the processor(s). RAM and non-volatile storage drive may also provide a repository to store data and data structures used in accordance with the present invention. RAM and non-volatile storage drive may include a number of memories including a main random access memory (RAM) to store of instructions and data during program execution and a read-only memory (ROM) in which fixed instructions are stored. RAM and non-volatile storage drive may include a file storage subsystem providing persistent (non-volatile) storage of program and/or data files. RAM and non-volatile storage drive may also include removable storage systems, such as removable flash memory.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations may be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" and variations of the term may represent one or more devices for storing data, including read only memory (ROM), random access memory (RAM), magnetic RAM, core memory, magnetic disk storage mediums, optical storage mediums, flash memory devices and/or other machine readable mediums for storing information. The terms, computer-readable media, processor-readable media, and variations of the term, include, but are not limited to portable or fixed storage devices, optical storage devices, wireless channels and various other mediums capable of storing, containing or carrying instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of location-aware call processing for a call for routing to a provider, the method comprising:
    processing a first transmission, by a first telecommunications server of a server system, the first transmission being received from an end-user communication device, and the first transmission being associated with a telephone call;
    identifying, by the server system, a first provider category at least partially based on the first transmission associated with the telephone call, the first provider category being identified at least in part by analyzing user information obtained by querying a user information database of the server system for user information associated with an identifier of the end-user communication device and/or a user identifier received from the end-user communication device associated with the first transmission;
    processing, by the server system, a first set of provider information stored in a provider database of the server system, the processing of the first set of provider information being at least partially based on the first provider category, the processing of the first set of provider information being based at least partially on sending a database query for provider information corresponding to the first provider category stored in the provider information database and receiving a database response including the first set of provider information for providers including the first provider category, wherein the first set of provider information corresponds to a first set of providers, and wherein the first set of provider information received from the database response further comprises distance thresholds corresponding to the providers of the first set of providers, wherein the providers of the first set of providers previously specified the distance thresholds;
    processing information about a first location by the server system, the processing of the information including identifying the first location, and the first location being associated with the first transmission associated with the telephone call;
    generating, by the server system, a heat map to identify correlations of the user information for the user associated with the end-user communication device, at least a portion of the first set of provider information, and/or information corresponding to the first location;
    calculating, by the server system, an area proximate to the first location at least partially by using the identified correlations from the heat map to identify the areas surrounding the first location that include high interest matching for the user;
    identifying, by the server system, a second set of provider information out of the first set of provider information at least partially based on the first location and/or the area proximate to the first location and the distance thresholds corresponding to the providers of the first set of providers, wherein the second set of provider information corresponds to a second set of providers out of the first set of providers;
    ranking, by the server system, each of the providers from the second set of providers, the ranking being calculated at least in part through a comparison of a correlation of criteria shared between the user information obtained from the user information database associated with the end-user communication device and/or the user identifier included in the first transmission and the provider information associated with each of the providers of the second set of providers;
    selecting, by the server system, a provider from the second set of providers at least partially based on the ranking of each of the providers from the second set of providers;
    identifying, by the server system, a telephone reference for the selected provider from the second set of providers by querying the provider information database for the telephone reference associated with the selected provider; and
    facilitating, by the first telecommunications server of the server system, a connection of the telephone call to the selected provider from the second set of providers at least partially based on the telephone reference of the selected provider.

2. The method of claim 1, wherein the identifying of the first location further comprises:
    automatically-gathering a location of the end-user communication device; and/or
    obtaining a user-entered location from a user of the end-user communication device.

3. The method of claim 2, wherein automatically-gathering the location of the end-user communication device further comprises obtaining a position of the end-user communication device identified at least in part with one or more of a receiver included with the end-user communication device and/or location information from a source external to the end-user communication device.

4. The method of claim 1, wherein the telephone reference is a first telephone reference, and wherein the method further comprises:
    assigning a second telephone reference to a content object, wherein the second telephone reference corresponds to the first provider category; and
    providing the content object and the second telephone reference, via a network, to the end-user computing device, wherein the telephone call was initiated via the second telephone reference, and wherein the indication of the first provider category is identified at least partially on the second telephone reference used to initiate the telephone call.

5. The method of claim 1, wherein the identifying the first provider category at least partially based on the telephone call is further at least partially based on search criteria that the server system receives from the end-user communication device,
    wherein the user information is obtained by querying the user information database with the identifier of the end-user communication device,
    wherein the identifier of the end-user communication device includes a phone number,
    wherein the first location includes a location of the end-user communication device when the first transmission is sent by the end-user communication device,
    wherein the heat map is generated by identifying correlations of the user information, the provider information of the first set of provider information, and information corresponding to the first location, wherein the second set of providers include providers of the first set of providers that have a service area corresponding to the first location and the area proximate to the first location, and wherein the ranking of each of the providers from the second set of providers is calculated at least in part by a degree of matching of criteria between the user information and the provider information.

6. The method of claim 1, wherein identifying the area proximal to the first location further comprises:

processing information about a second location, by the server system, the second location being associated with the end-user communication device;

processing the information about the second location, by the server system, in order to identify whether the end-user communication device is moving, the identification being based at least in part on a comparison between the first location and the second location;

processing the information about the second location, by the server system, in order to identify a speed of movement for the end-user communication device;

characterizing, by the server system, the activity of the end-user communication device as being associated with one or more movement modes by comparing the speed of movement to the one or more movement mode speed levels obtained from a movement rules database of the server system; and selecting a shape of the area proximal to the first location based at least in part on the characterized activity of the end-user communication device as being associated with the one or more movement modes.

7. The method of claim 1, wherein facilitating the connection of the telephone call to the selected provider from the second set of providers further comprises identifying, by the server system, a type of connection to facilitate based at least in part upon the provider information of the selected provider received from the provider database, the first location, and the user information received from the user information database.

8. The method of claim 7, wherein identifying the type of connection to facilitate further comprises:

processing information about the first location, by the server system, in order to identify whether the end-user communication device is outside of a home region, the identification being based at least in part on a comparison between the first location and user information;

processing information about the provider information, by the server system, in order to identify whether the selected provider is associated with a service category that is associated with end-user communication devices located outside of the home region; and selecting the type of connection to facilitate for the call from one of a live call, a call messaging service, and a notification transmission at least partially on whether the selected provider is associated with the service category.

9. The method of claim 7, wherein identifying the type of connection to facilitate further comprises:

processing information about a second location, by the server system, the second location being associated with the end-user communication device;

processing the information about the second location, by the server system, in order to identify a direction in which the end-user communication device is moving, the identification being based at least in part on a comparison between the first location and the second location;

processing the information about the direction in which the end-user communication device is moving, by the server system, in order to identify whether the end-user communication device is moving toward the selected provider; and selecting the type of connection to facilitate for the call from one of a live call, a call messaging service, and a notification transmission at least in part on whether the end-user communication device is moving toward the selected provider.

10. One or more non-transitory, computer-readable storage media having computer-readable instructions for location-aware call processing for a call for a provider, the instructions to cause one or more processors to perform a method, the method comprising:

processing a first transmission, by a first telecommunications server of a server system, the first transmission being received from an end-user communication device, and the first transmission being associated with a telephone call;

identifying, by the server system, a first provider category at least partially based on the first transmission associated with the telephone call, the first provider category being identified at least in part by analyzing user information obtained by querying a user information database of the server system for user information associated with an identifier of the end-user communication device and/or a user identifier received from the end-user communication device associated with the first transmission;

processing, by the server system, a first set of provider information stored in a provider database of the server system, the processing of the first set of provider information being at least partially based on the first provider category, the processing of the first set of provider information being based at least partially on sending a database query for provider information corresponding to the first provider category stored in the provider information database and receiving a database response including the first set of provider information for providers including the first provider category, wherein the first set of provider information corresponds to a first set of providers, and wherein the first set of provider information received from the database response further comprises distance thresholds corresponding to the providers of the first set of providers, wherein the providers of the first set of providers previously specified the distance thresholds;

processing information about a first location by the server system, the processing of the information including identifying the first location, and the first location being associated with the first transmission associated with the telephone call;

generating, by the server system, a heat map to identify correlations of the user information for the user associated with the end-user communication device, at least a portion of the first set of provider information, and/or information corresponding to the first location;

calculating, by the server system, an area proximate to the first location at least partially by using the identified correlations from the heat map to identify the areas surrounding the first location that include high interest matching for the user;

identifying, by the server system, a second set of provider information out of the first set of provider information at least partially based on the first location and/or the area proximate to the first location and the distance thresholds corresponding to the providers of the first set of providers, wherein the second set of provider information corresponds to a second set of providers out of the first set of providers;

ranking, by the server system, each of the providers from the second set of providers, the ranking being calculated at least in part through a comparison of a correlation of criteria shared between the user information obtained from the user information database associated with the end-user communication device and/or the user identifier included in the first transmission and the provider information associated with each of the providers of the second set of providers;

selecting, by the server system, a provider from the second set of providers at least partially based on the ranking of each of the providers from the second set of providers;

identifying, by the server system, a telephone reference for the selected provider from the second set of providers by querying the provider information database for the telephone reference associated with the selected provider; and facilitating, by the first telecommunications server of the server system, a connection of the telephone call to the selected provider from the second set of providers at least partially based on the telephone reference of the selected provider.

11. The one or more non-transitory, computer-readable storage media of claim 10, wherein the identifying of the first location further comprises:

automatically-gathering a location of the end-user communication device; and/or obtaining a user-entered location from a user of the end-user communication device.

12. The one or more non-transitory computer-readable storage media of claim 11, wherein automatically-gathering the location of the end-user communication device further comprises obtaining a position of the end-user communication device identified at least in part with one or more of a receiver included with the end-user communication device and/or location information from a source external to the end-user communication device.

13. The one or more non-transitory, computer-readable storage media of claim 10, wherein the telephone reference is a first telephone reference, and wherein the method further comprises:

assigning a second telephone reference to a content object, wherein the second telephone reference corresponds to the first provider category; and providing the content object and the second telephone reference, via a network, to the end-user computing device, wherein the telephone call was initiated via the second telephone reference, and wherein the indication of the first provider category is identified at least partially on the second telephone reference used to initiate the telephone call.

14. The one or more non-transitory, computer-readable storage media of claim 10, wherein the identifying the first provider category at least partially based on the telephone call is further at least partially based on search criteria that the server system receives from the end-user communication device, wherein the user information is obtained by querying the user information database with the identifier of the end-user communication device, wherein the identifier of the end-user communication device includes a phone number, wherein the first location includes a location of the end-user communication device when the first transmission is sent by the end-user communication device, wherein the heat map is generated by identifying correlations of the user information, the provider information of the first set of provider information, and information corresponding to the first location, wherein the second set of providers include providers of the first set of providers that have a service area corresponding to the first location and the area proximate to the first location, and wherein the ranking of each of the providers from the second set of providers is calculated at least in part by a degree of matching of criteria between the user information and the provider information.

15. The one or more non-transitory, computer-readable storage media of claim 10, wherein identifying the area proximal to the first location further comprises:

processing information about a second location, by the server system, the second location being associated with the end-user communication device;

processing the information about the second location, by the server system, in order to identify whether the end-user communication device is moving, the identification being based at least in part on a comparison between the first location and the second location;

processing the information about the second location, by the server system, in order to identify a speed of movement for the end-user communication device;

characterizing, by the server system, the activity of the end-user communication device as being associated with one or more movement modes by comparing the speed of movement to the one or more movement mode speed levels obtained from a movement rules database of the server system; and selecting a shape of the area proximal to the first location based at least in part on the characterized activity of the end-user communication device as being associated with the one or more movement modes.

16. The one or more non-transitory, computer-readable storage media of claim 10, wherein facilitating the connection of the telephone call to the selected provider from the second set of providers further comprises identifying, by the server system, a type of connection to facilitate based at least in part upon the provider information of the selected provider received from the provider database, the first location, and the user information received from the user information database.

17. The one or more non-transitory, computer-readable storage media of claim 16, wherein identifying the type of connection to facilitate further comprises:

processing information about the first location, by the server system, in order to identify whether the end-user communication device is outside of a home region, the identification being based at least in part on a comparison between the first location and user information;

processing information about whether the provider information, by the server system, in order to identify whether the selected provider is associated with a service category that is associated with end-user communication devices located outside of the home region; and selecting the type of connection to facilitate for the call from one of a live call, a call messaging service, and a notification transmission at least partially on whether the selected provider is associated with the service category.

18. The one or more non-transitory, computer-readable storage media of claim 16, wherein identifying the type of connection to facilitate further comprises:
- processing information about a second location, by the server system, the second location being associated with the end-user communication device;
- processing the information about the second location, by the server system, in order to identify a direction in which the end-user communication device is moving, the identification being based at least in part on a comparison between the first location and the second location;
- processing the information about the direction in which the end-user communication device is moving, by the server system, in order to identify whether the end-user communication device is moving toward the selected provider; and
- selecting the type of connection to facilitate for the call from one of a live call, a call messaging service, and a notification transmission at least in part on whether the end-user communication device is moving toward the selected provider.

19. A system for location-aware call processing for a call for routing to a provider, the system comprising:
- one or more processors and memories; and
- one or more non-transitory computer-readable storage media coupled to the one or more processors and including instructions stored thereon to be executed by the one or more processors to:
  - process a first transmission, the first transmission being received from an end-user communication device, and the first transmission being associated with a telephone call;
  - identify a first provider category at least partially based on the first transmission associated with the telephone call, the first provider category being identified at least in part by analyzing user information obtained by querying a user information database of the system for user information associated with an identifier of the end-user communication device and/or a user identifier received from the end-user communication device associated with the first transmission;
  - process a first set of provider information stored in a provider database of the system, the processing of the first set of provider information being at least partially based on the first provider category, the processing of the first set of provider information being based at least partially on sending a database query for provider information corresponding to the first provider category stored in the provider information database and receiving a database response including the first set of provider information for providers including the first provider category, wherein the first set of provider information corresponds to a first set of providers, and wherein the first set of provider information received from the database response further comprises distance thresholds corresponding to the providers of the first set of providers, wherein the providers of the first set of providers previously specified the distance thresholds;
  - process information about a first location, the processing of the information including identifying the first location, and the first location being associated with the first transmission associated with the telephone call;
  - generate a heat map to identify correlations of the user information for the user associated with the end-user communication device, at least a portion of the first set of provider information, and/or information corresponding to the first location;
  - calculate an area proximate to the first location at least partially by using the identified correlations from the heat map to identify the areas surrounding the first location that include high interest matching for the user;
  - identify a second set of provider information out of the first set of provider information at least partially based on the first location and/or the area proximate to the first location and the distance thresholds corresponding to the providers of the first set of providers, wherein the second set of provider information corresponds to a second set of providers out of the first set of providers;
  - rank each of the providers from the second set of providers, the ranking being calculated at least in part through a comparison of a correlation of criteria shared between the user information obtained from the user information database associated with the end-user communication device and/or the user identifier included in the first transmission and the provider information associated with each of the providers of the second set of providers;
  - select a provider from the second set of providers at least partially based on the ranking of each of the providers from the second set of providers;
  - identify a telephone reference for the selected provider from the second set of providers by querying the provider information database for the telephone reference associated with the selected provider; and
  - facilitate a connection of the telephone call to the selected provider from the second set of providers at least partially based on the telephone reference of the selected provider.

20. The system of claim 19, wherein facilitating the connection of the telephone call to the selected provider from the second set of providers further comprises identifying, by the system, a type of connection to facilitate based at least in part upon the provider information of the selected provider received from the provider database, the first location, and the user information received from the user information database.

* * * * *